(12) United States Patent
Fukutomi et al.

(10) Patent No.: US 11,675,697 B2
(45) Date of Patent: **\*Jun. 13, 2023**

(54) CONTROLLER FOR CONTROLLING NON-VOLATILE SEMICONDUCTOR MEMORY AND METHOD OF CONTROLLING NON-VOLATILE SEMICONDUCTOR MEMORY

(71) Applicant: KIOXIA CORPORATION, Tokyo (JP)

(72) Inventors: Kazuhiro Fukutomi, Tokyo (JP); Kenichiro Yoshii, Tokyo (JP); Shinichi Kanno, Tokyo (JP); Shigehiro Asano, Tokyo (JP)

(73) Assignee: KIOXIA CORPORATION, Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 17/590,310

(22) Filed: Feb. 1, 2022

(65) Prior Publication Data

US 2022/0156182 A1 May 19, 2022

Related U.S. Application Data

(63) Continuation of application No. 16/995,029, filed on Aug. 17, 2020, now Pat. No. 11,269,766, which is a
(Continued)

(30) Foreign Application Priority Data

Mar. 18, 2010 (JP) .................................. 2010-063191

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/064* (2013.01);
(Continued)

(58) Field of Classification Search
CPC .... G06F 12/0246; G06F 3/061; G06F 3/0631; G06F 3/064; G06F 3/0659; G06F 3/0679;
(Continued)

(56) References Cited

U.S. PATENT DOCUMENTS 6,721,863 B1 4/2004 Endo
7,424,498 B1 9/2008 Patterson
(Continued)

FOREIGN PATENT DOCUMENTS

JP    11-126488    5/1999
JP    2001-154909  6/2001
(Continued)

OTHER PUBLICATIONS

Mendel Rosenblum, et al., "The LFS Storage Manager", Proceedings of the 1990 Summer Usenix, Jun. 1990, 16 pages.
(Continued)

*Primary Examiner* — Edward J Dudek, Jr.
*Assistant Examiner* — Sidney Li
(74) *Attorney, Agent, or Firm* — Oblon, McClelland, Maier & Neustadt, L.L.P.

(57) ABSTRACT

According to one embodiment, a write instructing unit instructs a data access unit to write, in a storage area of a data storage unit indicated by a first physical address, write object data, instructs a management information access unit to update address conversion information, and instructs a first access unit to update the first physical address. A compaction unit extracts a physical address of compaction object data, instructs the data access unit to read the compaction object data stored in a storage area of the data storage unit indicated
(Continued)

by the physical address, instructs the data access unit to write the compaction object data in a storage area of the data storage unit indicated by a second physical address, instructs the management information access unit to update the address conversion information, and instructs a second access unit to update the second physical address.

8 Claims, 28 Drawing Sheets

Related U.S. Application Data continuation of application No. 16/255,284, filed on Jan. 23, 2019, now Pat. No. 10,783,072, which is a continuation of application No. 15/901,443, filed on Feb. 21, 2018, now Pat. No. 10,229,053, which is a continuation of application No. 15/530,151, filed on Dec. 8, 2016, now Pat. No. 9,940,233, which is a continuation of application No. 13/933,804, filed on Jul. 2, 2013, now Pat. No. 9,690,691, which is a continuation of application No. 12/883,796, filed on Sep. 16, 2010, now Pat. No. 8,495,336.

(51) Int. Cl.
*G06F 12/00* (2006.01)
*G06F 12/16* (2006.01)
*G06F 13/16* (2006.01)

(52) U.S. Cl.
CPC .......... *G06F 3/0631* (2013.01); *G06F 3/0659* (2013.01); *G06F 3/0679* (2013.01); *G06F 12/00* (2013.01); *G06F 12/16* (2013.01); *G06F 3/0608* (2013.01); *G06F 3/0611* (2013.01); *G06F 3/0638* (2013.01); *G06F 3/0644* (2013.01); *G06F 3/0665* (2013.01); *G06F 3/0688* (2013.01); *G06F 2212/1016* (2013.01); *G06F 2212/214* (2013.01); *G06F 2212/7202* (2013.01); *G06F 2212/7205* (2013.01)

(58) Field of Classification Search
CPC ........ G06F 12/00; G06F 12/16; G06F 3/0608; G06F 3/0611; G06F 3/0638; G06F 3/0644; G06F 3/0665; G06F 3/0688; G06F 2212/1016; G06F 2212/214; G06F 2212/7202; G06F 2212/7205
USPC ........................................................ 711/103
See application file for complete search history.

(56) References Cited

U.S. PATENT DOCUMENTS

| 11,269,766 | B2 * | 3/2022 | Fukutomi | ............... G06F 3/061 |
|---|---|---|---|---|
| 2006/0161724 | A1 | 7/2006 | Bennett | |
| 2007/0033325 | A1 | 2/2007 | Sinclair | |
| 2007/0143378 | A1 | 6/2007 | Gorobets | |
| 2008/0307192 | A1 | 12/2008 | Sinclair | |
| 2009/0089482 | A1 | 4/2009 | Traister | |
| 2009/0150605 | A1 | 6/2009 | Flynn | |
| 2009/0177944 | A1 | 7/2009 | Kanno | |
| 2009/0222628 | A1 | 9/2009 | Yano et al. | |
| 2009/0327604 | A1 | 12/2009 | Sato et al. | |
| 2009/0327802 | A1 | 12/2009 | Fukutomi et al. | |
| 2009/0327803 | A1 | 12/2009 | Fukutomi et al. | |
| 2010/0005228 | A1 | 1/2010 | Fukutomi et al. | |
| 2010/0037009 | A1 | 2/2010 | Yano et al. | |
| 2010/0049907 | A1 | 2/2010 | Kitsunai et al. | |
| 2010/0077266 | A1 | 3/2010 | Kanno et al. | |
| 2010/0161885 | A1 | 6/2010 | Kanno et al. | |
| 2010/0169553 | A1 | 7/2010 | Yano et al. | |
| 2010/0223531 | A1 | 9/2010 | Fukutomi et al. | |

FOREIGN PATENT DOCUMENTS

| JP | 2007-140628 | 6/2007 |
|---|---|---|
| JP | 2009-211192 | 9/2009 |
| JP | 2009-211204 | 9/2009 |
| KR | 10-2007-0031647 A | 3/2007 |

OTHER PUBLICATIONS

Office Action dated Nov. 8, 2011 in Japanese Patent Application No. 2010-063191 (w/ English Translation).
Office Action dated Apr. 24, 2012 in Japanese Patent Application No. 2010-063191 (w/ English Translation).
Office Action dated Aug. 21, 2012 in Korean Patent Application No. 10-2011-0018246 (w/ English Translation).
Office Action dated Apr. 1, 2015 in European Patent Application No. 11 156 162.7.

* cited by examiner

FIG.8

| LOGICAL ADDRESS | PHYSICAL ADDRESS ||
|---|---|---|
| | BLOCK NUMBER | PAGE NUMBER |
| | | |
| | | |
| : | : | : |
| | | |

FIG.9

| BLOCK NUMBER | VALID PAGE COUNTER | LOGICAL ADDRESS | VALID PAGE FLAG |
|---|---|---|---|
| | | : | : |
| | | | |
| | | : | : |
| | | | |
| : | : | : | : |
| | | : | : |
| | | | |
| | | : | : |
| | | | |

FIG.10

| BLOCK NUMBER | PAGE NUMBER |
|---|---|
| | |

| BLOCK NUMBER | VALID PAGE COUNTER | VALID PAGE FLAG |
|---|---|---|
| | | |
| | | |
| : | : | : |

|  | LOG-STRUCTURED BLOCK FOR HOST WRITE | LOG-STRUCTURED BLOCK FOR COMPACTION |
|---|---|---|
| TERM 1 | A | |
| TERM 2 | C | B |
| TERM 3 | D | |
| TERM 4 | E | |
| TERM 5 | F | |
| TERM 6 | H | G |

FIG.37

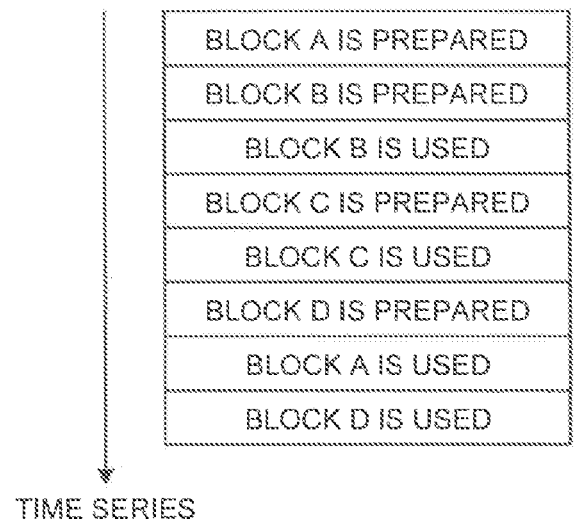

TIME SERIES

FIG.38

FLOW OF RESTORING PROCESS →

| LBA No | INITIAL STATE | AFTER RESTORING INFORMATION OF BLOCK A | AFTER RESTORING INFORMATION OF BLOCK B | AFTER RESTORING INFORMATION OF BLOCK C | AFTER RESTORING INFORMATION OF BLOCK D |
|---|---|---|---|---|---|
| LBA1 | N/A | A-0 | A-0 | A-0 | A-0 |
| LBA2 | N/A | A-1 | A-1 | A-1 | A-1 |
| LBA3 | N/A | A-2 | A-2 | A-2 | A-2 |
| LBA4 | N/A | A-3 | B-0 | B-0 | B-0 |
| LBA5 | N/A | N/A | B-1 | C-2 | C-2 |
| LBA6 | N/A | N/A | B-2 | C-3 | D-0 |
| LBA7 | N/A | N/A | B-3 | B-3 | D-1 |
| LBA8 | N/A | N/A | N/A | C-0 | C-0 |
| LBA9 | N/A | N/A | N/A | C-1 | D-2 |
| LBA10 | N/A | N/A | N/A | N/A | D-3 |

FIG.44

| LBA No | INITIAL STATE | FIRST GROUP OF BLOCKS — AFTER RESTORING INFORMATION OF BLOCK A | AFTER RESTORING INFORMATION OF BLOCK B | SECOND GROUP OF BLOCKS — AFTER RESTORING INFORMATION OF BLOCK C | AFTER RESTORING INFORMATION OF BLOCK D | THIRD GROUP OF BLOCKS — AFTER RESTORING INFORMATION OF BLOCK E | AFTER RESTORING INFORMATION OF BLOCK F |
|---|---|---|---|---|---|---|---|
| LBA1  | N/A | A-0 | A-0 | A-0 | A-0 | A-0 | A-0 |
| LBA2  | N/A | A-1 | A-1 | A-1 | D-3 | D-3 | D-3 |
| LBA3  | N/A | A-2 | A-2 | A-2 | A-2 | A-2 | A-2 |
| LBA4  | N/A | N/A | B-0 | B-0 | B-0 | E-0 | E-0 |
| LBA5  | N/A | N/A | B-1 | B-1 | D-2 | D-2 | D-2 |
| LBA6  | N/A | N/A | B-2 | B-2 | B-2 | D-3 | F-0 |
| LBA7  | N/A | N/A | B-3 | B-3 | B-3 | B-3 | F-1 |
| LBA8  | N/A | N/A | N/A | N/A | D-0 | D-0 | D-0 |
| LBA9  | N/A | N/A | N/A | N/A | D-1 | D-1 | F-2 |
| LBA10 | N/A | A-3 | A-3 | A-3 | A-3 | A-3 | F-3 |

FLOW OF RESTORING PROCESS →

FIG.45

| LOGICAL ADDRESS | PHYSICAL ADDRESS | | |
|---|---|---|---|
| | LOGICAL BLOCK NUMBER | CHANNEL NUMBER | PAGE NUMBER |
| | | | |
| | | | |
| ⋮ | ⋮ | ⋮ | ⋮ |
| | | | |

FIG.46

| LOGICAL BLOCK NUMBER | CH0 PHYSICAL BLOCK NUMBER | CH1 PHYSICAL BLOCK NUMBER | CH2 PHYSICAL BLOCK NUMBER | CH3 PHYSICAL BLOCK NUMBER | CH4 PHYSICAL BLOCK NUMBER | CH5 PHYSICAL BLOCK NUMBER |
|---|---|---|---|---|---|---|
| | | | | | | |
| | | | | | | |
| ⋮ | ⋮ | ⋮ | ⋮ | ⋮ | ⋮ | ⋮ |
| | | | | | | |

FIG.47

| LOGICAL BLOCK NUMBER | VALID PAGE COUNTER | CHANNEL NUMBER | LOGICAL ADDRESS | VALID PAGE FLAG |
|---|---|---|---|---|
| | | CH1 | : | : |
| | | CH2 | : | : |
| | | : | : | : |
| | | CH5 | : | : |
| : | : | : | : | : |
| | | : | : | : |
| | | : | : | : |
| | | : | : | : |
| | | CH1 | : | : |
| | | CH2 | : | : |
| | | : | : | : |
| | | CH5 | : | : |

FIG.48

|  | CH0 | CH1 | CH2 | CH3 | CH4 | CH5 |
|---|---|---|---|---|---|---|
| PAGE 0 | 1 | 2 | 3 | 4 | 5 | 6 |
| 1 | 7 | 8 | 9 | 10 | 11 | 12 |
| 2 | 13 | 14 | 15 | 16 | 17 | 18 |
| 3 | 19 | 20 | 21 | 22 | 23 | 24 |

CONTROLLER FOR CONTROLLING NON-VOLATILE SEMICONDUCTOR MEMORY AND METHOD OF CONTROLLING NON-VOLATILE SEMICONDUCTOR MEMORY

CROSS-REFERENCE TO RELATED APPLICATIONS

This application is a continuation of U.S. application Ser. No. 16/995,029, filed Aug. 17, 2020, which is a continuation of U.S. application Ser. No. 16/255,284, filed Jan. 23, 2019, which is a continuation of U.S. application Ser. No. 15/901,443 filed Feb. 21, 2018, which is a continuation of U.S. application Ser. No. 15/530,151 filed Dec. 8, 2016, which is a continuation of U.S. application Ser. No. 13/933,804 filed Jul. 2, 2013, which is a continuation of U.S. patent application Ser. No. 12/883,796 filed Sep. 16, 2010, which is based upon and claims the benefit of priority from Japanese Patent Application No. 2010-063191 filed Mar. 18, 2010; the entire contents of each of which are incorporated herein by reference.

FIELD

Embodiments described herein relate generally to a controller, a data storage device, and a program.

BACKGROUND

In the related art, in data storage devices, such as a hard disk drive (HDD) or a solid state drive (SSD), use states of storage media are managed using a variety of management information, such as a conversion table where a logical address (LBA: Logical Block Address) and a physical address (PBA: Physical Block Address) are associated with each other. The logical address is a logical address of a storage medium that can be recognized by a host device, such as a server computer, a controller of a storage system or a personal computer. The physical address is an address that indicates a physical storage position of the storage medium.

As an example of the storage medium of the data storage device, a semiconductor storage element, such as a NAND-type flash memory, is known. This storage medium disables a random read/write operation of data, and needs to read/write data in a unit called a page, constructs a storage area of a unit called a block where plural pages are collected. In order to write new data in data written pages or blocks, written data needs to be erased in a block unit. That is, data can be sequentially written in a page unit with respect to pages of data erased blocks where data is not yet written, and overwrite of data is disabled with respect to data written pages.

A unit of read/write when the host device performs a data read/write operation with respect to the data storage device is called a sector and is determined independently from a page unit or a block unit. For example, a block size is determined as 512 kilobytes, a page size is determined as 4 kilobytes, and a sector size is determined as 512 bytes.

In the data storage device using the storage medium having the above-mentioned constraints, a block managing method that uses a size of the integral multiple of a block size as a management size of data in management information is adopted. When random write is requested from the host device in the block managing method, the data storage device reads data, which is not updated by the write request and is included in data stored in one or more blocks corresponding to a logical address area that is a range of logical addresses where write is requested by the host device, in a temporary storage area. The data storage device merges the data with write object data. The data storage device executes a process of erasing one or more new write object blocks, writes the merged data, and updates the management information such that the logical address area and one or more new write object blocks correspond to each other.

As described above, in the block managing method, since a data written size and a data read size in the data storage device is significantly larger than a data write requested size requested from the host device, a process time may increase and random write performance may be significantly deteriorated.

For this reason, in the data storage device using the storage medium having the above-mentioned constraints, the random write performance is improved using a log-structured method (for example, refer to Mendel Rosenblum and John K. Ousterhout, "The LFS Storage Manager", Proceedings of the 1990 Summer Usenix, Anaheim, Calif., June 1990, pp. 315-324), which is executed by an operating system (OS) memory management or a file system.

In the data storage device using the log-structured method, write object data is sequentially written in ascending order of pages, regardless of a logical address designated by the write request from the host device. If a write request that designates a previously designated logical address again is made from the host device, the data storage device writes new write object data in a non-written page of a block where an erasing process is completed. The data storage device invalidates the page (page where data is written when the corresponding logical address is designated in the past) corresponding to the logical address in the management information, validates a page where new write object data is written, and associates the page with the corresponding logical address.

In the data storage device using the log-structured method, if the number of invalidated pages increases, the number of new blocks where data can be written and an erasing process is completed (i.e., the number of free blocks where data is not written after the erasing process) decreases and new data write may not be performed. For this reason, compaction (corresponding to garbage collection) is performed at appropriate timing.

In performing the compaction, the data storage device collects valid data stored in physical addresses that are not invalidated among the blocks including the invalidated pages, copies the valid data into a free block to move the valid data, and executes an erasing process on the blocks, from which the copy has been made, to generate a new free block. The data storage device can generate a free block from a write disabled block by performing the compaction. Even in a block where valid data is written by the move, if a non-written page exists, new write with respect to the page is enabled.

According to this log-structured method, since a data written size and a data read size in the data storage device do not become so larger than a data write requested size requested from the host device, high random write performance can be obtained. The lifespan of the semiconductor storage element generally depends on an erase count or a write count. In order to increase the design lifespan of the data storage device, the data written size in the data storage device is preferably smaller than the data write requested size requested from the host device.

Meanwhile, in an access pattern with respect to the data storage device, address locality generally exists. In the log-structured method described above, since the address locality of the access pattern is not considered, ordinary use performance cannot be sufficiently improved.

BRIEF DESCRIPTION OF THE DRAWINGS

FIG. 8 is a diagram showing an example of the data configuration of a forward lookup table;

FIG. 9 is a diagram showing an example of the data configuration of a backward lookup table, a valid page flag, and a valid page counter;

FIG. 10 is a diagram showing an example of the data configuration of a host write log-structured pointer;

FIG. 37 is a diagram showing an example of a restoring process that is not in accordance with constraints;

FIG. 38 is a diagram showing an example of a restoring process that is not in accordance with constraints;

FIG. 44 is a diagram showing an example of a restoring process that is in accordance with constraints;

FIG. 45 is a diagram showing an example of the data configuration of an LBA table;

FIG. 46 is a diagram showing an example of the data configuration of a logical/physical conversion table;

FIG. 47 is a diagram showing an example of the data configuration of a backward lookup table, a valid page flag, and a valid page counter; and FIG. 48 is a diagram showing an example of an advancing method of a log-structured pointer.

DETAILED DESCRIPTION

In general, according to one embodiment, a write instructing unit instructs a data access unit to write, in a storage area of a data storage unit indicated by a first physical address, write object data, instructs a management information access unit to update address conversion information, and instructs a first access unit to update the first physical address. A compaction unit extracts a physical address of compaction object data, instructs the data access unit to read the compaction object data stored in a storage area of the data storage unit indicated by the physical address, instructs the data access unit to write the compaction object data in a storage area of the data storage unit indicated by a second physical address, instructs the management information access unit to update the address conversion information, and instructs a second access unit to update the second physical address.

Hereinafter, a controller, a data storage device, and a program according to embodiments will be described in detail with reference to the accompanying drawings. In the following embodiments, an SSD is exemplified as the data storage device, but the invention is not limited thereto. In the following embodiments, the case where a data management unit in the data storage device has a size equal to a page size is exemplified, but the invention is not limited thereto. For example, one page may store plural data management units (data management unit may have a size smaller than the page size) or plural continuous pages may store one data management unit (data management unit may have a size larger than the page size).

First Embodiment

In the first embodiment, the case where a storage area to store (add) write object data for a host write request and a storage area to add compaction object data for compaction are independently secured is exemplified.

First, the configuration of the data storage device according to the first embodiment will be described.

Figure 1:
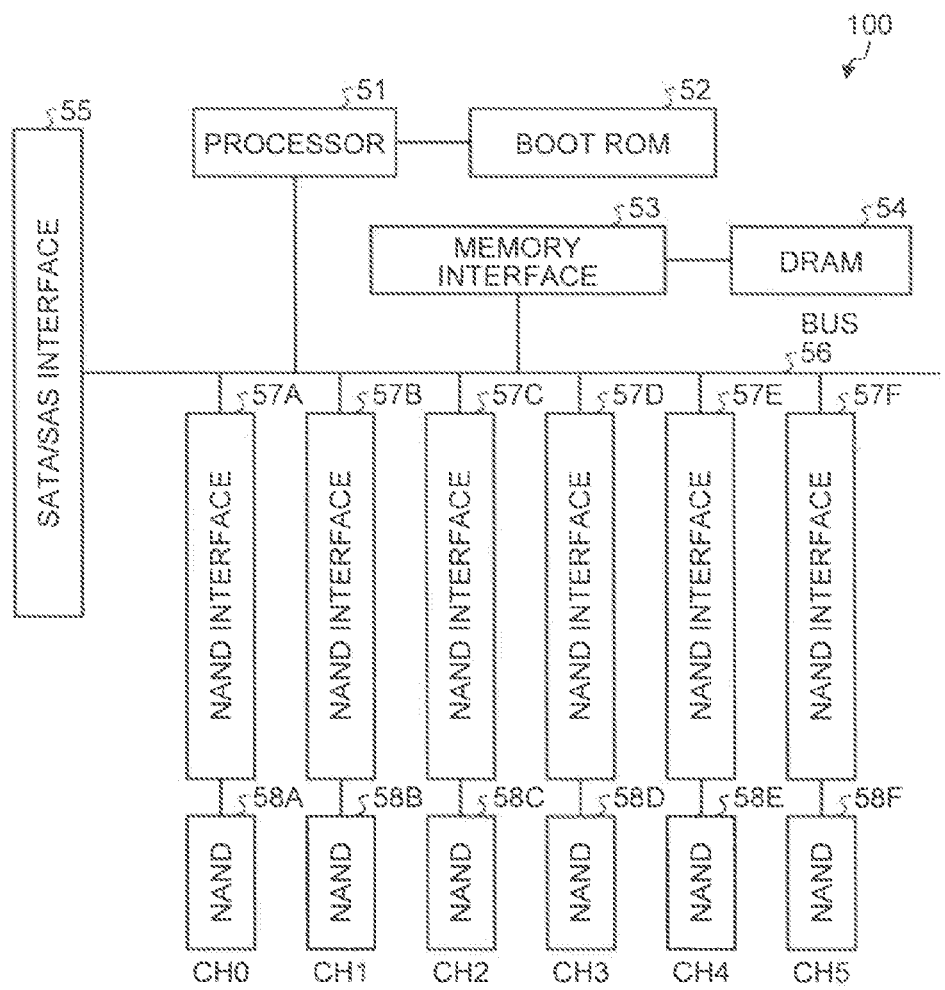
FIG. 1 is a block diagram showing an example of the hardware configuration of a data storage device according to a first embodiment.

FIG. 1 is a block diagram showing an example of the hardware configuration of a data storage device 100 according to the first embodiment. As shown in FIG. 1, the data storage device 100 includes a processor 51, a Boot read only memory (ROM) 52, a memory interface 53, a dynamic random access memory (DRAM) 54, a SATA/SAS interface 55, NAND interfaces 57A to 57F, NANDs (semiconductor storage media) 58A to 58F, and a bus 56 that connects these elements. In the description below, when the NAND interfaces 57A to 57F do not need to be distinguished from each other, the NAND interfaces 57A to 57F may be simply called the NAND interface 57. Likewise, when the NANDs 58A to 58F do not need to be distinguished from each other, the NANDs 58A to 58F may be simply called the NAND 58.

The Boot ROM 52 stores a program that is executed when power is supplied to the data storage device 100. The NAND 58 stores various system programs. The SATA/SAS interface 55 controls communication with a host device (not shown in the drawings), under the control of the processor 51.

The processor 51 reads a program from the Boot ROM 52 and executes the program, when power is supplied, and transfers the various system programs stored in the NAND 58 to the DRAM 54 according to the corresponding program. The processor 51 executes the system programs that are transferred to the DRAM 54 to control the entire data storage device 100, and realizes various functions. Specifically, the processor 51 executes the system programs that are transferred to the DRAM 54, interprets a command transmitted from the host device through the SATA/SAS interface 55, and controls write of data with respect to the NAND 58 or read of data from the NAND 58 according to the interpreted command. The processor 51 controls a compaction process as needed. All or part of the various programs may be replaced by a circuit that realizes all or part of the processes realized by the various system programs.

The memory interface 53 controls the DRAM 54. The DRAM 54 stores the various data or programs. The NAND interface 57 controls the NAND 58 and includes an error correcting circuit. The NAND 58 is composed of a storage element that is used in a NAND-type flash memory.

In an example shown in FIG. 1, the number of NANDs 58 is 6. This is because an access speed can be increased by connecting the plural NANDs 58 and collectively performing an access. However, the number of NANDs is not limited to 6. In the first embodiment, a process in a block unit is exemplified. However, when the plural NANDs 58 are connected and an access is performed, the process can be executed in a unit called a logical block where the plural blocks are connected.

Figure 2:
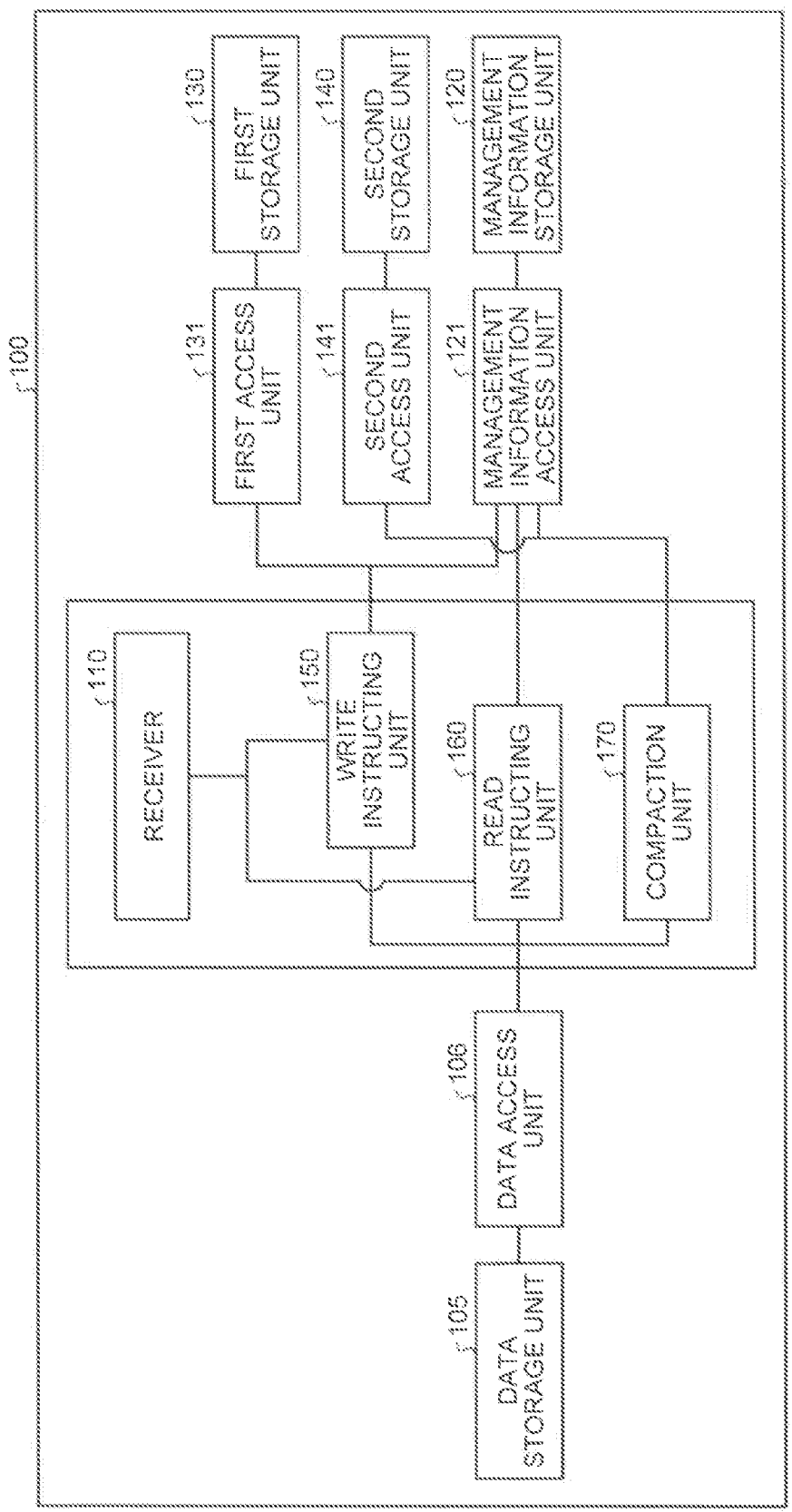
FIG. 2 is a block diagram showing an example of the functional configuration of the data storage device according to the first embodiment.

FIG. 2 is a block diagram showing an example of the outline of the functional configuration of the data storage device 100 according to the first embodiment. As shown in FIG. 2, the data storage device 100 includes a receiver 110, a management information storage unit 120, a management information access unit 121, a first storage unit 130, a first access unit 131, a second storage unit 140, a second access unit 141, a write instructing unit 150, a read instructing unit 160, a compaction unit 170, a data storage unit 105, and a data access unit 106.

The receiver 110 receives a write request from the host device. The write request includes information of a logical address area that corresponds to a range of logical addresses where the host device requests to write data and write data specification information that specifies write object data. The logical address is a logical address of the data storage device 100 that can be recognized by the host device. The write data specification information is information of the write object data or information that includes information of a storage place of the write object data.

The receiver 110 receives a read request from the host device. The read request includes information of a logical address area that corresponds to a range of logical addresses where the host device requests to read data. The read request may include storage place information that indicates a storage place of read data.

A function of the receiver 110 is realized by executing various system programs by the processor 51 and a function of the SATA/SAS interface 55.

The management information storage unit 120 stores management information. The management information that is information needed to operate the data storage device 100 includes address conversion information in which a physical address and a logical address are associated with each other. The physical address indicates a physical storage position of data that is stored in the data storage unit 105.

The first storage unit 130 stores a physical address which the write instructing unit 150 to be described below designates as the data write destination.

The second storage unit 140 stores a physical address which the compaction unit 170 to be described below designates as the data write destination.

All of the management information storage unit 120, the first storage unit 130, and the second storage unit 140 are realized by predetermined areas of the DRAM 54.

The management information access unit 121 receives a read instruction from the write instructing unit 150, the read instruction unit 160 or the compaction unit 170, reads management information from the management information storage unit 120, and provides the read management information to a read instruction origin (write instructing unit 150, the read instructing unit 160 or the compaction unit 170). The management information access unit 121 receives a write instruction from the write instructing unit 150 or the compaction unit 170 and writes the write instructed management information in the management information storage unit 120.

The first access unit 131 receives a read instruction from the write instructing unit 150, reads a physical address from the first storage unit 130, and provides the read physical address to the write instructing unit 150. The first access unit 131 receives a write instruction from the write instructing unit 150 and writes the write instructed physical address in the first storage unit 130.

The second access unit 141 receives a read instruction from the compaction unit 170, reads a physical address from the second storage unit 140, and provides the read physical address to the compaction unit 170. The second access unit 141 receives a write instruction from the compaction unit 170 and writes the write instructed physical address in the second storage unit 140.

All of the management information access unit 121, the first access unit 131, and the second access unit 141 are realized by a function of the memory interface 53.

The data storage unit 105 stores a variety of data such as user data where write is required from the host device. The data storage unit 105 is realized by the NAND 58.

The data access unit 106 receives a read instruction from the write instructing unit 150, the read instruction unit 160 or the compaction unit 170, reads data from the data storage unit 105, and provides the read data to a read instruction origin (write instructing unit 150, the read instructing unit 160 or the compaction unit 170). The data access unit 106 receives the write instruction from the write instructing unit 150 or the compaction unit 170 and writes the write instructed data in the data storage unit 105. The data access unit 106 is realized by a function of the NAND interface 57.

The write instructing unit 150 refers to the write data specification information that is included in the write request received by the receiver 110 and acquires write object data. The write instructing unit 150 instructs the first access unit 131 to read a physical address stored in the first storage unit 130, and acquires the physical address. The write instructing unit 150 instructs the data access unit 106 to write the acquired write object data in the storage position of the data storage unit 105 indicated by the acquired physical address. The write instructing unit 150 instructs the management information access unit 121 to write address conversion information of the write object data written in the data storage unit 105 in the management information storage unit 120. The write instructing unit 150 instructs the first access unit 131 to update the physical address stored by the first storage unit 130 and write the updated physical address.

The read instructing unit 160 extracts logical address area information of the read object data that is included in the read request received by the receiver 110. The read instructing unit 160 instructs the management information access unit 121 to read management information stored in the management information storage unit 120, and acquires the management information. The read instructing unit 160 extracts the physical address from the acquired management information, using the extracted logical address area information. The read instructing unit 160 instructs the data access unit 106 to read the read object data from the storage position of the data storage unit 105 indicated by the extracted physical address, and acquires the read object data. The read instructing unit 160 transmits a read reply to the host device through the receiver 110. The read reply is information of the read object data or information that includes information indicating that the read object data is stored in the place specified by the storage place information.

The compaction unit 170 instructs the management information access unit 121 to read the management information stored in the management information storage unit 120, and acquires the management information. The compaction unit 170 extracts a physical address of the compaction object data, using the acquired management information. When new data is written with respect to a certain logical address by the write instructing unit 150, the storage area of the data where write is previously performed with respect to the logical address indicating the same value becomes an invalidated storage area. The compaction object data is data that is stored in a non-invalidated storage area.

The compaction unit 170 instructs the data access unit 106 to read the compaction object data from the storage position of the data storage unit 105 indicated by the extracted physical address, and acquires the compaction object data. The compaction unit 170 instructs the second access unit 141 to read the physical address stored in the second storage unit 140, and acquires the physical address. The compaction unit 170 instructs the data access unit 106 to write the acquired compaction object data in the storage position of the data storage unit 105 indicated by the acquired physical address. The compaction unit 170 instructs the management information access unit 121 to write address conversion information of the compaction object data written in the data storage unit 105 in the management information storage unit 120. The compaction unit 170 instructs the second access unit 141 to update the physical address stored by the second storage unit 140 and write the updated physical address.

Functions of the write instructing unit 150, the read instructing unit 160, and the compaction unit 170 are realized by executing various system programs by the processor 51.

As described above, according to the first embodiment, since the storage area to store (add) the write object data for the host write request and the storage area to add the compaction object data for the compaction are independently secured, address locality of the access pattern can be considered and ordinary use performance can be improved.

Second Embodiment

In the first embodiment, the case where the storage area to store (add) the write object data for the host write request and the storage area to add the compaction object data for the compaction are independently secured is exemplified. When the host write process and the compaction process are independently executed, the host write process and the compaction process with respect to the same logical address area may be overlapped to each other, and consistency of the management information needs to be secured.

Accordingly, in the second embodiment, the case where the management information is finally updated to indicate a new page where data is written by the host write process, when the host write process and the compaction process with respect to the same logical address area are overlapped to each other, and consistency of the management information is secured is exemplified.

First, a method for securing the consistency of the management information will be described.

FIGS. 3 to 6 show a situation where the host write process and the compaction process with respect to the same logical address area are overlapped. In this situation, if the management information is finally updated to indicate a new page where data is written by the host write process, the consistency of the management information can be secured.

Figure 3:
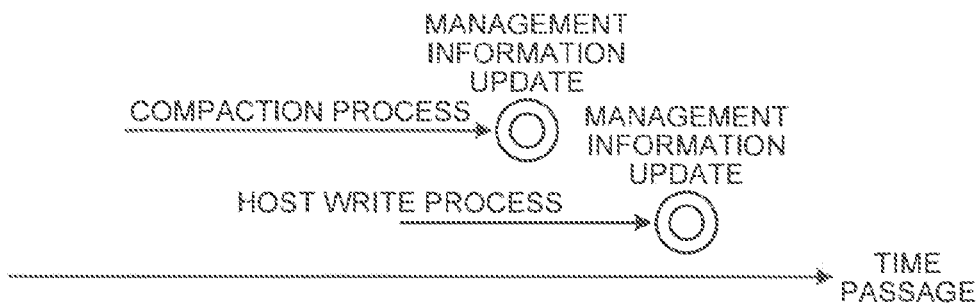
FIG. 3 is a diagram showing an example of a method for securing consistency of management information.

In an example shown in FIG. 3, the compaction process first starts, the host write process starts during the compaction process, and the compaction process is completed before the host write process is completed. In this case, the management information is updated by both the compaction process and the host write process, and the management information indicates a new page where data is written by the host write request.

Figure 4:
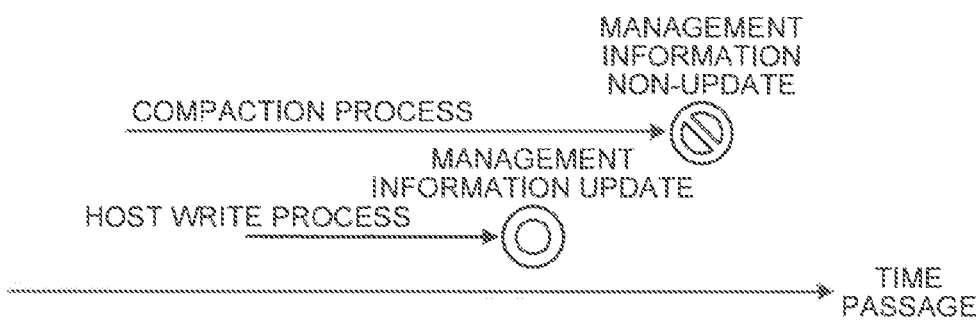
FIG. 4 is a diagram showing an example of a method for securing consistency of management information.

In an example shown in FIG. 4, the compaction process first starts, the host write process starts during the compaction process, and the host write process is completed before the compaction process is completed. In this case, the management information is not updated when the compaction process ends, and the management information indicates a new page where data is written by the host write request.

Figure 5:
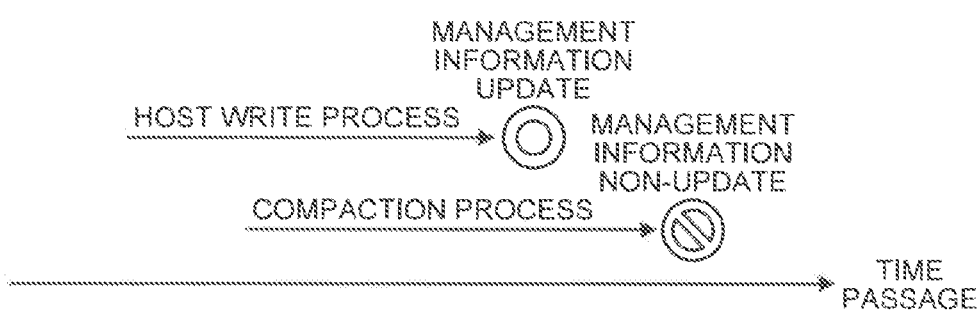
FIG. 5 is a diagram showing an example of a method for securing consistency of management information.

In an example shown in FIG. 5, the host write process first starts, the compaction process starts during the host write process, and the host write process is completed before the compaction process is completed. In this case, the management information is not updated when the compaction process ends, and the management information indicates a new page where data is written by the host write request.

Figure 6:
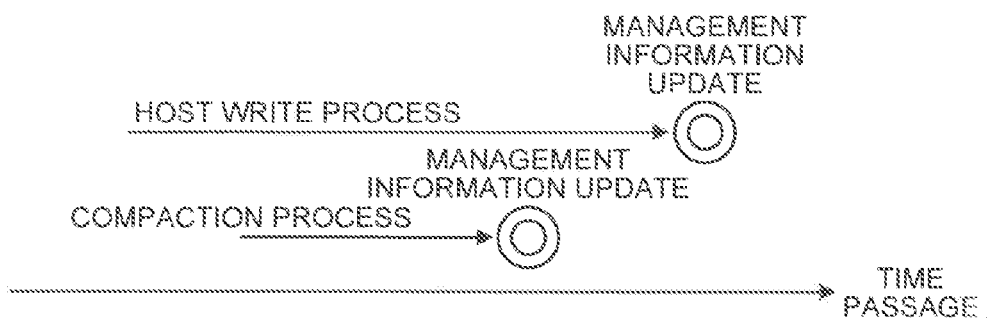
FIG. 6 is a diagram showing an example of a method for securing consistency of management information.

In an example shown in FIG. 6, the host write process first starts, the compaction process starts during the host write process, and the compaction process is completed before the host write process is completed. In this case, the management information is updated by both the compaction process and the host write process, and the management information indicates a new page where data is written by the host write request.

If the data storage device loses the management information, the data storage device cannot normally function. For this reason, it is needed to store the management information in the storage medium at arbitrary timing and restore the stored management information as needed.

The management information needs to be stored, whenever the management information is updated. However, if all of the management information is stored whenever the management information is updated, a storage time increases and the write amount with respect to the storage medium may also increase. Accordingly, all of the management information (snapshot) is stored at predetermined timing and differential information (log) is stored whenever the management information is updated.

The restoration of the management information is performed such that, after a newest snapshot stored in the storage medium is restored, a log that is stored after storage of the snapshot is sequentially applied to the restored snapshot in the order of time series. Thereby, management information at a point of time when a log is finally recorded can be restored.

If the storage area for the host write request and the storage area for the compaction are independently secured and the host write process and the compaction process are independently executed, the write destination based on the host write request and the access destination of the compaction process become discrete physical addresses on the storage medium. In the case of the data storage device that uses a semiconductor storage element such as the SSD as the storage medium, even though the corresponding physical addresses are discrete physical addresses when an access is given to the storage medium, a time penalty does not exist or can be ignored. Therefore, an advantageous effect that is obtained when the storage area for the host write request and the storage area for the compaction are independently secured and the host write process and the compaction process are independently executed increases. In the case of a data storage device that uses a disk such as an HDD as the storage medium, if corresponding physical addresses are discrete physical addresses when an access is given to the storage medium, a time penalty, such as a moving process time of a head or a rotation waiting time until cueing of data on the disk is completed, increases. Therefore, an advantageous effect that is obtained when the storage area for the host write request and the storage area for the compaction are independently secured and the host write process and the compaction process are independently executed decreases.

Next, the configuration of the data storage device according to the second embodiment will be described.

Figure 7:
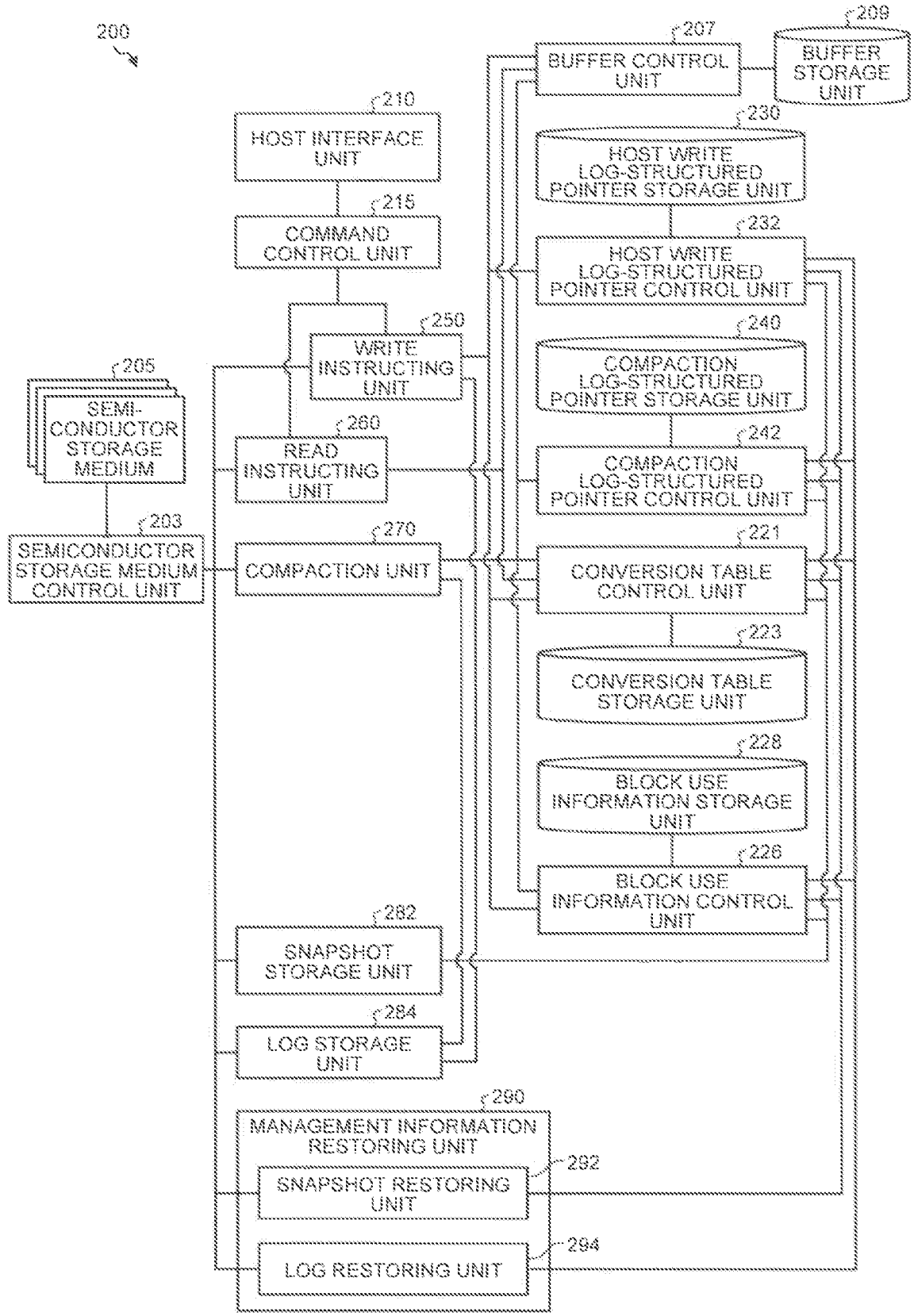
FIG. 7 is a block diagram showing an example of the functional configuration of a data storage device according to a second embodiment.

FIG. 7 is a block diagram showing an example of the detailed function configuration of a data storage device 200 according to the second embodiment. As shown in FIG. 7, the data storage device 200 includes a semiconductor storage medium control unit 203, a semiconductor storage medium 205, a conversion table control unit 221, a conversion table storage unit 223, a host write log-structured pointer control unit 232, a host write log-structured pointer storage unit 230, a compaction log-structured pointer control unit 242, a compaction log-structured pointer storage unit 240, a block use information control unit 226, a block use information storage unit 228, a buffer control unit 207, a buffer storage unit 209, a host interface unit 210, a command control unit 215, a write instructing unit 250, a read instructing unit 260, a compaction unit 270, a snapshot storage unit 282, a log storage unit 284, a management information restoring unit 290, a snapshot restoring unit 292, and a log restoring unit 294.

The semiconductor storage medium control unit 203 controls read/write of data with respect to the semiconductor storage medium 205, and gives support to having access to the semiconductor storage medium 205 from the write instructing unit 250, the read instructing unit 260, the compaction unit 270, the snapshot storage unit 282, the log storage unit 284, the snapshot restoring unit 292, and the log restoring unit 294. A function of the semiconductor storage medium control unit 203 is realized by executing various system programs by the processor 51 and a function of the NAND interface 57.

If the semiconductor storage medium control unit 203 receives a read request of data of the designated physical address area from the write instructing unit 250, the read instructing unit 260 or the compaction unit 270, the semiconductor storage medium control unit 203 reads data from the designated physical address area of the semiconductor storage medium 205 and provides the read data to a read request origin. If the semiconductor storage medium control unit 203 receives write object data and a write request of data with respect to the designated physical address area from the write instructing unit 250, the read instructing unit 260 or the compaction unit 270, the semiconductor storage medium control unit 203 writes the received write object data in the designated physical address area of the semiconductor storage medium 205.

If a read request or a write request is continuously issued from the write instructing unit 250, the read instructing unit 260 or the compaction unit 270, the semiconductor storage medium control unit 203 continuously executes the requested processes. Now a situation is considered where a read request or write request is/has already been separately or continuously issued from a functional unit other than the functional unit issuing the continuous requests among the write instructing unit 250, the read instructing unit 260, and the compaction unit 270 to the semiconductor storage medium control unit 203. For example, a situation is considered where the compaction unit 270 continuously issues the requests so that the semiconductor storage medium control unit 203 is continuously executing the requested processes, and a write request is issued from the write instructing unit 250 or a write request has already been issued from the write instructing unit 250. In this case, the semiconductor storage medium control unit 203 does not execute a process of a next continuous request, but executes processes requested from the functional unit other than the functional unit issuing the continuous requests, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed.

If the semiconductor storage medium control unit 203 receives an erase request of the designated block from the write instructing unit 250 or the compaction unit 270, the semiconductor storage medium control unit 203 executes an erasing process of the designated block of the semiconductor storage medium 205.

If the semiconductor storage medium control unit 203 receives a data storage request from the snapshot storage unit 282 or the log storage unit 284, the semiconductor storage medium control unit 203 stores the storage requested data in a predetermined area of the semiconductor storage medium 205 or in an area that can be traced from information stored in the predetermined area of the semiconductor storage medium 205.

If the semiconductor storage medium control unit 203 receives a data read request from the snapshot restoring unit 292 or the log restoring unit 294, the semiconductor storage medium control unit 203 reads the requested data from a predetermined area of the semiconductor storage medium 205 or from an area that can be traced from information stored in the predetermined area of the semiconductor storage medium 205. The semiconductor storage medium control unit 203 provides the read data to the snapshot restoring unit 292 or the log restoring unit 294.

The semiconductor storage medium 205 corresponds to the data storage unit 105 and is composed of a NAND-type flash memory. A storage element, such as the NAND-type flash memory, disables random read/write, enables read/write in a unit called a page, and constructs a storage area of a unit called a block where plural pages are collected. The semiconductor storage medium 205 is constructed by collecting plural blocks. Plural semiconductor storage media 205 may be connected.

The conversion table control unit 221 controls having access to the conversion table that is stored by the conversion table storage unit 223, and gives support to having access to the conversion table storage unit 223 from the write instructing unit 250, the read instructing unit 260, the compaction unit 270, the snapshot storage unit 282, the snapshot restoring unit 292, and the log restoring unit 294. A function of the conversion table control unit 221 is realized by executing various system programs by the processor 51 and a function of the memory interface 53.

The conversion table control unit 221 receives an access request with respect to the conversion table, from the write instructing unit 250, the read instructing unit 260, the compaction unit 270, the snapshot storage unit 282, the snapshot restoring unit 292 or the log restoring unit 294, and executes a process according to the received access request.

The conversion table control unit 221 executes a lock process of the conversion table, such that the write instructing unit 250 or the compaction unit 270 performs exclusive control of the conversion table. The conversion table control unit 221 performs a lock releasing process of the conversion table, such that the write instructing unit 250 or the compaction unit 270 ends the exclusive control of the conversion table.

The conversion table storage unit 223 corresponds to a portion of the management information storage unit 120 and stores the conversion table. The conversion table includes a forward lookup table, a backward lookup table, a valid page flag, and a valid page counter.

The forward lookup table is a table that indicates a correspondence relationship of a logical address of data stored by the data storage device 200 and a physical address indicating a physical storage position where the corresponding data is actually stored in the semiconductor storage medium 205, and is used when the address is converted from the logical address to the physical address. FIG. 8 shows an example of the data configuration of the forward lookup table. As shown in FIG. 8, the forward lookup table uses the logical address as an index and includes the logical address and the physical address as an entry. The physical address includes a block number and a page number.

The backward lookup table is a table that indicates a correspondence relationship of a logical address of data stored by the data storage device 200 and a physical address indicating a physical storage position where the corresponding data is actually stored in the semiconductor storage medium 205, and is used when the address is converted from the physical address to the logical address, in contrast to the forward lookup table. The valid page flag shows a valid page corresponding to a page where valid data is written among pages included in the block, using a true/false value. The valid page counter shows the number of valid pages among the pages included in the block.

FIG. 9 shows an example of the data configuration of the backward lookup table, the valid page flag, and the valid page counter. As shown in FIG. 9, the backward lookup table, the valid page flag, and the valid page counter use a block number as an index and include the block number, the valid page counter, the logical address set, and the valid page flag set as an entry. The logical address set and the valid page flag set are arranged in order of the pages disposed in the block and can specify the page of the logical address or the valid page flag. A value of the valid page counter of the same block and the total number of true values of the valid page flags are matched with each other. The block number that becomes the index and the block number that becomes the entry of the forward lookup table are assigned with the same number in the same block.

The host write log-structured pointer control unit 232 controls having access to the host write log-structured pointer stored by the host write log-structured pointer storage unit 230, and gives support to having access to the host write log-structured pointer storage unit 230 from the write instructing unit 250, the snapshot storage unit 282, the snapshot restoring unit 292, and the log restoring unit 294. A function of the host write log-structured pointer control unit 232 is realized by executing various system programs by the processor 51 and a function of the memory interface 53.

The host write log-structured pointer control unit 232 receives an access request with respect to the host write log-structured pointer, from the write instructing unit 250, the snapshot storage unit 282, the snapshot restoring unit 292 or the log restoring unit 294, and executes a process according to the received access request.

The host write log-structured pointer storage unit 230 corresponds to the first storage unit 130 and stores the host write log-structured pointer. FIG. 10 shows an example of the data configuration of the host write log-structured pointer. As shown in FIG. 10, the host write log-structured pointer includes a block number and a page number. Thereby, a physical address of a next page where data is written can be recognized.

The compaction log-structured pointer control unit 242 controls having access to the compaction log-structured pointer that is stored by the compaction log-structured pointer storage unit 240, and gives support to having access to the compaction log-structured pointer storage unit 240 from the compaction unit 270, the snapshot storage unit 282, the snapshot restoring unit 292, and the log restoring unit 294. A function of the compaction log-structured pointer control unit 242 is realized by executing various system programs by the processor 51 and a function of the memory interface 53.

The compaction log-structured pointer control unit 242 receives an access request with respect to the compaction log-structured pointer, from the compaction unit 270, the snapshot storage unit 282, the snapshot restoring unit 292 or the log restoring unit 294, and executes a process according to the received access request.

The compaction log-structured pointer storage unit 240 corresponds to the second storage unit 140 and stores the compaction log-structured pointer. Similar to the host write log-structured pointer shown in FIG. 10, the compaction log-structured pointer includes a block number and a page number. Thereby, a physical address of a next page where data is written can be recognized.

The block use information control unit 226 controls having access to block use information stored by the block use information storage unit 228. The block use information indicates whether each block included in the semiconductor storage medium 205 is a non-used block or a used block. In this case, the non-used block is a block where data is not written or a block that is collected as a new write destination block, because it is determined that the previously written data is invalidated in all of the pages. The used block is a block that is previously allocated as a new write destination block and a block that is not collected as the non-used block, because it is not yet determined that the written data is invalidated in all of the pages. The block use information control unit 226 gives support to having access to the block use information storage unit 228 from the write instructing unit 250, the compaction unit 270, the snapshot storage unit 282, the snapshot restoring unit 292, and the log restoring unit 294. A function of the block use information control unit 226 is realized by executing various system programs by the processor 51 and a function of the memory interface 53.

The block use information control unit 226 receives an access request with respect to the block use information, from the write instructing unit 250, the compaction unit 270, the snapshot storage unit 282, the snapshot restoring unit 292 or the log restoring unit 294, and executes a process according to the received access request.

The block use information storage unit 228 corresponds to a portion of the management information storage unit 120 and stores the block use information. In the block use information, information indicating whether each block included in the semiconductor storage medium 205 is a non-used block or a used block is associated with each block. With respect to the blocks determined as defective blocks when the data storage device 200 is manufactured or operated, information indicating the defective blocks may be associated.

The buffer control unit 207 controls an input/output of data with respect to the buffer storage unit 209, and gives support to having access to the buffer storage unit 209 from the write instructing unit 250, the read instructing unit 260, and the compaction unit 270. A function of the buffer control unit 207 is realized by executing various system programs by the processor 51 and a function of the memory interface 53.

The buffer control unit 207 receives data to be input and a data input request, from the write instructing unit 250, the read instructing unit 260 or the compaction unit 270, and inputs the received data to the buffer storage unit 209. The buffer control unit 207 receives a data output request from the write instructing unit 250, the read instructing unit 260 or the compaction unit 270, outputs data corresponding to the received output request from the buffer storage unit 209, and provides the data to the data output request origin.

The buffer storage unit 209 stores, as a buffer, data and is realized by a predetermined area of the DRAM 54.

The host interface unit 210 corresponds to a partial function of the receiver 110 and controls communication between a host device such as a server computer, a controller of a storage system, and a personal computer and the data storage device 200.

The host interface unit 210 receives a command including a write command and a read command from the host device and issues a command execution notification to the command control unit 215 to execute a process according to a kind of the received command. The write command includes a write destination logical address of the data storage device 200 and a write data size. The read command includes a read destination logical address of the data storage device 200 and a read data size.

If the host interface unit 210 receives a request for requesting the host device to transmit data from the command control unit 215, the host interface unit 210 issues the received request for requesting the host device to transmit data. If the host interface unit 210 receives data that is transmitted from the host device and is to be received by the data storage device 200, the host interface unit 210 transmits the data to the command control unit 215.

If the host interface unit 210 receives a request for requesting the host device to receive data from the command control unit 215, the host interface unit 210 issues the received request for requesting the host device to receive data. If the host interface unit 210 receives a data reception request from the host device, the host interface unit 210 issues the received data reception request from the host device to the command control unit 215, and transmits the data, which is received from the command control unit 215 and is to be received by the host device, to the host device.

The command control unit 215 corresponds to a partial function of the receiver 110. If the command control unit 215 receives a command execution notification from the host interface unit 210, the command control unit 215 distributes a process to the write instructing unit 250 or the read instructing unit 260, according to the kind of the received command. A function of the command control unit 215 is realized by executing various system programs by the processor 51.

Figure 11:
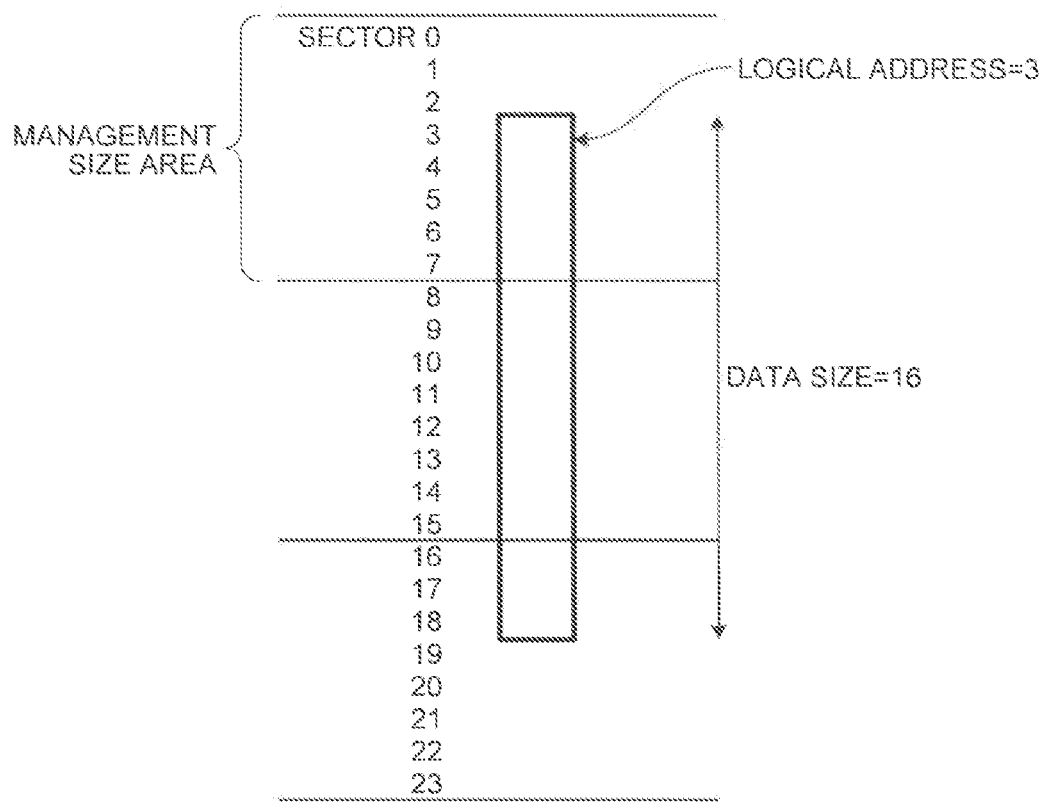
FIG. 11 is a diagram showing an example of a command dividing method.

When the command control unit 215 receives a write command or a read command from the host interface unit 210 and an area for the command is over a boundary of a management size area (page), the command control unit 215 divides the command by the boundary of the management size area. FIG. 11 shows a relationship between a write area of a write command, of which a write destination logical address is 3 and a write data size is 16, and the boundary of the management size area in the configuration where a sector size is 512 bytes and a management size is 4 kilobytes. In the case of an example shown in FIG. 11, the command control unit 215 divides the write command, of which the write destination logical address is 3 and the write data size is 16, into a write command having a write destination logical address of 3 and a write data size of 5, a write command having a write destination logical address of 8 and a write data size of 8, and a write command having a write destination logical address of 16 and a write data size of 3. The command control unit 215 notifies the write instructing unit 250 of the divided command when the divided command is a write command, and notifies the read instructing unit 260 of the divided command when the divided command is a read command. When the area of the write command or the read command received from the host interface unit 210 is not over the boundary of the management size area, the command control unit 215 notifies the write instructing unit 250 of the received command when the received command is a write command, and notifies the read instructing unit 260 of the received command when the received command is a read command.

If the command control unit 215 receives an execution notification of a command other than the write command or the read command from the host interface unit 210, the command control unit 215 executes an appropriate process.

If the command control unit 215 receives a request for requesting the host device to transmit data from the write instructing unit 250, the command control unit 215 transmits the received request for requesting the host device to transmit data to the host interface unit 210. If the command control unit 215 receives data transmitted by the host device from the host interface unit 210, the command control unit 215 transmits the received data to the write instructing unit 250.

If the command control unit 215 receives a request for requesting the host device to receive data from the read instructing unit 260, the command control unit 215 transmits the received request for requesting the host device to receive data to the host interface unit 210. If the command control unit 215 receives a data reception request from the host device from the host interface unit 210, the command control unit 215 transmits the received data reception request from the host device to the read instructing unit 260. If the command control unit 215 receives data to be received by the host device from the read instructing unit 260, the command control unit 215 transmits the received data to the host interface unit 210.

The write instructing unit 250 executes a process that corresponds to the write command. A function of the write instructing unit 250 is realized by executing various system programs by the processor 51.

The write instructing unit 250 receives a write command (including write commands that are divided by the command control unit 215) from the command control unit 215.

The write instructing unit 250 issues a request for requesting the host device to transmit data to the command control unit 215. If the write instructing unit 250 receives data transmitted by the host device from the command control unit 215, the write instructing unit 250 issues a storage request of the received data to the buffer control unit 207.

With respect to the write commands divided by the command control unit 215, the write instructing unit 250 may individually exchange data with the host device as described above or the command control unit 215 or the host interface unit 210 may collect the data and exchange the data with the host device at one time.

When a write data size of the write command is less than a management size (for example, as in the example shown in FIG. 11, a command that becomes a write command having a write destination logical address of 3 and a write data size of 5 as the division result: hereinafter, the command that becomes the write command having the write destination logical address of 3 and the write data size of 5 as the division result is called the example shown in FIG. 11), the write instructing unit 250 executes a padding process such that the write data becomes data corresponding to the management size. Specifically, the write instructing unit 250 inquires the conversion table control unit 221 of a physical address area that the remaining logical address area (area of a logical address of 0 and a data size of 3 in the example shown in FIG. 11) corresponds, and acquires information of the physical address area that the remaining logical address area corresponds. The write instructing unit 250 issues a read request of data of the acquired physical address area that the remaining logical address area corresponds to the semiconductor storage medium control unit 203, and issues a storage request of the read data to the buffer control unit 207. As a result, the buffer control unit 207 stores the data corresponding to the management size in the buffer storage unit 209 together with the data received from the command control unit 215.

The write instructing unit 250 inquires the host write log-structured pointer control unit 232 of a current host write log-structured pointer, acquires the host write log-structured pointer, and acquires information of a physical address area that the host write log-structured pointer corresponds.

The write instructing unit 250 issues an extraction request of the stored data corresponding to the management size to the buffer control unit 207, transmits the extracted data and the information of the physical address area that the acquired host write log-structured pointer corresponds to the semiconductor storage medium control unit 203, and requests the semiconductor storage medium control unit 203 to write the extracted data in the physical address area that the acquired host write log-structured pointer corresponds. When the acquired host write log-structured pointer indicates a head page of the block, the write instructing unit 250 requests the semiconductor storage medium control unit 203 to execute a block erasing process, before requesting the semiconductor storage medium control unit 203 to write data. However, execution timing of the block erasing process is not limited thereto. For example, the execution timing may be timing when a block for host write is newly allocated, timing when a block is collected as a non-used block or arbitrary timing during a period of time until the write instructing unit 250 requests the semiconductor storage medium control unit 203 to write data, after the block is collected as the non-used block.

The write instructing unit 250 requests the conversion table control unit 221 to resister a logical address of a head of the management size area including the area of the write command (logical address 0 in the example shown in FIG. 11) in the corresponding backward lookup table of the physical address area that the acquired host write log-structured pointer corresponds. The write instructing unit 250 notifies the log storage unit 284 of update information of the updated conversion table.

The write instructing unit 250 requests the conversion table control unit 221 to execute an exclusive control start process (lock process) of the conversion table.

The write instructing unit 250 updates the conversion table to indicate newly written data, during the exclusive control of the conversion table. Specifically, the write instructing unit 250 inquires the conversion table control unit 221 of a physical address (pre-update physical address) that corresponds to a logical address of the head of the management size area including the area of the write command (logical address 0 in the example shown in FIG. 11), before receiving the write command. The write instructing unit 250 requests the conversion table control unit 221 to cause a valid page flag that the acquired pre-update physical address corresponds to become OFF. The write instructing unit 250 requests the conversion table control unit 221 to decrement a valid page counter of a block that the acquired pre-update physical address corresponds. The write instructing unit 250 requests the conversion table control unit 221 to cause a valid page flag that the acquired host write log-structured pointer corresponds to become ON. The write instructing unit 250 requests the conversion table control unit 221 to increment a valid page counter of a block that the acquired host write log-structured pointer corresponds. The write instructing unit 250 requests the conversion table control unit 221 to update the logical address of the head of the management size area including the area of the write command (logical address 0 in the example shown in FIG. 11) of the forward lookup table to indicate the information of the physical address area that the host write log-structured pointer corresponds. The write instructing unit 250 notifies the log storage unit 284 of update information of the updated conversion table.

The write instructing unit 250 requests the conversion table control unit 221 to execute an exclusive control end process (lock releasing process) of the conversion table.

The write instructing unit 250 requests the host write log-structured pointer control unit 232 to update the host write log-structured pointer to indicate a next page. The write instructing unit 250 inquires the host write log-structured pointer control unit 232 of whether the updated host write log-structured pointer is over the final page of the block. If the write instructing unit 250 receives a reply indicating that the updated host write log-structured pointer is over the final page of the block, the write instructing unit 250 requests the block use information control unit 226 to execute an allocating process of a non-used block. As a result, the block use information is updated. The write instructing unit 250 requests the host write log-structured pointer control unit 232 to update the host write log-structured pointer to indicate a page of a head of a newly allocated block. The write instructing unit 250 notifies the log storage unit 284 of update information of the updated host write log-structured pointer and update information of the updated block use information.

The write instructing unit 250 requests the log storage unit 284 to commit the update information notified to the log storage unit 284.

The read instructing unit 260 executes a process corresponding to the read command. A function of the read instructing unit 260 is realized by executing various system programs by the processor 51.

The read instructing unit 260 receives a read command (including read commands that are divided by the command control unit 215) from the command control unit 215. The read instructing unit 260 inquires the conversion table control unit 221 of a physical address area that the logical address area of the received read command corresponds, and acquires information of the corresponding physical address area.

The read instructing unit 260 issues a read request of data of the acquired physical address area to the semiconductor storage medium control unit 203, and issues a storage request of the read data to the buffer control unit 207.

The read instructing unit 260 issues a request for requesting the host device to receive data to the command control unit 215. If the read instructing unit 260 receives a data reception request from the host device from the command control unit 215, the read instructing unit 260 issues an extraction request of the read data to the buffer control unit 207 and delivers the extracted data to the command control unit 215. With respect to the read commands divided by the command control unit 215, the read instructing unit 260 may individually exchange data with the host device as described above or the command control unit 215 or the host interface unit 210 may collect the data and exchange the data with the host device at one time.

The compaction unit 270 executes a compaction process at timing when the compaction process is needed or arbitrary timing. A function of the compaction unit 270 is realized by executing various system programs by the processor 51.

The compaction unit 270 inquires the block use information control unit 226 of a block number of the used block, and acquires the block number of the used block.

The compaction unit 270 inquires the conversion table control unit 221 of the block suitable for a compaction object among the acquired blocks, and acquires the block number of the block suitable for the compaction object and a valid page flag and a valid page counter of the corresponding block. The block that is suitable for the compaction object is a block where a value of the valid page counter is smallest. In this case, when the block where the value of the valid page counter is 0 is selected as the compaction object, the compaction unit 270 requests the block use information control unit 226 to register the corresponding block as a non-used block. As a result, the corresponding block is collected as the non-used block. When the corresponding block is collected as the non-used block, the compaction unit 270 notifies the log storage unit 284 of update information of the updated block use information.

The compaction unit 270 issues a read request of a physical address area that the acquired compaction object block number and valid page flag information correspond (copy origin page) to the semiconductor storage medium control unit 203. If the compaction unit 270 receives the read data, the compaction unit 270 issues a storage request of the received data to the buffer control unit 207.

The compaction unit 270 inquires the compaction log-structured pointer control unit 242 of a current compaction log-structured pointer, acquires the compaction log-structured pointer, and acquires information of the physical address area that the compaction log-structured pointer corresponds (copy destination page).

The compaction unit 270 issues an extraction request of the stored data to the buffer control unit 207, transmits the extracted data and the information of the physical address area that acquired compaction log-structured pointer corresponds (copy destination page) to the semiconductor storage medium control unit 203, and requests the semiconductor storage medium control unit 203 to write the extracted data in the physical address area that the acquired compaction log-structured pointer corresponds (copy destination page). When the acquired compaction log-structured pointer indicates a head page of the block, the compaction unit 270 requests the semiconductor storage medium control unit 203 to execute a block erasing process, before requesting the semiconductor storage medium control unit 203 to write data. However, timing at which the block erasing process is executed is not limited thereto. For example, the timing may be timing when a block for compaction is newly allocated, timing when a block is collected as a non-used block or arbitrary timing during a period of time until the compaction unit 270 requests the semiconductor storage medium control unit 203 to write data, after the block is collected as the non-used block.

The compaction unit 270 requests the conversion table control unit 221 to resister backward lookup logical address information of the physical address area that the acquired compaction object block number and valid page flag information correspond (copy origin page) in the corresponding backward lookup table of the physical address area that the acquired compaction log-structured pointer corresponds (copy destination page). The compaction unit 270 notifies the log storage unit 284 of update information of the updated conversion table.

The compaction unit 270 requests the conversion table control unit 221 to execute an exclusive control start process (lock process) of the conversion table.

The compaction unit 270 updates the conversion table to indicate data of a compaction destination, during the exclusive control of the conversion table. However, as described above, when a write process of the same logical address area as a logical address area that data being copied corresponds is completed by the write instructing unit 250 during the copy process of the data, the compaction unit 270 should not update the conversion table.

Specifically, the compaction unit 270 issues a reference request of the forward lookup table to the conversion table control unit 221 using backward lookup logical address information of the physical address area that the acquired compaction object block number and valid page flag information correspond (copy origin page), and acquires a physical address that corresponds to the backward lookup logical address information. The compaction unit 270 determines whether the physical address corresponding to the acquired backward lookup logical address information and the physical address area that the acquired compaction object block number and valid page flag information correspond (copy origin page) are matched with each other. When it is determined that the physical address and the physical address area are not matched with each other, this means that the write process of the same logical address area as the logical address area that the data being copied corresponds is completed by the write instructing unit 250 during the copy process of the data. For this reason, the compaction unit 270 ends the process during the exclusive control of the conversion table and does not update the conversion table. When it is determined that the physical address and the physical address area are matched with each other, this means that the write process of the same logical address area as the logical address area that the data being copied corresponds is not executed by the write instructing unit 250 or executed but not completed during the copy process of the data. For this reason, the compaction unit 270 updates the conversion table.

Specifically, the compaction unit 270 requests the conversion table control unit 221 to cause a valid page flag of a physical address area that the acquired compaction object block number and valid page flag information correspond (copy origin page) to become OFF. The compaction unit 270 requests the conversion table control unit 221 to decrement a valid page counter of a block that corresponds to the acquired compaction object block number. The compaction unit 270 requests the conversion table control unit 221 to cause a valid page flag of the physical address area that the acquired compaction log-structured pointer corresponds (copy destination page) to become ON. The compaction unit 270 requests the conversion table control unit 221 to increment a valid page counter of a block that the acquired compaction log-structured pointer corresponds. The compaction unit 270 requests the conversion table control unit 221 to update an entry of the forward lookup table indicated by the backward lookup logical address of the physical address area that the acquired compaction object block number and valid page flag information correspond (copy origin page) to indicate the physical address area information that the compaction log-structured pointer corresponds (copy destination page). The compaction unit 270 notifies the log storage unit 284 of update information of the updated conversion table. The compaction unit 270 requests the block use information control unit 226 to register the corresponding block as a non-used block, if the value of the valid page counter of the acquired compaction object block becomes 0. As a result, the corresponding block is collected as the non-used block. When the corresponding block is collected as the non-used block, the compaction unit 270 notifies the log storage unit 284 of update information of the updated block use information.

The compaction unit 270 requests the conversion table control unit 221 to execute an exclusive control end process (lock releasing process) of the conversion table.

The compaction unit 270 requests the compaction log-structured pointer control unit 242 to update the compaction log-structured pointer to indicate a next page. The compaction unit 270 inquires the compaction log-structured pointer control unit 242 of whether the updated compaction log-structured pointer is over the final page of the block. If the compaction unit 270 receives a reply indicating that the updated compaction log-structured pointer is over the final page of the block, the compaction unit 270 requests the block use information control unit 226 to execute an allocating process of a non-used block. As a result, the block use information is updated. The compaction unit 270 requests the compaction log-structured pointer control unit 242 to update the compaction log-structured pointer to indicate a page of a head of a newly allocated block. The compaction unit 270 notifies the log storage unit 284 of update information of the updated compaction log-structured pointer and update information of the updated block use information.

The compaction unit 270 requests the log storage unit 284 to commit the update information notified to the log storage unit 284.

The snapshot storage unit 282 executes a snapshot storage process at timing when the snapshot storage process is needed or arbitrary timing. A function of the snapshot storage unit 282 is realized by executing various system programs by the processor 51.

The snapshot storage unit 282 requests the log storage unit 284 to store a log of information indicating a snapshot record start. Thereby, an order relationship of record times of the snapshot and the log can be recognized.

The snapshot storage unit 282 requests the conversion table control unit 221 to extract the conversion table, and acquires the conversion table. The snapshot storage unit 282 requests the host write log-structured pointer control unit 232 to extract the host write log-structured pointer, and acquires the host write log-structured pointer. The snapshot storage unit 282 requests the compaction log-structured pointer control unit 242 to extract the compaction log-structured pointer, and acquires the compaction log-structured pointer. The snapshot storage unit 282 requests the block use information control unit 226 to extract the block use information, and acquires the block use information.

The snapshot storage unit 282 requests the semiconductor storage medium control unit 203 to store the acquired conversion table, the acquired host write log-structured pointer, the acquired compaction log-structured pointer, and the acquired block use information, and records the snapshot. If a physical address of the semiconductor storage medium 205 where the snapshot or the log is recorded cannot be previously recognized, the management information cannot be restored when power is supplied to the data storage device 200. For this reason, the physical address of the semiconductor storage medium 205 where the snapshot or the log is recorded is made to indicate a predetermined area of the semiconductor storage medium 205 or an area that can be traced from information recorded in the predetermined area of the semiconductor storage medium 205.

The snapshot storage unit 282 requests the log storage unit 284 to store a log of information indicating a snapshot record end. Thereby, an order relationship of record times of the snapshot and the log can be recognized.

The log storage unit 284 executes a log storage process. A function of the log storage unit 284 is realized by executing various system programs by the processor 51.

The log storage unit 284 receives a notification of update information of a variety of information from the write instructing unit 250 or the compaction unit 270, and temporarily stores the received update information.

The log storage unit 284 receives a commitment notification from the write instructing unit 250 or the compaction unit 270, requests the semiconductor storage medium control unit 203 to store the temporarily stored update information, and records the temporarily stored update information as a log. The log storage unit 284 receives a storage notification of a log of information indicating a snapshot record start from the snapshot storage unit 282, requests the semiconductor storage medium control unit 203 to store the received log of the information indicating the snapshot record start, and records the information as the log. The log storage unit 284 receives a storage notification of a log of information indicating a snapshot record end from the snapshot storage unit 282, requests the semiconductor storage medium control unit 203 to store the received log of the information indicating the snapshot record end, and records the information as the log.

Figure 12:
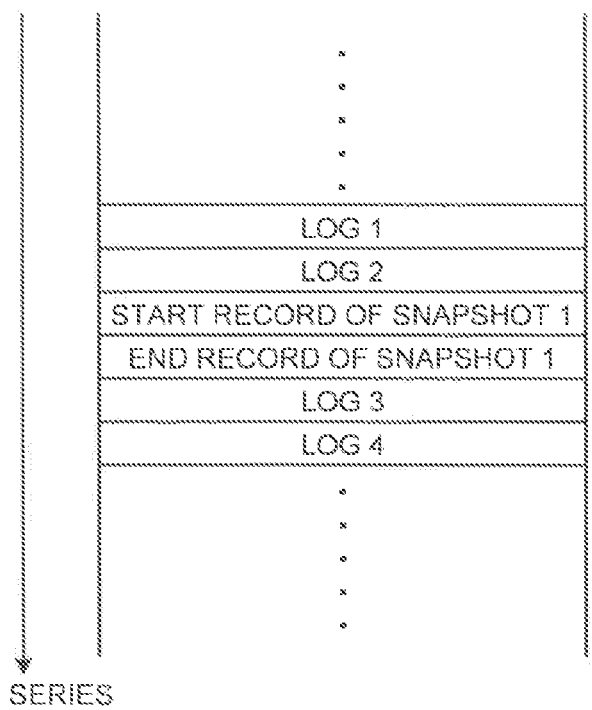
FIG. 12 is a diagram showing an example of a log.

An example of the log that the log storage unit 284 stores through the semiconductor storage medium control unit 203 is shown in FIG. 12. As shown in FIG. 12, the log storage unit 284 arranges logs in time series in reception order of log commitment process requests. In this case, if it is detected that the record of the snapshot ends, since logs before the snapshot record start (logs 1 and 2 in an example shown in FIG. 12) and the previously recorded snapshot become unnecessary in a management information restoring process, the log storage unit 284 frees the logs before the snapshot record start and the previously recorded snapshot as a new data storage area.

The management information restoring unit 290 executes a management information restoring process, when the management information needs to be restored. A function of the management information restoring unit 290 is realized by executing various system programs by the processor 51. The management information restoring unit 290 requests the snapshot restoring unit 292 to restore a newest snapshot. The management information restoring unit 290 requests the log restoring unit 294 to restore management information from a log stored after storage of the newest snapshot.

The snapshot restoring unit 292 restores the newest snapshot. A function of the snapshot restoring unit 292 is realized by executing various system programs by the processor 51.

If the snapshot restoring unit 292 receives a restoration request of the newest snapshot from the management information restoring unit 290, the snapshot restoring unit 292 issues an extraction request of the newest snapshot to the semiconductor storage medium control unit 203, and receives the newest snapshot.

The snapshot restoring unit 292 extracts the conversion table from the received snapshot, and requests the conversion table control unit 221 to store the extracted conversion table. The snapshot restoring unit 292 extracts the host write log-structured pointer from the received snapshot, and requests the host write log-structured pointer control unit 232 to store the extracted host write log-structured pointer. The snapshot restoring unit 292 extracts the compaction log-structured pointer from the received snapshot, and requests the compaction log-structured pointer control unit 242 to store the extracted compaction log-structured pointer. The snapshot restoring unit 292 extracts the block use information from the received snapshot, and requests the block use information control unit 226 to store the extracted block use information.

The log restoring unit 294 restores the management information from the log stored after storage of the newest snapshot. A function of the log restoring unit 294 is realized by executing various system programs by the processor 51.

If the log restoring unit 294 receives a restoration request of the management information from the log stored after storage of the newest snapshot from the management information restoring unit 290, the log restoring unit 294 issues an extraction request of the log stored after storage of the newest snapshot to the semiconductor storage medium control unit 203, and receives the log stored after storage of the newest snapshot. The log restoring unit 294 extracts the logs from the received logs in record order, and requests the conversion table control unit 221, the host write log-structured pointer control unit 232, the compaction log-structured pointer control unit 242 or the block use information control unit 226 to reflect update information of a variety of information recorded in the logs.

Next, the operation of the data storage device according to the second embodiment will be described.

Figure 13:
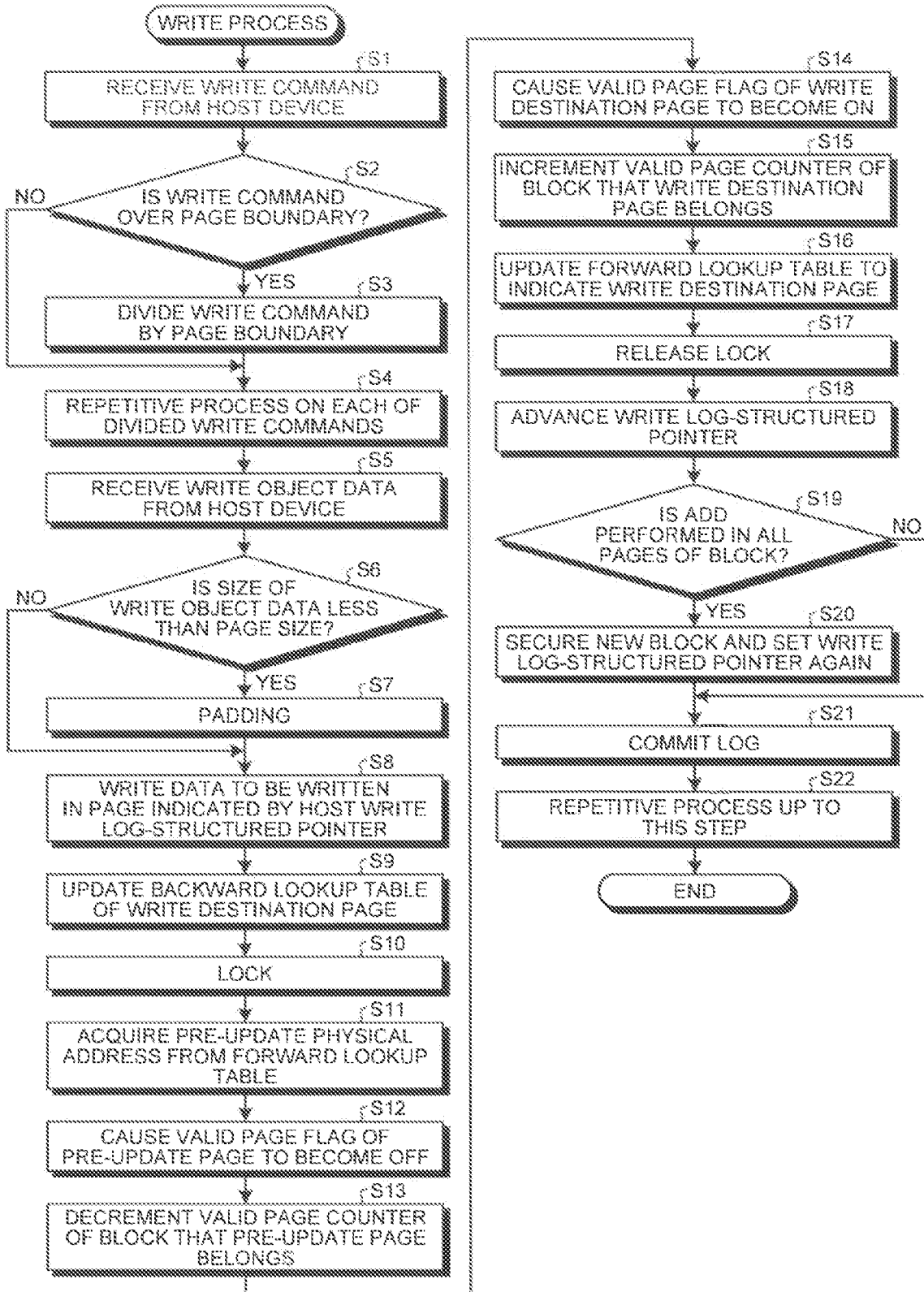
FIG. 13 is a flowchart showing an example of a write process of the data storage device according to the second embodiment.

First, a sequence of a write process that is executed by the data storage device 200 according to a write command from the host device will be described with reference to FIG. 13. FIG. 13 is a flowchart showing an example of a flow of a sequence of the write process executed by the data storage device 200. The data storage device 200 previously secures a non-used block to be used for the write command from the host device, in preparation for the write command from the host device.

In step S1, the host interface unit 210 receives the write command from the host device and issues a command execution notification to the command control unit 215 to execute a process according to the kind of the received command.

In step S2, if the command control unit 215 receives the write command from the host interface unit 210, the command control unit 215 investigates whether an area of the corresponding command is over the boundary of the management size area (page). When the area of the corresponding command is over the boundary of the management size area (page) (Yes in step S2), the process proceeds to step S3. Meanwhile, when the area of the corresponding command is not over the boundary of the management size area (page) (No in step S2), the process proceeds to step S4.

In step S3, the command control unit 215 divides the corresponding command by the boundary of the management size area. For example, as shown in FIG. 11, the command control unit 215 divides a write command, of which a write destination logical address is 3 and a write data size is 16, into a write command having a write destination logical address of 3 and a write data size of 5, a write command having a write destination logical address of 8 and a write data size of 8, and a write command having a write destination logical address of 16 and a write data size of 3.

In step S4, the command control unit 215 notifies the write instructing unit 250 of the divided commands. When the area of the write command received from the host interface unit 210 is not over the boundary of the management size area, the command control unit 215 notifies the write instructing unit 250 of the received command. Accordingly, the write instructing unit 250 repetitively executes the following processes, when the write command is divided.

In step S5, the write instructing unit 250 issues a request for requesting the host device to transmit data to the command control unit 215. If the command control unit 215 receives the request for requesting the host device to transmit data from the write instructing unit 250, the command control unit 215 transmits the received request for requesting the host device to transmit data to the host interface unit 210. If the host interface unit 210 receives the request for requesting the host device to transmit data from the command control unit 215, the host interface unit 210 issues the received request for requesting the host device to transmit data to the host device. If the host interface unit 210 receives data to be received by the data storage device 200 from the host device, the host interface unit 210 transmits the data to be received by the data storage device 200 to the command control unit 215. If the command control unit 215 receives the data transmitted by the host device from the host interface unit 210, the command control unit 215 transmits the received data to the write instructing unit 250. If the write instructing unit 250 receives the data transmitted by the host device from the command control unit 215, the write instructing unit 250 issues a storage request of the received data to the buffer control unit 207. With respect to the write commands divided by the command control unit 215, the write instructing unit 250 may individually exchange data with the host device as described above or the command control unit 215 or the host interface unit 210 may collect the data and exchange the data with the host device at one time. The buffer control unit 207 stores the designated data in the buffer storage unit 209.

In step S6, the write instructing unit 250 investigates whether the write data size of the write command is less than the management size. When the write data size is less than the management size (Yes in step S6), the process proceeds to step S7. When the write data size is not less than the management size (equal to the management size) (No in step S6), the process proceeds to step S8. The case where the write data size is less than the management size is the case of the write command having the write destination logical address of 3 and the write data size of 5, as in the example shown in FIG. 11.

In step S7, the write instructing unit 250 inquires the conversion table control unit 221 of a physical address area that the remaining logical address area (area having the logical address of 0 and the data size of 3 in the example shown in FIG. 11) corresponds. The conversion table control unit 221 refers to the conversion table stored by the conversion table storage unit 223, and provides information of the corresponding physical address area. The write instructing unit 250 acquires information of the physical address area that the acquired remaining logical address area corresponds, and issues a read request of data of the physical address area that the remaining logical address area corresponds to the semiconductor storage medium control unit 203. The semiconductor storage medium control unit 203 reads the data of the designated physical address area of the semiconductor storage medium 205 and provides the data. When the write request or the read request is continuously issued from the write instructing unit 250 and the requested processes are continuously executed, and the read request or the write request is issued from the read instructing unit 260 or the compaction unit 270 or has already been issued, the semiconductor storage medium control unit 203 does not execute a process of a next continuous request and executes a process requested from the read instructing unit 260 or the compaction unit 270, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed. The write instructing unit 250 issues a storage request of the read data to the buffer control unit 207. As a result, the buffer control unit 207 stores the data corresponding to the management size in the buffer storage unit 209 together with the data received from the command control unit 215. The buffer control unit 207 stores the designated data in the buffer storage unit 209.

In step S8, the write instructing unit 250 inquires the host write log-structured pointer control unit 232 of a current host write log-structured pointer. The host write log-structured pointer control unit 232 provides the host write log-structured pointer stored by the host write log-structured pointer storage unit 230. The write instructing unit 250 acquires the host write log-structured pointer and acquires information of the physical address area that the host write log-structured pointer corresponds. The write instructing unit 250 issues an extraction request of the stored data corresponding to the management size to the buffer control unit 207. The buffer control unit 207 extracts the designated data that is stored by the buffer storage unit 209 and provides the designated data. The write instructing unit 250 transmits the extracted data and the physical address area information that the acquired host write log-structured pointer corresponds to the semiconductor storage medium control unit 203, and requests the semiconductor storage medium control unit 203 to write the extracted data in the physical address area that the extracted host write log-structured pointer corresponds. When the acquired host write log-structured pointer indicates a head page of the block, the write instructing unit 250 requests the semiconductor storage medium control unit 203 to execute a block erasing process, before requesting the semiconductor storage medium control unit 203 to write data. However, execution timing of the block erasing process is not limited thereto. For example, the execution timing may be timing when a block for host write is newly allocated, timing when a block is collected as a non-used block or arbitrary timing during a period of time until the write instructing unit 250 requests the semiconductor storage medium control unit 203 to write data, after the block is collected as the non-used block. The semiconductor storage medium control unit 203 writes the designated data in the designated physical address area of the semiconductor storage medium. When the write request or the read request is continuously issued from the write instructing unit 250 and the requested processes are continuously executed, and the read request or the write request is issued from the read instructing unit 260 or the compaction unit 270 or has already been issued, the semiconductor storage medium control unit 203 does not execute a process of a next continuous request and executes a process requested from the read instructing unit 260 or the compaction unit 270, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed.

In step S9, the write instructing unit 250 requests the conversion table control unit 221 to register the logical address of the head of the management size area including the area of the write command (logical address 0 in the example shown in FIG. 11) in the backward lookup table that the acquired host write log-structured pointer corresponds. The conversion table control unit 221 registers the logical address of the head of the management size area including the area of the write command (logical address 0 in the example shown in FIG. 11) in the backward lookup table which is the conversion table stored by the conversion table storage unit 223 and to which the acquired host write log-structured pointer corresponds. The write instructing unit 250 notifies the log storage unit 284 of update information of the updated conversion table. The log storage unit 284 receives the update information of the updated conversion table.

In step S10, the write instructing unit 250 requests the conversion table control unit 221 to execute an exclusive control start process (lock process) of the conversion table. The conversion table control unit 221 executes the exclusive control start process (lock process) of the conversion table.

In step S11, the write instructing unit 250 inquires the conversion table control unit 221 of a physical address (pre-update physical address) that corresponds to the logical address of the head of the management size area including the area of the write command (logical address 0 in the example shown in FIG. 11), before receiving the write command. The conversion table control unit 221 refers to the conversion table that is stored by the conversion table storage unit 223, acquires the physical address (pre-update physical address) that corresponds to the logical address of the head of the management size area including the area of the write command (logical address 0 in the example shown in FIG. 11), before receiving the write command, and provides the physical address. The write instructing unit 250 acquires the physical address (pre-update physical address) that corresponds to the logical address of the head of the management size area including the area of the write command (logical address 0 in the example shown in FIG. 11), before receiving the write command.

In step S12, the write instructing unit 250 requests the conversion table control unit 221 to cause a valid page flag that the acquired pre-update physical address corresponds to become OFF. In step S13, the write instructing unit 250 requests the conversion table control unit 221 to decrement a valid page counter of a block that the acquired pre-update physical address corresponds. In step S14, the write instructing unit 250 requests the conversion table control unit 221 to cause a valid page flag that the acquired host write log-structured pointer corresponds to become ON. In step S15, the write instructing unit 250 requests the conversion table control unit 221 to increment a valid page counter of a block that the acquired host write log-structured pointer corresponds. In step S16, the write instructing unit 250 requests the conversion table control unit 221 to update the logical address of the head of the management size area including the area of the write command (logical address 0 in the example shown in FIG. 11) of the forward lookup table to indicate the information of the physical address area that the host write log-structured pointer corresponds. The conversion table control unit 221 updates the conversion table stored by the conversion table storage unit 223 according to an instruction. The write instructing unit 250 notifies the log storage unit 284 of update information of the updated conversion table.

In step S17, the write instructing unit 250 requests the conversion table control unit 221 to execute an exclusive control end process (lock releasing process) of the conversion table. The conversion table control unit 221 executes the exclusive control end process (lock releasing process) of the conversion table.

In step S18, the write instructing unit 250 requests the host write log-structured pointer control unit 232 to update the host write log-structured pointer to indicate a next page. The host write log-structured pointer control unit 232 updates the host write log-structured pointer to indicate a next page. The write instructing unit 250 notifies the log storage unit 284 of update information of the updated host write log-structured pointer.

In step S19, the write instructing unit 250 inquires the host write log-structured pointer control unit 232 of whether the updated host write log-structured pointer is over the final page of the block. The host write log-structured pointer control unit 232 investigates whether the updated host write log-structured pointer is over the final page of the block and provides the investigation result. If the write instructing unit 250 receives a reply indicating that the updated host write log-structured pointer is over the final page of the block, the process proceeds to step S20. Otherwise, the process proceeds to step S21.

In step S20, the write instructing unit 250 requests the block use information control unit 226 to execute an allocating process of a non-used block. As a result, the block use information is updated. The block use information control unit 226 selects the block of the non-used state from the block use information stored by the block use information storage unit 228, allocates the non-used block, and updates the block use information. The write instructing unit 250 requests the host write log-structured pointer control unit 232 to update the host write log-structured pointer to indicate a page of a head of a newly allocated block. The host write log-structured pointer control unit 232 updates the host write log-structured pointer stored by the host write log-structured pointer storage unit 230 to indicate a page of a head of a newly allocated block. The write instructing unit 250 notifies the log storage unit 284 of update information of the updated host write log-structured pointer and updated information of the updated block use information.

In step S21, the write instructing unit 250 requests the log storage unit 284 to commit the update information notified to the log storage unit 284. The log storage unit 284 receives a commitment notification from the write instructing unit 250, and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 200. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

In step S22, the process is repeated from step S4, as needed.

Figure 14:
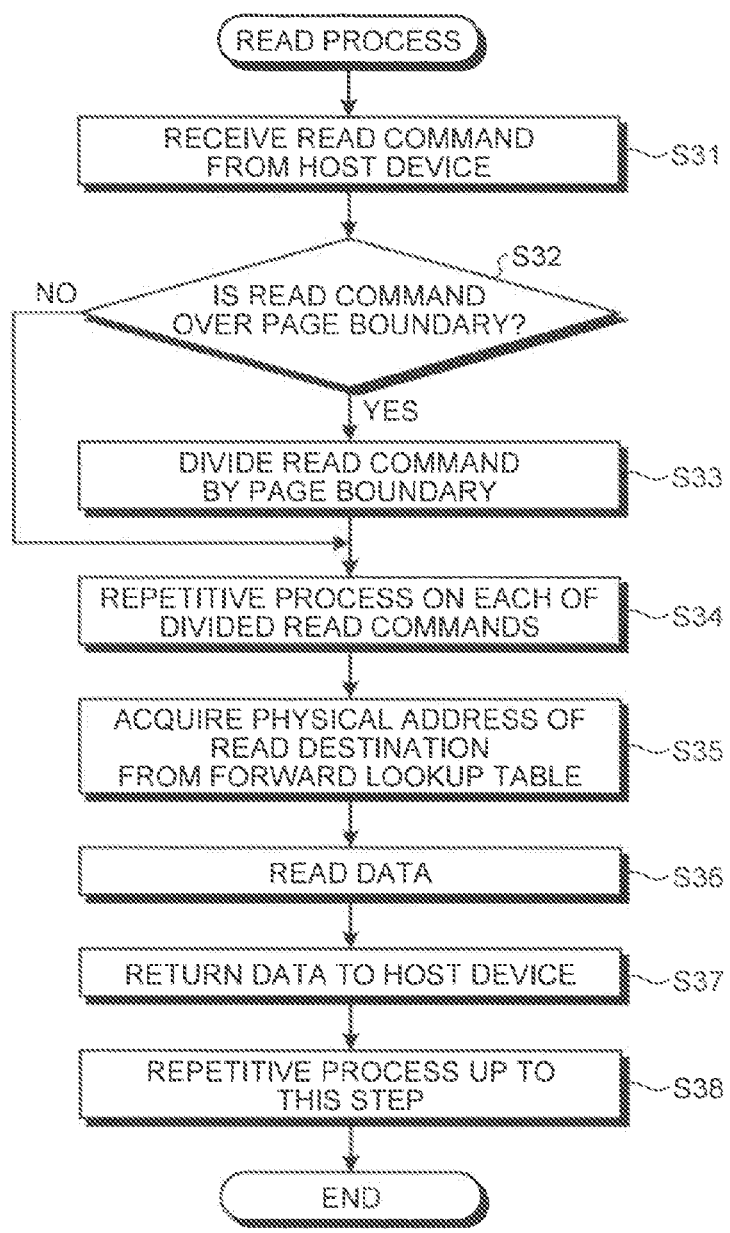
FIG. 14 is a flowchart showing an example of a read process of the data storage device according to the second embodiment.

Next, a sequence of a read process that is executed by the data storage device 200 according to a read command from the host device will be described with reference to FIG. 14. FIG. 14 is a flowchart showing an example of a flow of a sequence of the read process executed by the data storage device 200. In this case, it is assumed that the read requested data is previously written by the write command.

In step S31, the host interface unit 210 receives a read command from the host device and issues a command execution notification to the command control unit 215 to execute a process according to a kind of the received command.

In step S32, if the command control unit 215 receives the read command from the host interface unit 210, the command control unit 215 investigates whether the area of the corresponding command is over the boundary of the management size area (page). When the area of the corresponding command is over the boundary of the management size area (page) (Yes in step S32), the process proceeds to step S33. When the area of the corresponding command is not over the boundary of the management size area (page) (No in step S32), the process proceeds to step S34.

In step S33, the command control unit 215 divides the corresponding command by the boundary of the management size area. The command dividing process is the same as that in the case of the write process.

In step S34, the command control unit 215 notifies the read instructing unit 260 of the divided commands. When the area of the read command received from the host interface unit 210 is not over the boundary of the management size area, the command control unit 215 notifies the read instructing unit 260 of the received command. Accordingly, when the read command is divided, the read instructing unit 260 repetitively executes the following processes.

In step S35, the read instructing unit 260 inquires the conversion table control unit 221 of a physical address area that the logical address area of the received read command corresponds, and acquires information of the corresponding physical address area. The conversion table control unit 221 refers to the conversion table that is stored by the conversion table storage unit 223, and provides the physical address area information that the logical address area of the received read command corresponds. The read instructing unit 260 acquires the physical address area information that the logical address area of the received read command corresponds.

In step S36, the read instructing unit 260 issues a read request of data of the acquired physical address area to the semiconductor storage medium control unit 203. The semiconductor storage medium control unit 203 reads the data of the designated physical address area of the semiconductor storage medium and provides the data. When the read request is continuously issued from the read instructing unit 260 and the requested processes are continuously executed, and the read request or the write request is issued from the write instructing unit 250 or the compaction unit 270 or has already been issued, the semiconductor storage medium control unit 203 does not execute a process of a next continuous request and executes a process requested from the write instructing unit 250 or the compaction unit 270, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed. The read instructing unit 260 issues a storage request of the read data to the buffer control unit 207. The buffer control unit 207 stores the designated data in the buffer storage unit 209.

In step S37, the read instructing unit 260 issues a request for requesting the host device to receive data to the command control unit 215. If the command control unit 215 receives the request for requesting the host device to receive data from the read instructing unit 260, the command control unit 215 transmits the received request for requesting the host device to receive data to the host interface unit 210. If the host interface unit 210 receives the request for requesting the host device to receive data from the command control unit 215, the host interface unit 210 issues the received request for requesting the host device to receive data. If the host interface unit 210 receives a data reception request from the host device, the host interface unit 210 issues the received data reception request from the host device to the command control unit 215. If the command control unit 215 receives the data reception request from the host device through the host interface unit 210, the command control unit 215 transmits the received data reception request from the host device to the read instructing unit 260. If the read instructing unit 260 receives the data reception request from the host device from the command control unit 215, the read instructing unit 260 issues an extraction request of the read data to the buffer control unit 207. The buffer control unit 207 extracts the designated data that is stored by the buffer storage unit 209 and provides the extracted data. The read instructing unit 260 delivers the extracted data to the command control unit 215. If the command control unit 215 receives data to be received by the host device from the read instructing unit 260, the command control unit 215 transmits the received data to the host interface unit 210. The host interface unit 210 transmits the data, which is received from the command control unit 215 and is to be received by the host device, to the host device. With respect to the read commands divided by the command control unit 215, the read instructing unit 260 may individually exchange data with the host device as described above or the command control unit 215 or the host interface unit 210 may collect the data and exchange the data with the host device at one time.

In step S38, the process is repeated from step S34, as needed.

Figure 15:
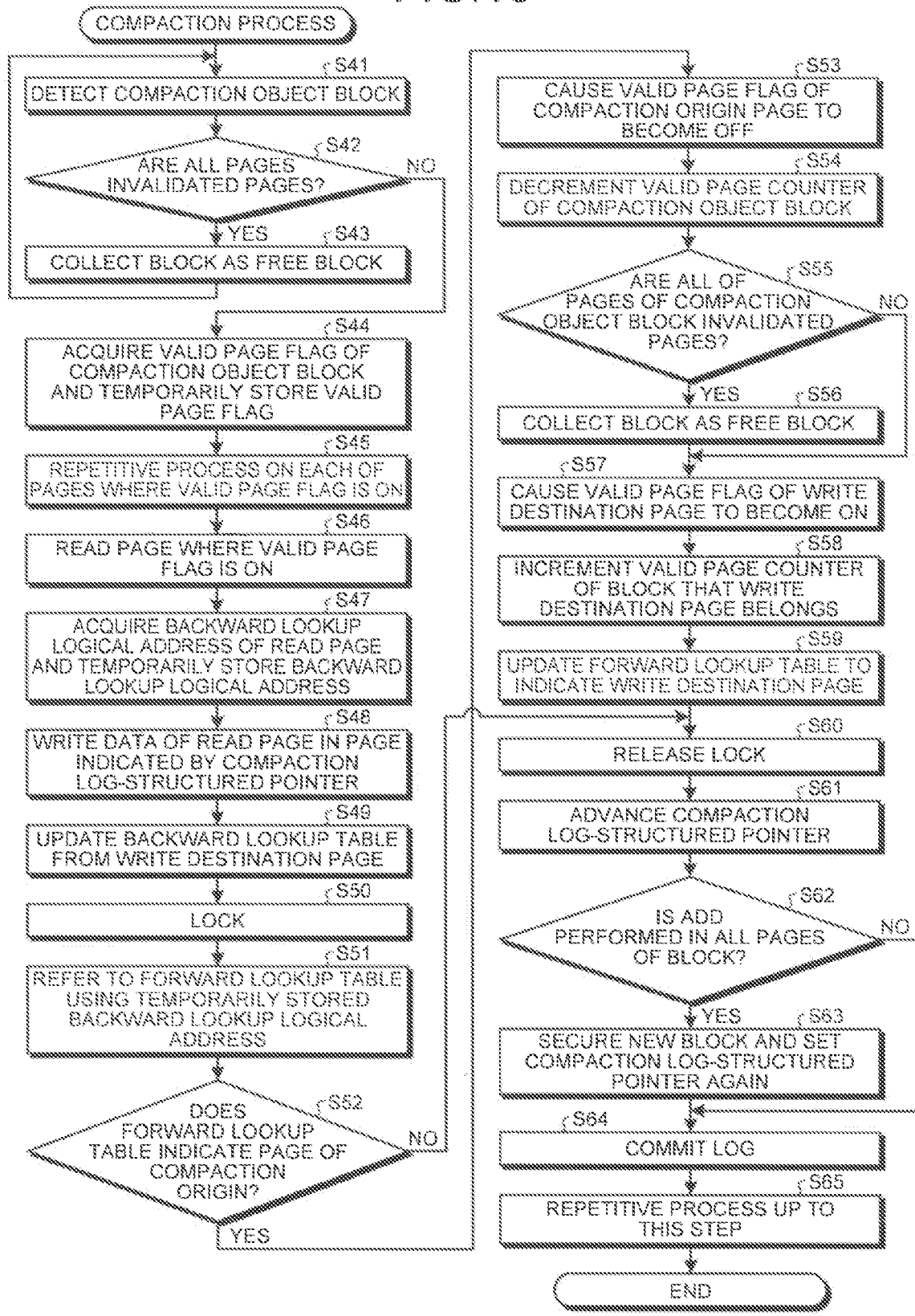
FIG. 15 is a flowchart showing an example of a compaction process of the data storage device according to the second embodiment.

Next, a sequence of a compaction process that is executed by the data storage device 200 will be described with reference to FIG. 15. FIG. 15 is a flowchart showing an example of a flow of a sequence of the compaction process executed by the data storage device 200. The data storage device 200 executes the compaction process at timing when the compaction process is needed or arbitrary timing. The timing at which the compaction process is needed can be determined by determining whether the number of non-used blocks recorded in the block use information is less than the predetermined threshold value.

In step S41, the compaction unit 270 inquires the block use information control unit 226 of a block number of the used block. The block use information control unit 226 refers to the block use information that is stored by the block use information storage unit 228, and provides the block number of the used block. The compaction unit 270 acquires the block number of the used block. The compaction unit 270 inquires the conversion table control unit 221 of the block suitable for a compaction object among the acquired blocks and the valid page flag and the valid page counter of the corresponding block. The block that is suitable for the compaction object is a block where a value of the valid page counter is smallest. The conversion table control unit 221 refers to the conversion table that is stored by the conversion table storage unit 223, extracts the block suitable for the compaction object among the acquired blocks, and provides the block number of the block suitable for the compaction object, the valid page flag and the valid page counter of the corresponding block. The compaction unit 270 acquires the block number of the block suitable for the compaction object, the valid page flag and the valid page counter of the corresponding block.

In step S42, the compaction unit 270 investigates whether the value of the valid page counter of the block selected as the compaction object is 0. When the value is 0, the process proceeds to step S43. When the value is not 0, the process proceeds to step S44.

In step S43, the compaction unit 270 requests the block use information control unit 226 to register the corresponding block as a non-used block. As a result, the corresponding block is collected as the non-used block. The block use information control unit 226 registers the corresponding block as the non-used block in the block use information stored by the block use information storage unit 228. As a result, the corresponding block is collected as the non-used block. The compaction unit 270 notifies the log storage unit 284 of update information of the updated block use information. Then, the process returns to step S41.

In step S44, the compaction unit 270 temporarily stores the acquired compaction object block number and valid page flag information.

In step S45, the compaction unit 270 repetitively executes the following processes, with respect to pages where the acquired valid page flag information is ON.

In step S46, the compaction unit 270 issues a read request of a physical address area that the acquired compaction object block number and valid page flag information correspond (copy origin page) to the semiconductor storage medium control unit 203. The semiconductor storage medium control unit 203 reads data of the designated physical address area of the semiconductor storage medium and provides the data. When the write request or the read request is continuously issued from the compaction unit 270 and the requested processes are continuously executed, and the read request or the write request is issued from the read instructing unit 260 or the write instructing unit 250 or has already been issued, the semiconductor storage medium control unit 203 does not execute a process of a next continuous request and executes a process requested from the read instructing unit 260 or the write instructing unit 250, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed. If the compaction unit 270 receives the read data, the compaction unit 270 issues a storage request of the received data to the buffer control unit 207. The buffer control unit 207 stores the designated data in the buffer storage unit 209.

In step S47, the compaction unit 270 inquires the conversion table control unit 221 of the backward lookup logical address information of the physical address area that the acquired compaction object block number and valid page flag information correspond (copy origin page). The conversion table control unit 221 refers to the conversion table that is stored by the conversion table storage unit 223, and provides the backward lookup logical address information of the physical address area that the acquired compaction object block number and valid page flag information correspond (copy origin page). The compaction unit 270 acquires the backward lookup logical address information of the physical address area that the acquired compaction object block number and valid page flag information correspond (copy origin page).

In step S48, the compaction unit 270 inquires the compaction log-structured pointer control unit 242 of a current compaction log-structured pointer. The compaction log-structured pointer control unit 242 provides the compaction log-structured pointer that is stored by the compaction log-structured pointer storage unit 240. The compaction unit 270 acquires the information of the physical address area that the compaction log-structured pointer corresponds (copy destination page). The compaction unit 270 issues an extraction request of the stored data to the buffer control unit 207. The buffer control unit 207 extracts the designated data that is stored by the buffer storage unit 209 and provides the extracted data. The compaction unit 270 acquires the storage data. The compaction unit 270 transmits the extracted data and the information of the physical address area that the acquired compaction log-structured pointer corresponds (copy destination page) to the semiconductor storage medium control unit 203, and requests the semiconductor storage medium control unit 203 to write the extracted data in the physical address area that the acquired compaction log-structured pointer corresponds (copy destination page). When the acquired compaction log-structured indicates a head page of the block, the compaction unit 270 requests the semiconductor storage medium control unit 203 to execute a block erasing process, before requesting the semiconductor storage medium control unit 203 to write data. However, timing at which the block erasing process is executed is not limited thereto. For example, the timing may be timing when a block for compaction is newly allocated, timing when a block is collected as a non-used block or arbitrary timing during a period of time until the compaction unit 270 requests the semiconductor storage medium control unit 203 to write data, after the block is collected as the non-used block. The semiconductor storage medium control unit 203 writes the designated data in the designated physical address area of the semiconductor storage medium 205. When the write request or the read request is continuously issued from the compaction unit 270 and the requested processes are continuously executed, and the read request or the write request is issued from the read instructing unit 260 or the write instructing unit 250 or has already been issued, the semiconductor storage medium control unit 203 does not execute a process of a next continuous request and executes a process requested from the read instructing unit 2660 or the write instructing unit 250, as needed. That is, the semiconductor storage medium control unit 203 switches the process as needed. The semiconductor storage medium control unit 203 executes a process of a next continuous request, as needed, if the process after the switching is completed. That is, the semiconductor storage medium control unit 203 restarts the switched process as needed.

In step S49, the compaction unit 270 requests the conversion table control unit 221 to resister corresponding backward lookup logical address information of the physical address area that the acquired compaction object block number and valid page flag information correspond (copy origin page), in the corresponding backward lookup table of the physical address area that the acquired compaction log-structured pointer corresponds (copy destination page). The conversion table control unit 221 resisters the corresponding backward lookup logical address information of the physical address area that the acquired compaction object block number and valid page flag information correspond (copy origin page), in the corresponding backward lookup table of the physical address area that the acquired compaction log-structured pointer corresponds (copy destination page), in the conversion table that is stored by the conversion table storage unit 223. The compaction unit 270 notifies the log storage unit 284 of update information of the updated conversion table.

In step S50, the compaction unit 270 requests the conversion table control unit 221 to execute an exclusive control start process (lock process) of the conversion table. The conversion table control unit 221 executes an exclusive control start process (lock process) of the conversion table.

In step S51, the compaction unit 270 issues a reference request of the forward lookup table to the conversion table control unit 221 using corresponding backward lookup logical address information of the physical address area that the acquired compaction object block number and valid page flag information correspond (copy origin page). The conversion table control unit 221 refers to the conversion table that is stored by the conversion table storage unit 223, refers to the forward lookup table using the corresponding backward lookup logical address information of the physical address area that the acquired compaction object block number and valid page flag information correspond (copy origin page), and provides information of a physical address area that corresponds to the backward lookup logical address information. The compaction unit 270 acquires a physical address area that corresponds to the backward lookup logical address information.

In step S52, the compaction unit 270 determines whether the physical address area corresponding to the acquired backward lookup logical address information and the physical address area that the acquired compaction object block number and valid page flag information correspond (copy origin page) are matched with each other. As described above, when the write process of the same logical address area as the logical address area that the data being copied corresponds is completed by the write instructing unit 250 during the copy process of the data, the conversion table is not updated. When it is determined that the physical address areas are not matched (No in step S52), this means that the write process of the same logical address area as the logical address area being copied corresponds is completed by the write instructing unit 250 during the copy process of the data. For this reason, the process proceeds to step S60 and the conversion table should not be updated. When it is determined that the physical address areas are matched (Yes in step S52), this means that the write process of the same logical address area as the logical address area that the data being copied corresponds is not executed by the write instructing unit 250 or executed but not completed during the copy process of the data. For this reason, the process proceeds to step S53 and the conversion table is updated.

In step S53, the compaction unit 270 requests the conversion table control unit 221 to cause a valid page flag of a physical address area that the acquired compaction object block number and valid page flag information correspond (copy origin page) to become OFF. In step S54, the compaction unit 270 requests the conversion table control unit 221 to decrement a valid page counter of a block that corresponds to the acquired compaction object block number. In step S56, if the value of the valid page counter of the acquired compaction object block becomes 0 (Yes in step S55), the compaction unit 270 requests the block use information control unit 226 to register the corresponding block as a non-used block. As a result, the corresponding block is collected as the non-used block. If the value of the valid page counter of the acquired compaction object block becomes 0 (Yes in step S55), the block use information control unit 226 registers the corresponding block as the non-used block in the block use information stored by the block use information storage unit 228 and collects the corresponding block as the non-used block. When the corresponding block is collected as the non-used block, the compaction unit 270 notifies the log storage unit 284 of update information of the updated block use information. In step S57, the compaction unit 270 requests the conversion table control unit 221 to cause a corresponding valid page flag of the physical address area that the acquired compaction log-structured pointer corresponds (copy destination page) to become ON. In step S58, the compaction unit 270 requests the conversion table control unit 221 to increment a valid page counter of a block that the acquired compaction log-structured pointer corresponds. In step S59, the compaction unit 270 requests the conversion table control unit 221 to update an entry of the forward lookup table indicated by the corresponding backward lookup logical address of the physical address area that the acquired compaction object block number and valid page flag information correspond (copy origin page) to indicate information of the physical address area that the compaction log-structured pointer corresponds (copy destination page). The conversion table control unit 221 updates the conversion table that is stored by the conversion table storage unit 223, according to an instruction. The compaction unit 270 notifies the log storage unit 284 of update information of the updated conversion table.

In step S60, the compaction unit 270 requests the conversion table control unit 221 to execute an exclusive control end process (lock releasing process) of the conversion table. The conversion table control unit 221 executes an exclusive control end process (lock releasing process) of the conversion table.

In step S61, the compaction unit 270 requests the compaction log-structured pointer control unit 242 to update the compaction log-structured pointer to indicate a next page. The compaction log-structured pointer control unit 242 updates the compaction log-structured pointer to indicate a next page. The compaction unit 270 notifies the log storage unit 284 of update information of the updated compaction log-structured pointer.

In step S62, the compaction unit 270 inquires the compaction log-structured pointer control unit 242 of whether the updated compaction log-structured pointer is over the final page of the block. The compaction log-structured pointer control unit 242 investigates whether the updated compaction log-structured pointer is over the final page of the block and provides the investigation result. If the compaction unit 270 receives the reply indicating that the updated compaction log-structured pointer is over the final page of the block, the process proceeds to step S63. Otherwise, the process proceeds to step S64.

In step S63, the compaction unit 270 requests the block use information control unit 226 to execute an allocating process of a non-used block. As a result, the block use information is updated. The block use information control unit 226 selects the non-used block from the block use information stored by the block use information storage unit 228, allocates the non-used block, and updates the block use information. The compaction unit 270 requests the compaction log-structured pointer control unit 242 to update the compaction log-structured pointer to indicate a page of a head of a newly allocated block. The compaction log-structured pointer control unit 242 updates the compaction log-structured pointer stored by the compaction log-structured pointer storage unit 240 to indicate a page of a head of a newly allocated block. The compaction unit 270 notifies the log storage unit 284 of the update information of the updated compaction log-structured pointer and the update information of the updated block use information.

In step S64, the compaction unit 270 requests the log storage unit 284 to commit the update information notified to the log storage unit 284. The log storage unit 284 receives a commitment notification from the compaction unit 270 and requests the semiconductor storage medium control unit 203 to store the temporarily stored update information. The semiconductor storage medium control unit 203 records the temporarily stored update information as a log. If a physical address of the semiconductor storage medium 205 where the log is recorded cannot be previously recognized, the management information cannot be restored when power is supplied to the data storage device 200. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

In step S65, the process is repeated from step S45, as needed.

Figure 16:
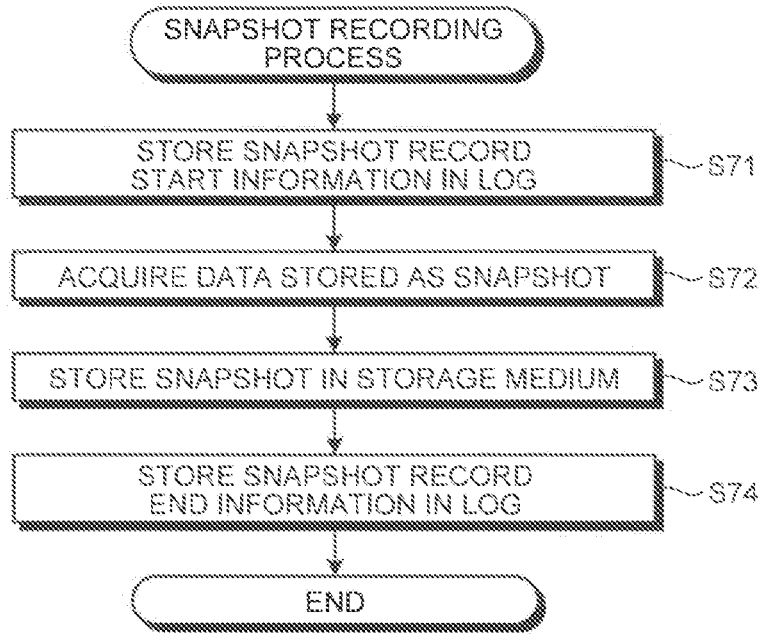
FIG. 16 is a flowchart showing an example of a snapshot recording process of the data storage device according to the second embodiment.

Next, a sequence of a snapshot recording process that is executed by the data storage device 200 will be described with reference to FIG. 16. FIG. 16 is a flowchart showing an example of a flow of sequence of the snapshot recording process executed by the data storage device 200. The data storage device 200 executes the snapshot storage process at predetermined timing or arbitrary timing.

In step S71, the snapshot storage unit 282 requests the log storage unit 284 to store a log of information indicating a snapshot record start. Thereby, an order relationship of recording times of the snapshot and the log can be recognized. The log storage unit 284 requests the semiconductor storage medium control unit 203 to store the information indicating the snapshot record start. The semiconductor storage medium control unit 203 records the information indicating the snapshot record start as the log. If a physical address of the semiconductor storage medium 205 where the log is recorded cannot be previously recognized, the management information cannot be restored when power is supplied to the data storage device 200. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

In step S72, the snapshot storage unit 282 requests the conversion table control unit 221 to extract the conversion table, and acquires the conversion table. The snapshot storage unit 282 requests the host write log-structured pointer control unit 232 to extract the host write log-structured pointer, and acquires the host write log-structured pointer. The snapshot storage unit 282 requests the compaction log-structured pointer control unit 242 to extract the compaction log-structured pointer, and acquires the compaction log-structured pointer. The snapshot storage unit 282 requests the block use information control unit 226 to extract the block use information, and acquires the block use information. The conversion table control unit 221 extracts the conversion table that is stored by the conversion table storage unit 223 and provides the conversion table. The host write log-structured pointer control unit 232 extracts the host write log-structured pointer that is stored by the host write log-structured pointer storage unit 230 and provides the host write log-structured pointer. The compaction log-structured pointer control unit 242 extracts the compaction log-structured pointer that is stored by the compaction log-structured pointer storage unit 240 and provides the compaction log-structured pointer. The block use information control unit 226 extracts the block use information that is stored by the block use information storage unit 228 and provides the block use information.

In step S73, the snapshot storage unit 282 requests the semiconductor storage medium control unit 203 to store the acquired conversion table, the acquired host write log-structured pointer, the acquired compaction log-structured pointer, and the acquired block use information, and records the snapshot. The semiconductor storage medium control unit 203 records the acquired conversion table, the acquired host write log-structured pointer, the acquired compaction log-structured pointer, and the acquired block use information as the snapshot. If a physical address of the semiconductor storage medium 205 where the snapshot or the log is recorded cannot be previously recognized, the management information cannot be restored when power is supplied to the data storage device 200. For this reason, the physical address of the semiconductor storage medium 205 where the snapshot or the log is recorded is made to indicate a predetermined area of the semiconductor storage medium 205 or an area that can be traced from information recorded in the predetermined area of the semiconductor storage medium 205.

In step S74, the snapshot storage unit 282 requests the log storage unit 284 to store a log of information indicating a snapshot record end. Thereby, an order relationship of record times of the snapshot and the log can be recognized. The log storage unit 284 requests the semiconductor storage medium control unit 203 to store the information indicating the snapshot record end. The semiconductor storage medium control unit 203 records the information indicating the snapshot record end as the log. If a physical address of the semiconductor storage medium 205 where the log is recorded cannot be previously recognized, the management information cannot be restored when power is supplied to the data storage device 200. For this reason, the physical address of the semiconductor storage medium 205 where the log is recorded is recorded in a predetermined area of the semiconductor storage medium 205 or an area that can be traced from information recorded in the predetermined area of the semiconductor storage medium 205. The logs that the log storage unit 284 stores through the semiconductor storage medium control unit 203 are arranged in time series in reception order of log commitment process requests by the log storage unit 284, as shown in FIG. 12. In this case, since logs before the snapshot record start (logs 1 and 2 in the example shown in FIG. 12) and the previously recorded snapshot become unnecessary in a management information restoring process, the log storage unit 284 frees the logs before the snapshot record start and the previously recorded snapshot as a new data storage area.

Figure 17:
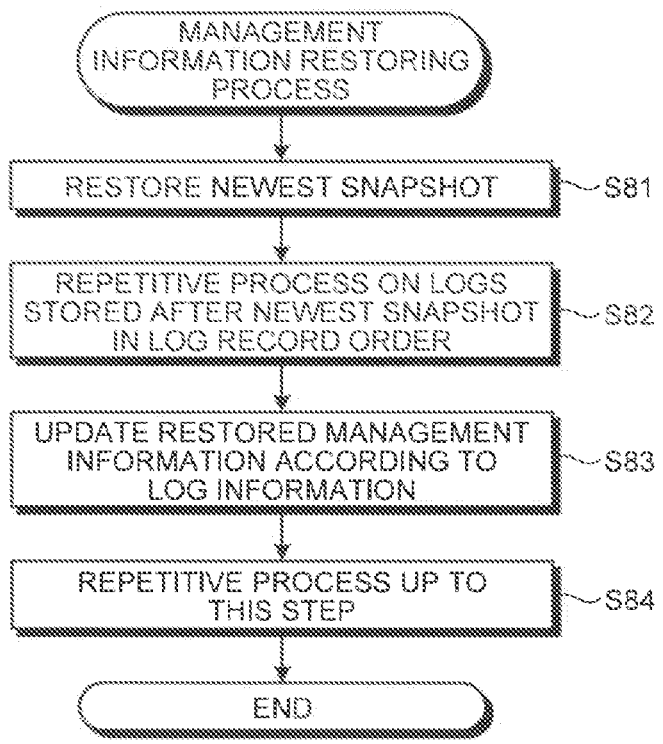
FIG. 17 is a flowchart showing an example of a management information restoring process of the data storage device according to the second embodiment.

Next, a sequence of a management information restoring process that is executed by the data storage device 200 will be descried with reference to FIG. 17. FIG. 17 is a flowchart showing an example of a flow of the sequence of the management information restoring process executed by the data storage device 200. The data storage device 200 restores the management information when power is supplied to the data storage device 200. The data storage device 200 may restore the management information at timing when the management information needs to be restored, even in the cases other than when the power is supplied to the data storage device 200. For example, when it is detected that data of the management information stored in the DRAM 54 corrupts, the data storage device 200 may execute the management information restoring process.

In step S81, the management information restoring unit 290 requests the snapshot restoring unit 292 to restore a newest snapshot. If the snapshot restoring unit 292 receives a restoration request of the newest snapshot from the management information restoring unit 290, the snapshot restoring unit 292 issues an extraction request of the newest snapshot to the semiconductor storage medium control unit 203. The semiconductor storage medium control unit 203 reads the requested data from the semiconductor storage medium 205 and provides the read data. The snapshot restoring unit 292 receives the newest snapshot. The snapshot restoring unit 292 extracts the conversion table from the received snapshot and requests the conversion table control unit 221 to store the extracted conversion table. The conversion table control unit 221 stores the extracted conversion table in the conversion table storage unit 223. The snapshot restoring unit 292 extracts the host write log-structured pointer from the received snapshot and requests the host write log-structured pointer control unit 232 to store the extracted host write log-structured pointer. The host write log-structured pointer control unit 232 stores the extracted host write log-structured pointer in the host write log-structured pointer storage unit 230. The snapshot restoring unit 292 extracts the compaction log-structured pointer from the received snapshot and requests the compaction log-structured pointer control unit 242 to store the extracted compaction log-structured pointer. The compaction log-structured pointer control unit 242 stores the extracted compaction log-structured pointer in the compaction log-structured pointer storage unit 240. The snapshot restoring unit 292 extracts the block use information from the received snapshot and requests the block use information control unit 226 to store the extracted block use information. The block use information control unit 226 stores the extracted block use information in the block use information storage unit 228.

In steps S82 to S84, the management information restoring unit 290 requests the log restoring unit 294 to restore management information from a log stored after storage of the newest snapshot. If the log restoring unit 294 receives the restoration request of the management information from the log stored after storage of the newest snapshot from the management information restoring unit 290, the log restoring unit 294 issues an extraction request of the log stored after storage of the newest snapshot to the semiconductor storage medium control unit 203. The semiconductor storage medium control unit 203 reads the requested data from the semiconductor storage medium 205 and provides the read data. The log restoring unit 294 receives the log stored after storage of the newest snapshot. The log restoring unit 294 extracts the logs from the received logs in record order, and requests the conversion table control unit 221, the host write log-structured pointer control unit 232, the compaction log-structured pointer control unit 242 or the block use information control unit 226 to reflect update information of a variety of information recorded in the logs. The conversion table control unit 221, the host write log-structured pointer control unit 232, the compaction log-structured pointer control unit 242 or the block use information control unit 226 reflects update information of a variety of information recorded in the logs on the conversion table stored by the conversion table storage unit 223, the host write log-structured pointer stored by the host write log-structured pointer storage unit 230, the compaction log-structured pointer stored by the compaction log-structured pointer storage unit 240 or the block use information stored by the block use information storage unit 228.

Next, an advantageous effect of the data storage device 200 according to the second embodiment will be described.

In the compaction process, as the compaction process result, the block that becomes the compaction origin is collected as the non-used block. Accordingly, it is preferable that the number of pages that are copied by the compaction is small. For this reason, when the compaction object block is detected, the block where the number of valid pages is as small as possible is preferably selected. However, in order to improve efficiency, the number of valid pages of the block that is detected as the compaction object block needs to be decreased using the address locality.

In an access pattern with respect to the data storage device, address locality generally exists. If the address locality exists, data where the update frequency is high is easily invalidated by new write, and data where the update frequency is low is rarely invalidated by new write. For this reason, data where write is requested from the host device is data having the high update frequency and compacted data is data that is not updated until the block is compacted. Therefore, the compacted data is data having the low update frequency.

In the data storage device 200 according to the second embodiment, since the configuration where the host write log-structured pointer and the compaction log-structured pointer are individually provided is used, the data having the high update frequency and the data having the low update frequency can be individually collected. If the data that has the high update frequency and is easily invalidated is collected, an expectation value of the number of valid pages of the corresponding block can be decreased. Since the total number of valid pages in the data storage device 200 according to the second embodiment is constant, if the data that has the low update frequency and is rarely invalidated is collected, an expectation value of the number of valid pages of the corresponding block increases. As a result, an expectation value of the number of valid pages of other block can be decreased.

Meanwhile, at the time of the random write where the address locality does not exist, even when the configuration where the host write log-structured pointer and the compaction log-structured pointer are individually provided is used or not used, an expectation value of the number of valid pages of the block that is detected as the compaction object block is the same. For this reason, as in the second embodiment, even though the configuration where the host write log-structured pointer and the compaction log-structured pointer are individually provided is used, random write performance is not deteriorated.

As described above, in the second embodiment, an expectation value of the number of valid pages of a block to be compacted can be decreased by using the address locality of the access pattern. As a result, as compared with the case in which the configuration where the host write log-structured pointer and the compaction log-structured pointer are individually provided is not used, the size of the data that is actually written and read in the data storage device can be made to be smaller than the size of the data where write is requested from the host device. Therefore, high write performance and the long design lifespan of the data storage device can be obtained.

In a normal state, the compaction is always executed. Accordingly, when the configuration where the host write log-structured pointer and the compaction log-structured pointer are individually provided is not used, data where write is requested from the host device is written in a new write area that is generated as the compaction process execution result. At this time, if the (continuous) compaction write is not completed, the data where write is requested from the host device is not written. For this reason, the write request from the host device is hindered by the (continuous) compaction write, and stable write performance cannot be provided to the host device.

Conversely, in the second embodiment, the configuration where the host write log-structured pointer and the compaction log-structured pointer are individually provided is used, and the host write process and the compaction process are independently executed. Further, in the semiconductor storage medium control unit 203, the process of the write request or the read request from the write instructing unit 250 to the semiconductor storage medium 205 and the process of the write request or the read request from the compaction unit 270 to the semiconductor storage medium 205 can be switched as needed. Therefore, according to the second embodiment, the host write and the compaction write can be switched in a page unit as needed, and the write request from the host device can be suppressed from being hindered by the compaction write. As a result, stable write performance can be provided to the host device.

Figure 18:
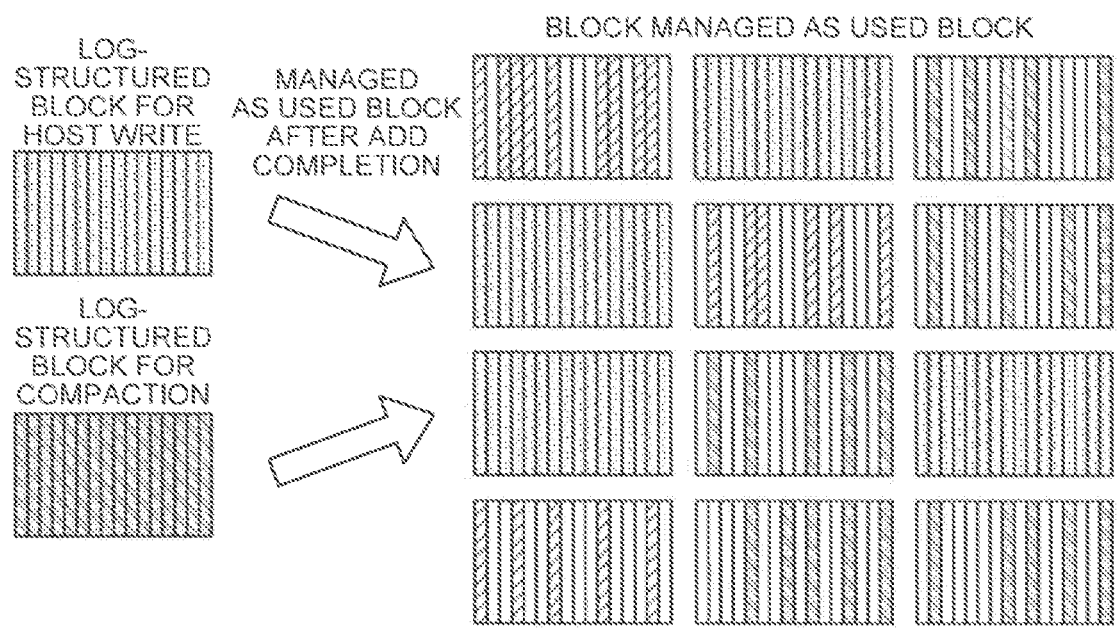
FIG. 18 is a diagram showing a principle of arranging data in logical address order.

As in the second embodiment, if the configuration where the host write log-structured pointer and the compaction log-structured pointer are individually provided is used, the data that is recorded in the data storage device 200 is easily arranged in logical address order by the operation from the host device. Specifically, a full-scale sequential write request of the logical address area that is provided by the data storage device 200 is issued from the host device, and the data that is recorded in the data storage device can be arranged in logical address order. Hereinafter, this configuration will be described with reference to FIG. 18.

If the full-scale sequential write request of the logical address area that is provided by the data storage device 200 is issued from the host device, in the logical address where data is written during the execution of the full-scale sequential write, data is not written again during the execution of the full-scale sequential write. Now a block is considered, which has been a log-structured block for the host write and for which add is completed after a point of time when the execution of the full-scale sequential write starts. The block is now managed as a used block. A page of such block is not invalidated. That is, the block, which has been the log-structured block for the host write, for which add is completed after a point of time when the execution of the full-scale sequential write starts, and which is managed as the used block, is not selected as the compaction object block.

Meanwhile, a valid page of a block, which is already managed as a used block at a point of time when the full-scale sequential write starts, is data of a logical address that is not yet written by the full-scale sequential write. Also, a valid page of a block, which has been an log-structured block for the compaction, for which add is completed after a point of time when the execution of the full-scale sequential write starts, and which is managed as a used block, is data of a logical address that is not yet written by the full-scale sequential write.

Accordingly, the pages are invalidated by the full-scale sequential write in the future. As described above, the valid page of the block, which is already managed as a used block at a point of time when the full-scale sequential write starts, and the valid page of the block, which has been the log-structured block for the compaction and for which add is completed after a point of time when the execution of the full-scale sequential write starts to be managed as a used block, is invalidated one after another. What is selected as the compaction object block is the block, which is already managed as a used block at a point of time when the full-scale sequential write starts, or the block, which has been the log-structured block for the compaction and for which add is completed after a point of time when the execution of the full-scale sequential write starts to be managed as a used block.

If the full-scale sequential write is completed, the data that is recorded in the data storage device 200 is arranged in logical address order. In contrast, if the configuration where the host write log-structured pointer and the compaction log-structured pointer are individually provided is not used, the compacted data which indicates an inconsistent value on the logical addresses and data which indicates a consistent value on the logical addresses and in which write is requested from the host device are always mixed in one block. Therefore, it is difficult to perfectly arrange data written in logical address order.

As described above, in a state where the data written in logical address order is perfectly arranged, and a sequential write request is transmitted from the host device and one block is used in write of the data according to the write request, data that is continuous on the physical addresses is invalidated by one block. Accordingly, if the sequential write request is issued from the host device after the process of arranging the data in logical address order, a copy process based on the compaction does not need to be executed.

In the log-structured method, since the block of the compaction destination needs to be previously secured, the data storage device 200 uses the capacity, which is obtained by subtracting the margin capacity of the predetermined capacity from the total capacity of the storage medium mounted in the data storage device 200, as the declared capacity provided to the host device. In a state where the data written in logical address order is perfectly arranged, all of the blocks corresponding to the declared capacity are filled with the valid pages, and all of the blocks corresponding to the margin capacity become empty.

For this reason, even when random write request is issued from the host device after the process of arranging the data in logical address order, the copy process based on the compaction is not generated until the write data amount becomes at least the write data amount corresponding to the margin capacity.

Meanwhile, if the copy process based on the compaction is executed, write performance of data where write is requested from the host device is more deteriorated than data write performance with respect to the storage medium. Since the copy process based on the compaction is executed in a normal state, when the state becomes the normal state, write performance of data where write is requested from the host device is more deteriorated than data write performance with respect to the storage medium. As described above, the copy process based on the compaction is not generated until the write data amount becomes at least the write data amount corresponding to the margin capacity after the process of arranging the data in logical address order. For this reason, the write performance of the data where write is requested from the host device becomes the data write performance with respect to the storage medium, until the write data amount becomes at least the write data amount corresponding to the margin capacity.

Accordingly, the configuration where the host write log-structured pointer and the compaction log-structured pointer are individually provided is used, and a state in which the write performance of the data where write is requested from the host device becomes the data write performance with respect to the storage medium can be easily achieved.

In the above description, the process of arranging the data in logical address order is realized by issuing the full-scale sequential write request of the logical address area provided by the data storage device from the host device. However, a mechanism that executes the process of arranging the data in logical address order may be incorporated in the data storage device.

Third Embodiment

As described above, in the data storage device using the storage medium having constraints (e.g., data can be sequentially written in a page unit with respect to pages of the data erased block where data is not yet written but overwrite of data is disabled with respect to pages where data is already written), the log that corresponds to the update information of the management information also needs to be written in a page unit.

Also in the second embodiment, the storing and restoring processes of the management information are enabled. However, when the data management unit is set to the page size as in the second embodiment, the management information is updated whenever write is requested from the host device or whenever data corresponding to one page is written by the compaction write. For this reason, the log needs to be written in one page, whenever write is requested from the host device or whenever data corresponding to one page is written by the compaction write. This means that only half the write performance of the data with respect to the storage medium is realized and that the design lifespan of the data storage device calculated from the lifespan of the storage medium becomes ½.

Accordingly, in the third embodiment, an example in which a log record count is decreased will be described. In the description below, the difference between the second embodiment and the third embodiment is mainly described, and the components that have the same functions as those of the second embodiment are denoted by the same reference numerals as those of the second embodiment and the description thereof is not repeated.

First, the configuration of a data storage device according to the third embodiment will be described.

Figure 19:
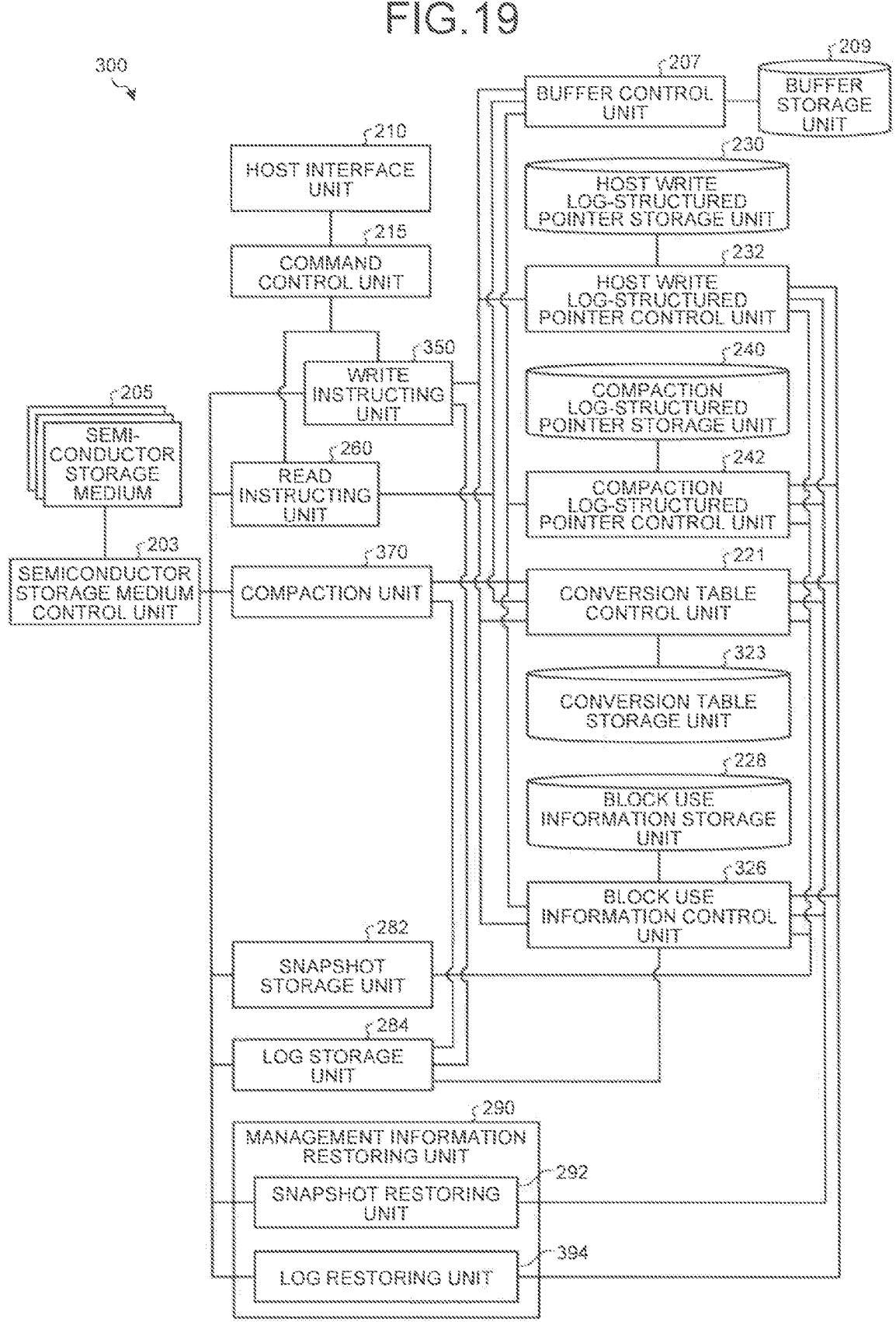
FIG. 19 is a block diagram showing an example of the functional configuration of a data storage device according to a third embodiment.

FIG. 19 is a block diagram showing an example of the detailed function configuration of a data storage device 300 according to the third embodiment. In the data storage device 300 according to the third embodiment, a conversion table storage unit 323, a block use information control unit 326, a write instructing unit 350, a compaction unit 370, and a log restoring unit 394 are different from those of the data storage device 200 according to the second embodiment. Hereinafter, the difference of the individual units will be described.

The conversion table storage unit 323 stores a conversion table. The conversion table according to the third embodiment includes a forward lookup table, a valid page flag, and a valid page counter, but does not include a backward lookup table.

Figures 20, 21:
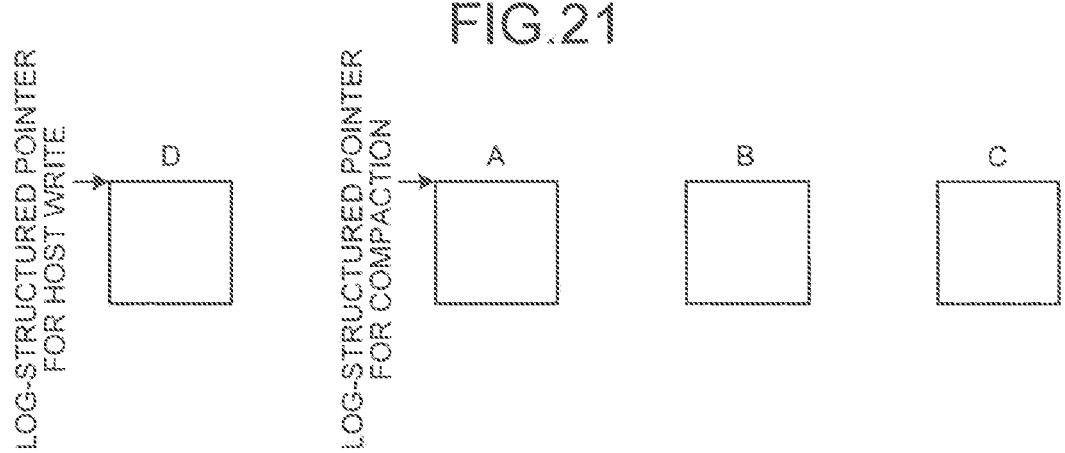
FIG. 20 is a diagram showing an example of the data configuration of a valid page flag and a valid page counter.
FIG. 21 is a diagram showing an allocating method of a non-used block.

FIG. 20 shows an example of the data configuration of the valid page flag and the valid page counter. As shown in FIG. 20, the valid page flag and the valid page counter use a block number as an index and include the block number, the valid page counter, and the valid page flag set as an entry. The valid page flag set is arranged in order of the pages arranged in the block and can specify the page of the valid page flag. A value of the valid page counter of the same block and the total number of true values of the valid page flags are matched with each other. The block number that becomes the index and the block number that becomes the entry of the forward lookup table are assigned with the same number in the same block. The forward lookup table is the same as the forward lookup table that is included by the conversion table storage unit 223 according to the second embodiment.

As described above, the conversion table storage unit 323 according to the third embodiment does not include the backward lookup table, in contrast to the conversion table storage unit 223 according to the second embodiment. Thereby, in the third embodiment, a memory use amount of management information can be decreased. When the memory use amount of the management information can be decreased, this means that the capacity to be stored as the snapshot decreases. As a result, a process time that is needed to store the snapshot can be decreased, the write amount with respect to the semiconductor storage medium 205 can be decreased, and the design lifespan of the data storage device 300 can be increased.

If the block use information control unit 326 receives an allocation request of a non-used block from the write instructing unit 350, the block use information control unit 326 suspends a process of the write instructing unit 350, until the allocation request of the non-used block is fully received from the compaction unit 370. Likewise, if the block use information control unit 326 receives an allocation request of a non-used block from the compaction unit 370, the block use information control unit 326 suspends a process of the compaction unit 370, until the allocation request of the non-used block is fully received from the write instructing unit 350.

If the block use information control unit 326 fully receives an allocation request of a non-used block from both the write instructing unit 350 and the compaction unit 370, and the write amount from the host device at a corresponding point of time is 1 and the write amount of the compaction to be processed in the data storage device 300 is N (N is an integer equal to or more than 0), the block use information control unit 326 allocates one non-used block to the write instructing unit 350 and allocates N non-used blocks to the compaction unit 370. The block use information control unit 326 can determine a value of N from information of the number of used blocks included in block use information stored by the block use information storage unit 228 or information of the number of non-used blocks. A case is considered where the value of N is set to be more than the write amount of the compaction to be processed in the data storage device 300 when the write amount from the host device at a corresponding point of time is 1. When a load of the write request from the host device is not large, the compaction process is first executed and the amount of a compaction process to be executed in the future is decreased. Thus, responsiveness at the time when the load of the write request from the host device increases in the future can be improved.

The block use information control unit 326 updates the block use information that is stored by the block use information storage unit 228, according to the allocated contents. The block use information control unit 326 restarts the suspended processes of both the write instructing unit 350 and the compaction unit 370.

Next, the compaction process and the write process according to the host write request from the host device will be described with reference to FIGS. 21 to 25.

Figure 22:
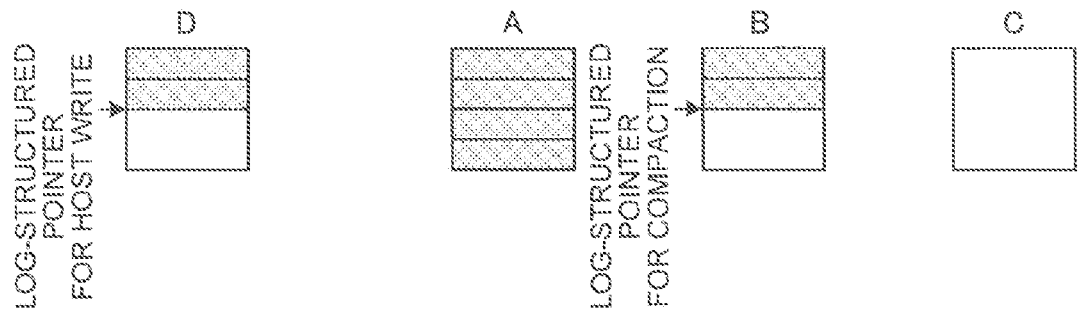
FIG. 22 is a diagram showing an allocating method of a non-used block.
Figure 23:
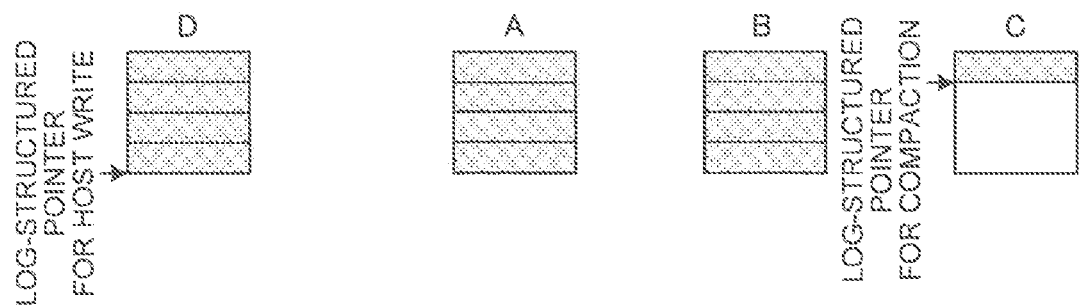
FIG. 23 is a diagram showing an allocating method of a non-used block.
Figure 24:
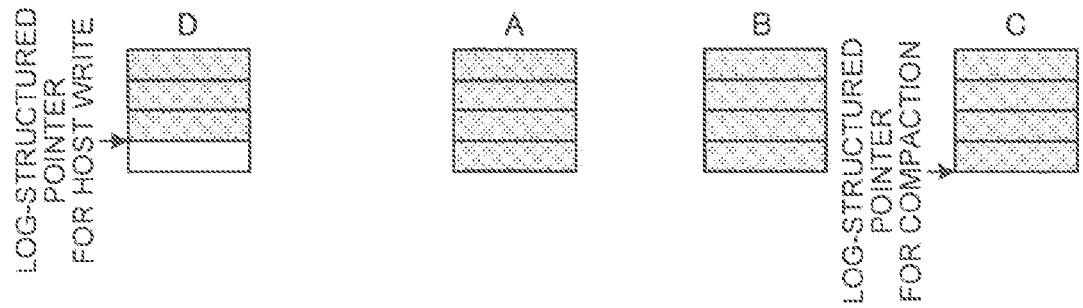
FIG. 24 is a diagram showing an allocating method of a non-used block.

First, as shown in FIG. 21, the block use information control unit 326 allocates a block D to the write instructing unit 350 and allocates blocks A, B, and C to the compaction unit 370. The order of pages where the compaction unit 370 writes data by the compaction process becomes order of the blocks A, B, and C. If the block use information control unit 326 restarts the suspended processes of both the write instructing unit 350 and the compaction unit 370, as shown in FIG. 22, the compaction object data and the write object data from the host device are added according to the log-structured pointer for the host write and the log-structured pointer for the compaction. As shown in FIG. 23 or 24, even when one of the log-structured pointers arrives at an end of the allocated block, the process is suspended until the other log-structured pointer arrives at the end of the allocated block, and a new block is not allocated.

As described above, when the write amount from the host device at a corresponding point of time is 1 and the write amount of the compaction to be processed in the data storage device 300 is N (N is an integer equal to or more than 0), the block use information control unit 326 allocates one non-used block to the write instructing unit 350 and allocates N non-used blocks to the compaction unit 370. This is to secure the compaction amount needed at a corresponding point of time and to avoid, as much as possible, the process from being suspended until the other log-structured pointer arrives at an end of the allocated block, even when one log-structured pointer arrives at the end of the allocated block, as shown in FIG. 23 or 24.

Figure 25:
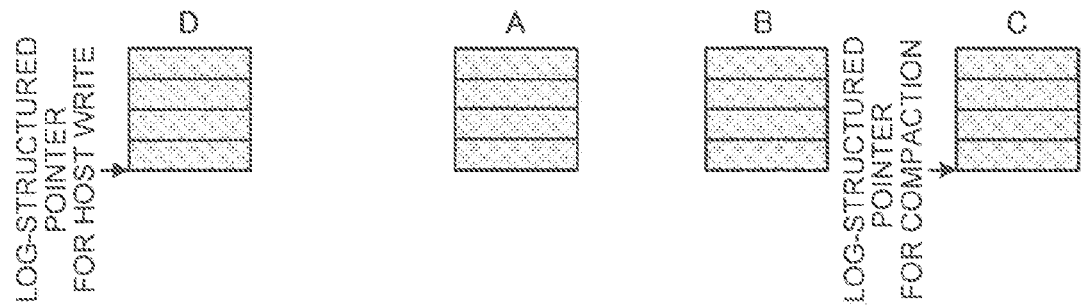
FIG. 25 is a diagram showing an allocating method of a non-used block.

As shown in FIG. 25, if both the log-structured pointers arrive at the end of the allocated block, the block use information control unit 326 allocates new blocks to the write instructing unit 350 and the compaction unit 370 and restarts the suspended processes of the write instructing unit 350 and the compaction unit 370, and the state becomes a state shown in FIG. 21. Hereinafter, time needed from allocation of the block to allocation of a next block is called a "term".

In the case where address locality exists in the access pattern from the host device, when the write amount from the host device at a corresponding point of time is 1, the compaction amount to be processed in the data storage device 300 may significantly decrease. In this case, however, in the rule of the block allocation described above, as shown in FIG. 26, terms where one log-structured block for the compaction is allocated (terms 2 and 6) and terms where the log-structured block for the compaction is not allocated (terms 1, 3, 4, 5) are appropriately switched.

Figures 26, 27:
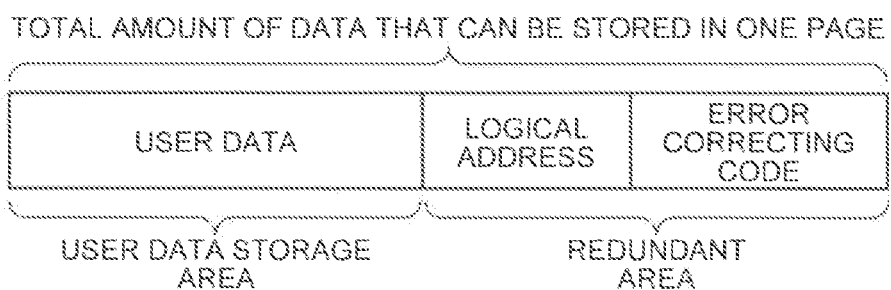
FIG. 26 is a diagram showing an allocating method of a non-used block.
FIG. 27 is a diagram showing a write method of data with respect to a page.

Referring back to FIG. 19, the block use information control unit 326 notifies the log storage unit 284 of block allocation information with respect to the allocated (N+1) blocks. In the order of the allocation information, a block that is allocated to the compaction unit 370 is temporally prior to a block that is allocated to the write instructing unit 350. When plural blocks are allocated to the compaction unit 370, the order of the allocation information becomes order of the blocks that are used by the compaction unit 370. For example, the order of the allocation information in the case where the blocks are allocated as shown in FIGS. 21 to 25 becomes order of the block A, the block B, the block C, and the block D. The order of the allocation information in the case where the blocks are allocated as shown in FIG. 26 becomes order of the block A in the term 1, the block B and the block C in the term 2, the block D in the term 3, the block E in the term 4, the block F in the term 5, and the block G and the block H in the term 6. The block use information control unit 326 requests the log storage unit 284 to commit the information notified to the log storage unit 284.

The write instructing unit 350 issues an extraction request of stored data corresponding to the management size to the buffer control unit 207, transmits the extracted data and the physical address area information that the acquired host write log-structured pointer corresponds to the semiconductor storage medium control unit 203, and requests the semiconductor storage medium control unit 203 to write the extracted data in the physical address area that the acquired host write log-structured pointer corresponds. When the acquired host write log-structured pointer indicates a head page of the block, the write instructing unit 350 requests the semiconductor storage medium control unit 203 to execute a block erasing process, before requesting the semiconductor storage medium control unit 203 to write data. However, execution timing of the block erasing process is not limited thereto. For example, the execution timing may be timing when a block for host write is newly allocated, timing when a block is collected as a non-used block or arbitrary timing during a period of time until the write instructing unit 350 requests the semiconductor storage medium control unit 203 to write data, after the block is collected as the non-used block.

In the page of the semiconductor storage medium 205, a redundant area is generally provided in addition to an area to record user data. The redundant area is used to record data of an error correcting code with respect to the user data, for example. In the third embodiment where the log record count is decreased, the data of the error correcting code and the backward lookup logical address of the corresponding page are recorded in the redundant area to decrease the log record count. That is, as shown in FIG. 27, with respect to the data that is recorded in the page, the user data is recorded in the area to record the user data and the backward lookup logical address of the corresponding page and the data of the error correcting code are recorded in the redundant area. The recorded backward lookup logical address is a logical address of a head of a management size area that includes an area of a write command (logical address 0 in the example shown in FIG. 11).

The write instructing unit 350 updates the conversion table to indicate newly written data, during the exclusive control of the conversion table. Specifically, the write instructing unit 350 inquires the conversion table control unit 221 of a physical address (pre-update physical address) that corresponds to a logical address of the head of the management size area including the area of the write command (logical address 0 in the example shown in FIG. 11), before receiving the write command. The write instructing unit 350 requests the conversion table control unit to cause a valid page flag that the acquired pre-update physical address corresponds to become OFF. The write instructing unit 350 requests the conversion table control unit 221 to decrement a valid page counter of a block that the acquired pre-update physical address corresponds. The write instructing unit 350 requests the conversion table control unit 221 to cause a valid page flag that the acquired host write log-structured pointer corresponds to become ON. The write instructing unit 350 requests the conversion table control unit 221 to increment a valid page counter of a block that the acquired host write log-structured pointer corresponds. The write instructing unit 350 requests the conversion table control unit 221 to update the logical address of the head of the management size area including the area of the write command (logical address 0 in the example shown in FIG. 11) of the forward lookup table to indicate the information of the physical address area that the host write log-structured pointer corresponds.

The write instructing unit 350 according to the third embodiment does not notify the log storage unit 284 of the update information of the conversion table, in contrast to the write instructing unit 250 according to the second embodiment. This is because the update information of the conversion table can be restored on the basis of the backward lookup logical address recorded in the page, at the time of restoring management information to be described below. In the write instructing unit 250 according to the second embodiment, the log of the update information of the conversion table is recorded whenever the user data of one page is written. However, in the write instructing unit 350 according to the third embodiment, the log of the update information does not need to be recorded whenever the user data of one page is written, and the log record count can be greatly decreased.

The write instructing unit 350 requests the host write log-structured pointer control unit 232 to update the host write log-structured pointer to indicate a next page. The write instructing unit 350 inquires the host write log-structured pointer control unit 232 of whether the updated host write log-structured pointer is over the final page of the block. If the write instructing unit 350 receives a reply indicating that the updated host write log-structured pointer is over the final page of the block, the write instructing unit 350 notifies the log storage unit 284 of add completion information of the corresponding block and requests the log storage unit 284 to commit the notified information. In order to decrease a restoration processing time to be described below, backward lookup logical addresses of all pages that are added in a block until add is completed after the block is allocated may be stored, and the backward lookup logical addresses of the pages that are added in the corresponding block may be included in the add write end log of the corresponding block.

If the write instructing unit 350 receives a reply indicating that the updated host write log-structured pointer is over the final page of the block, the write instructing unit 350 requests the block use information control unit 326 to execute an allocating process of a non-used block. As a result, the block use information is updated. The write instructing unit 350 requests the host write log-structured pointer control unit 232 to update the host write log-structured pointer to indicate a page of a head of a newly allocated block.

The write instructing unit 350 according to the third embodiment does not notify the log storage unit 284 of the update information of the host write log-structured pointer, in contrast to the write instructing unit 250 according to the second embodiment. The update information of the block use information that is notified by the write instructing unit 250 according to the second embodiment is notified by the block use information control unit 326 in the third embodiment. This is because the host write log-structured pointer can be restored when the conversion table can be restored on the basis of the backward lookup logical address recorded in the page, at the time of restoring management information to be described below. In the write instructing unit 250 according to the second embodiment, the log of the update information of the host write log-structured pointer is recorded whenever the user data of one page is written. However, in the write instructing unit 350 according to the third embodiment, the log of the update information does not need to be recorded whenever the user data of one page is written, and the log record count can be greatly decreased.

The compaction unit 370 inquires the conversion table control unit 221 of the block suitable for a compaction object among the acquired blocks, and acquires a block number of the block suitable for the compaction object and a valid page flag and a valid page counter of the corresponding block. The block that is suitable for the compaction object is a block where a value of the valid page counter is smallest. In this case, when the block where the value of the valid page counter is 0 is selected as the compaction object, the compaction unit 370 requests the block use information control unit 326 to register the corresponding block as a non-used block. As a result, the corresponding block is collected as the non-used block. When the corresponding block is collected as the non-used block, the compaction unit 370 notifies the log storage unit 284 of update information of the updated block use information. Further, the compaction unit 370 requests the log storage unit 284 to commit the information notified to the log storage unit 284.

The compaction unit 370 issues a read request of a physical address area that the acquired compaction object block number and valid page flag information correspond (copy origin page) to the semiconductor storage medium control unit 203. If the compaction unit 370 receives the read data, the compaction unit 370 issues a storage request of the received data to the buffer control unit 207. In the received data, as shown in FIG. 27, the user data is recorded in the area to record the user data, and the backward lookup logical address of the corresponding page and the data of the error correcting code are recorded in the redundant area. The compaction unit 370 extracts the backward lookup logical address that is recorded in the redundant area of the read data and temporarily stores the backward lookup logical address.

The compaction unit 370 issues an extraction request of the stored data to the buffer control unit 207, transmits the extracted data and the information of the physical address area that the acquired compaction log-structured pointer corresponds (copy destination page) to the semiconductor storage medium control unit 203, and requests the semiconductor storage medium control unit 203 to write the extracted data in the physical address area that the acquired compaction log-structured pointer corresponds (copy destination page). When the acquired compaction log-structured pointer indicates a head page of the block, the compaction unit 370 requests the semiconductor storage medium control unit 203 to execute a block erasing process, before requesting the semiconductor storage medium control unit 203 to write data. However, timing at which the block erasing process is executed is not limited thereto. For example, the timing may be timing when a block for compaction is newly allocated, timing when a block is collected as a non-used block or arbitrary timing during a period of time until the compaction unit 370 requests the semiconductor storage medium control unit 203 to write data, after the block is collected as the non-used block.

Since the data stored in the page is the data stored in the buffer storage unit 209, as shown in FIG. 27, the user data is recorded in the area to record the user data, and the backward lookup logical address of the corresponding page and the data of the error correcting code are recorded in the redundant area. The backward lookup table is newly written only when the data is written in the page, is not updated hereinafter, and is referred to only at the time of the compaction. Therefore, the backward lookup table can be simultaneously written when the data is written in the page according to the write request from the host device, and the backward lookup table can be simultaneously read when the compacted data is read. As a result, a penalty is not additionally caused.

The compaction unit 370 updates the conversion table to indicate data of a compaction destination, during the exclusive control of the conversion table. However, as described above, when a write process of the same logical address area as a logical address area that data being copied corresponds is completed by the write instructing unit 350 during the copy process of the data, the compaction unit 370 should not update the conversion table.

Specifically, the compaction unit 370 issues a reference request of the forward lookup table to the conversion table control unit 221 using the temporarily stored backward lookup logical address information and acquires a physical address that corresponds to the temporarily stored backward lookup logical address information. The compaction unit 370 determines whether the physical address corresponding to the temporarily stored backward lookup logical address information and the physical address area that the acquired compaction object block number and valid page flag information correspond (copy origin page) are matched with each other. When it is determined that the physical address and the physical address area are not matched with each other, this means that the write process of the same logical address area as the logical address area that the data being copied corresponds is completed by the write instructing unit 350 during the copy process of the data. For this reason, the compaction unit 370 ends the process during the exclusive control of the conversion table and does not update the conversion table. When it is determined that the physical address and the physical address area are matched with each other, this means that the write process of the same logical address area as the logical address area that the data being copied corresponds is not executed by the write instructing unit 350 or executed but not completed during the copy process of the data. For this reason, the compaction unit 370 updates the conversion table.

Specifically, the compaction unit 370 requests the conversion table control unit 221 to cause a valid page flag of a physical address area that the acquired compaction object block number and valid page flag information correspond (copy origin page) to become OFF. The compaction unit 370 requests the conversion table control unit 221 to decrement a valid page counter of a block that corresponds to the acquired compaction object block number. The compaction unit 370 requests the conversion table control unit 221 to cause a corresponding valid page flag of the physical address area that the acquired compaction log-structured pointer corresponds (copy destination page) to become ON. The compaction unit 370 requests the conversion table control unit 221 to increment a valid page counter of a block that the acquired compaction log-structured pointer corresponds. The compaction unit 370 requests the conversion table control unit 221 to update an entry of the forward lookup table indicated by the corresponding backward lookup logical address of the physical address area that the acquired compaction object block number and valid page flag information correspond (copy origin page) to indicate information of the physical address area that the compaction log-structured pointer corresponds (copy destination page).

The compaction unit 370 according to the third embodiment does not notify the log storage unit 284 of the update information of the conversion table, in contrast to the compaction unit 270 according to the second embodiment. This is because the update information of the conversion table can be restored on the basis of the backward lookup logical address recorded in the page, at the time of restoring management information to be described below. In the compaction unit 270 according to the second embodiment, the log of the update information of the conversion table is recorded whenever the user data of one page is written. However, in the compaction unit 370 according to the third embodiment, the log of the update information does not need to be recorded whenever the user data of one page is written, and the log record count can be greatly decreased.

The compaction unit 370 requests the block use information control unit 326 to register the corresponding block as a non-used block, if the value of the valid page counter of the acquired compaction object block becomes 0. As a result, the corresponding block is collected as the non-used block. When the corresponding block is collected as the non-used block, the compaction unit 370 notifies the log storage unit 284 of update information of the updated block use information and requests the log storage unit 284 to commit the information notified to the log storage unit 284.

The compaction unit 370 requests the compaction log-structured pointer control unit 242 to update the compaction log-structured pointer to indicate a next page. The compaction unit 370 inquires the compaction log-structured pointer control unit 242 of whether the updated compaction log-structured pointer is over the final page of the block. If the compaction unit 370 receives a reply indicating that the updated compaction log-structured pointer is over the final page of the block, the compaction unit 370 notifies the log storage unit 284 of the add completion information of the corresponding block and requests the log storage unit 284 to commit the information notified to the log storage unit 284. In order to decrease a restoration processing time to be described below, backward lookup logical addresses of all pages that are added in a block until add write is completed after the block is allocated may be stored, and the backward lookup logical addresses of the pages that are added in the corresponding block may be included in the add write end log of the corresponding block.

If the compaction unit 370 receives a reply indicating that the updated compaction log-structured pointer is over the final page of the block, the compaction unit 370 requests the compaction log-structured pointer control unit 242 to update the compaction log-structured pointer to indicate a page of a head of a next block allocated from the block use information control unit 326.

When the compaction unit 370 receives a reply indicating that the updated compaction log-structured pointer is over the final page of the block and uses all of the blocks allocated from the block use information control unit 326, the compaction unit 370 requests the block use information control unit 326 to execute an allocating process of a non-used block. As a result, the block use information is updated. The compaction unit 370 requests the compaction log-structured pointer control unit 242 to update the compaction log-structured pointer to indicate a page of a head of a newly allocated block.

The compaction unit 370 according to the third embodiment does not notify the log storage unit 284 of the update information of the compaction log-structured pointer, in contrast to the compaction unit 270 according to the second embodiment. The update information of the block use information that is notified by the compaction unit 270 is notified by the block use information control unit 326 in the third embodiment. This is because the compaction log-structured pointer can be restored when the update information of the conversion table can be restored on the basis of the backward lookup logical address recorded in the page, at the time of restoring management information to be described below. In the compaction unit 270 according to the second embodiment, the log of the update information of the compaction log-structured pointer is recorded whenever the user data of one page is written. However, in the compaction unit 370 according to the third embodiment, the log of the update information does not need to be recorded whenever the user data of one page is written, and the log record count can be greatly decreased.

If the log restoring unit 394 receives a restoration request of the management information from the log stored after storage of the newest snapshot from the management information restoring unit 290, the log restoring unit 394 issues an extraction request of the log stored after storage of the newest snapshot to the semiconductor storage medium control unit 203, and receives the log stored after storage of the newest snapshot.

In the log, any of the information of the newly allocated block, the add completion information of the block, and the information of the block collected as the non-used block is recorded. In this case, in the information of the newly allocated block, information of one or more blocks for the compaction add is arranged in order of the blocks used by the compaction unit 370, and the information of the block for the host add used by the write instructing unit 350 follows. The term does not proceed to a next term as long as the add of all of the blocks allocated in the certain term is not completed. Thus, by tracing the log in record order, it is confirmed that a log of block allocation of a next term is recorded in a state where add completion information of all of the blocks allocated in the certain term is recorded, and validity of the log is investigated.

The log restoring unit 394 extracts block numbers in order, with respect to the information of the allocated blocks. The log restoring unit 394 issues a read request of a page to the semiconductor storage medium control unit 203, sequentially from a page of a head, with respect to the blocks of the extracted block numbers. The log restoring unit 394 receives the data of the read page from the semiconductor storage medium control unit 203 and extracts the backward lookup logical address information from the received data.

The log restoring unit 394 causes the entry of the extracted backward lookup logical address of the conversion table to indicate the read page, on the basis of the extracted backward lookup logical address information. Specifically, the log restoring unit 394 inquires the conversion table control unit 221 of a physical address (pre-update physical address) that corresponds to the extracted backward lookup logical address, before reading the page. The log restoring unit 394 requests the conversion table control unit 221 to cause a valid page flag that the acquired pre-update physical address corresponds to become OFF. The log restoring unit 394 requests the conversion table control unit 221 to decrement a valid page counter of a block that the acquired pre-update physical address corresponds. The log restoring unit 394 requests the conversion table control unit 221 to cause a valid page flag that the read page corresponds to become ON. The log restoring unit 394 requests the conversion table control unit 221 to increment a valid page counter of a block that the read page corresponds. The log restoring unit 394 requests the conversion table control unit 221 to update the extracted backward lookup logical address of the forward lookup table to indicate the physical address area information that the read page corresponds.

With respect to the block where the add is not completed, a non-recorded page is read during the above process. A case is considered where all bits of the data of the erased page including the data of the redundant area shown in FIG. 27 have a value of 1, for example. If it is determined whether the values of all of the bits become 1, it can be recognized that the read page is a non-recorded page, for example. At this time, the log restoring unit 394 requests the host write log-structured pointer control unit 232 to update the host write log-structured pointer to indicate the non-recorded page, when the block where the add is not completed is the block 9') allocated for the host add. Meanwhile, the log restoring unit 394 requests the compaction log-structured pointer control unit 242 to update the compaction log-structured pointer, when the block where the add is not completed is the block allocated for the compaction add.

In this case, in the same term, even when the host write and the compaction are generated in the same logical address, the change according to the compaction write is first reflected on the management information and the change according to the host write is reflected. Finally, a series of management information indicates the page subjected to the host write. Thereby, consistency of the management information is secured.

When the backward lookup logical addresses of all of the pages added in the block until the add is completed after the block is allocated are stored and the backward lookup logical addresses of the pages added in the corresponding block are included in the add completion log of the corresponding block, the backward lookup logical addresses of all of the pages added in the corresponding block can be recognized by only viewing the add completion log. Thereby, the amount of the read process from the semiconductor storage medium 205 can be greatly decreased, and the pages may be sequentially read from the head, with respect to only the block where the final add is performed.

If the information of the block collected as the non-used block is recorded in the log, the log restoring unit 394 requests the block use information control unit 326 to change the use state of the corresponding block to the non-used state.

Next, the operation of the data storage device according to the third embodiment will be described. Since the read process and the snapshot recording process are the same as those of the second embodiment, the description thereof will not be repeated.

Figure 28:
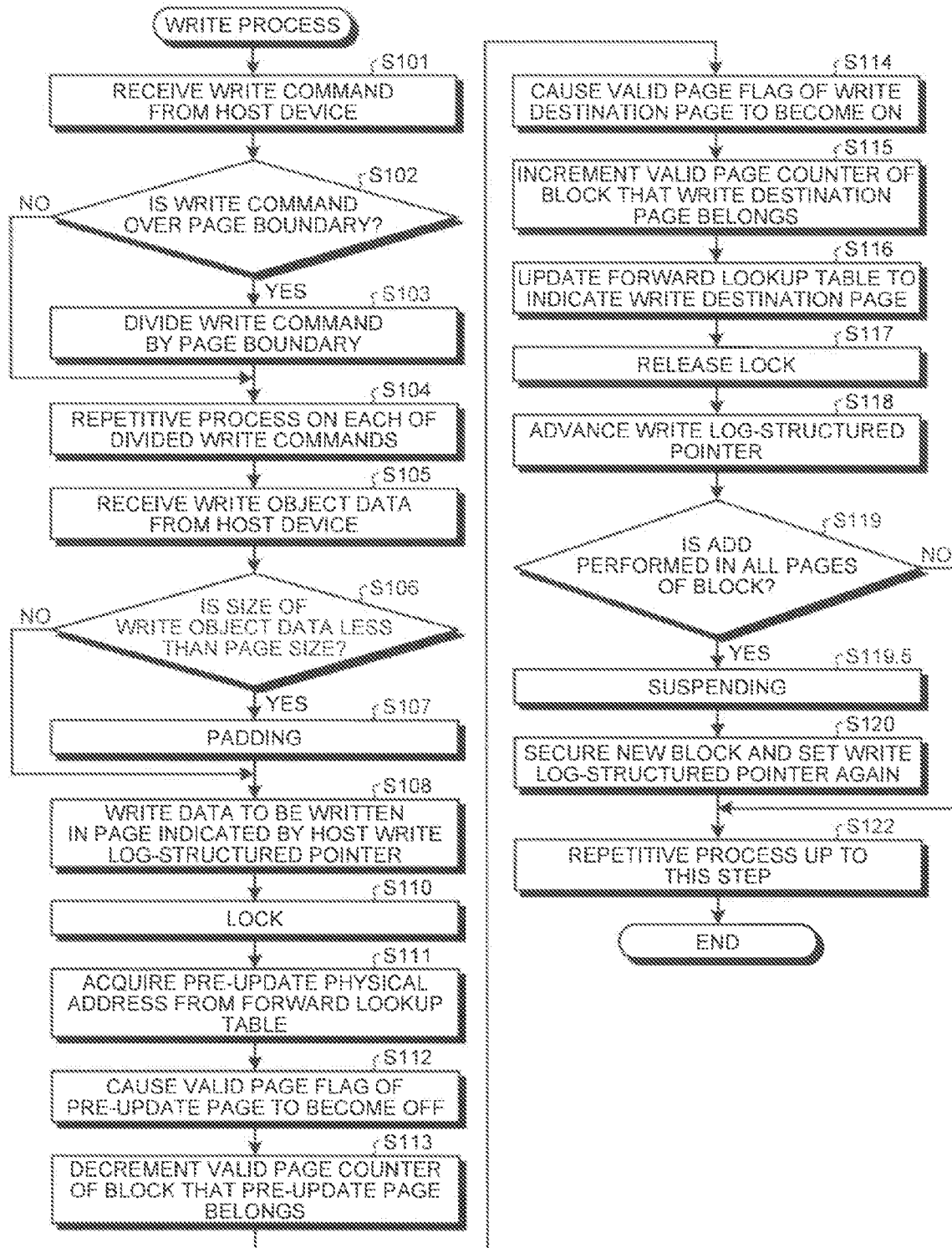
FIG. 28 is a flowchart showing an example of a write process of the data storage device according to the third embodiment.

First, a sequence of a write process that is executed by the data storage device 300 according to a write command from the host device will be described with reference to FIG. 28. FIG. 28 is a flowchart showing an example of a flow of a sequence of the write process executed by the data storage device 300.

Since processes of steps S101 to S107 are the same as those of steps S1 to S7 of FIG. 13, the description will not be repeated.

Since a process of step S108 is also the same as that of step S8 of FIG. 13, the description will not be repeated. However, as shown in FIG. 27, in the page, the user data is recorded in the area to record the user data and the backward lookup logical address of the corresponding page and the data of the error correcting code are recorded in the redundant area. For this reason, in the third embodiment, as shown in step S9 of FIG. 13, the backward lookup logical address of the written page does not need to be separately registered, and the backward lookup logical address does not need to be recorded in the log.

Since processes of steps S110 to S115 are the same as those of steps S10 to S15 of FIG. 13, the description will not be repeated.

Since a process of step S116 is also the same as that of step S16 of FIG. 13, the description will not be repeated. However, in step S116, the update information of the conversion table is not notified to the log storage unit 284. This is because the update information of the conversion table can be restored on the basis of the backward lookup logical address recorded in the page, at the time of restoring management information to be described below. Thereby, in steps S12 to S16 of FIG. 13, the log of the update information of the conversion table is recorded whenever the user data of one page is written. However, in steps S112 to S116 of FIG. 28, the log of the update information does not need to be recorded whenever the user data of one page is written, and the log record count can be greatly decreased.

Since a process of step S117 is the same as that of step S17 of FIG. 13, the description will not be repeated.

Since a process of step S118 is almost the same as that of step S18 of FIG. 13, the description will not be repeated. However, in step S118, the update information of the updated host write log-structured pointer is not notified to the log storage unit 284. This is because the update information of the host write log-structured pointer can be restored, at the time of restoring management information to be described below. Thereby, in steps S18 of FIG. 13, the log of the update information of the host write log-structured pointer is recorded whenever the user data of one page is written. However, in step S118 of FIG. 28, the log of the update information does not need to be recorded whenever the user data of one page is written, and the log record count can be greatly decreased.

Since a process of step S119 is the same as that of step S19 of FIG. 13, the description will not be repeated.

In step S119.5, the write instructing unit 350 notifies the log storage unit 284 of add completion information of the corresponding block and requests the log storage unit 284 to commit the notified information. In order to decrease a restoration processing time to be described below, backward lookup logical addresses of all pages that are added in a block until add is completed after the block is allocated may be stored, and the backward lookup logical addresses of the pages that are added in the corresponding block may be included in the add end log of the corresponding block. The log storage unit 284 receives the commitment notification from the write instructing unit 350 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205. The write instructing unit 350 requests the block use information control unit 326 to execute an allocating process of a non-used block. If the block use information control unit 326 receives an allocation request of a non-used block from the write instructing unit 350, the block use information control unit 326 suspends a process of the write instructing unit 350, until the allocation request of the non-used block is received from the compaction unit 370.

In step S120, if the block use information control unit 326 fully receives an allocation request of a non-used block from both the write instructing unit 350 and the compaction unit 370, and the write amount from the host device at a corresponding point of time is 1 and the write amount of the compaction to be processed in the data storage device 300 is N (N is an integer equal to or more than 0), the block use information control unit 326 allocates one non-used block to the write instructing unit 350 and allocates N non-used blocks to the compaction unit 370. The block use information control unit 326 can determine a value of N from information of the number of used blocks included in block use information stored by the block use information storage unit 228 or information of the number of non-used blocks. If the value of N is set to be more than the write amount of the compaction to be processed in the data storage device 300 when the write amount from the host device at a corresponding point of time is 1, when a load of the write request from the host device is not large, the block use information control unit 326 first executes the compaction process and decreases the amount of a compaction process to be executed in the future, thereby improving responsiveness of when the load of the write request from the host device increases in the future. The block use information control unit 326 updates the block use information that is stored by the block use information storage unit 228, according to the allocated contents. The block use information control unit 326 restarts the suspended process of the write instructing unit 350. The block use information control unit 326 notifies the log storage unit 284 of block allocation information with respect to the allocated (N+1) blocks. In the order of the allocation information, a block that is allocated to the compaction unit 370 is temporally prior to a block that is allocated to the write instructing unit 350. When plural blocks are allocated to the compaction unit 370, the order of the allocation information becomes order of the blocks that are used by the compaction unit 370. For example, the order of the allocation information in the case where the blocks are allocated as shown in FIGS. 21 to 25 becomes order of the block A, the block B, the block C, and the block D. The order of the allocation information in the case where the blocks are allocated as shown in FIG. 26 becomes order of the block A in the term 1, the block B and the block C in the term 2, the block D in the term 3, the block E in the term 4, the block F in the term 5, and the block G and the block H in the term 6. The block use information control unit 326 requests the log storage unit 284 to commit the information notified to the log storage unit 284. The log storage unit 284 receives the commitment notification from the block use information control unit 326 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205. The write instructing unit 350 requests the host write log-structured pointer control unit 232 to update the host write log-structured pointer to indicate a page of a head of a newly allocated block. The host write log-structured pointer control unit 232 updates the host write log-structured pointer stored by the host write log-structured pointer storage unit 230 to indicate a page of a head of a newly allocated block.

As described above, in FIG. 28, the log is recorded by the block allocation event. However, since the block allocation event is at the same time as the block allocation process in the compaction process, as shown in step S21 of FIG. 13, the log commitment process cannot be executed at the end, so the log needs to be committed on demand.

Since a process of step S122 is the same as that of step S22 of FIG. 13, the description will not be repeated.

Figure 29:
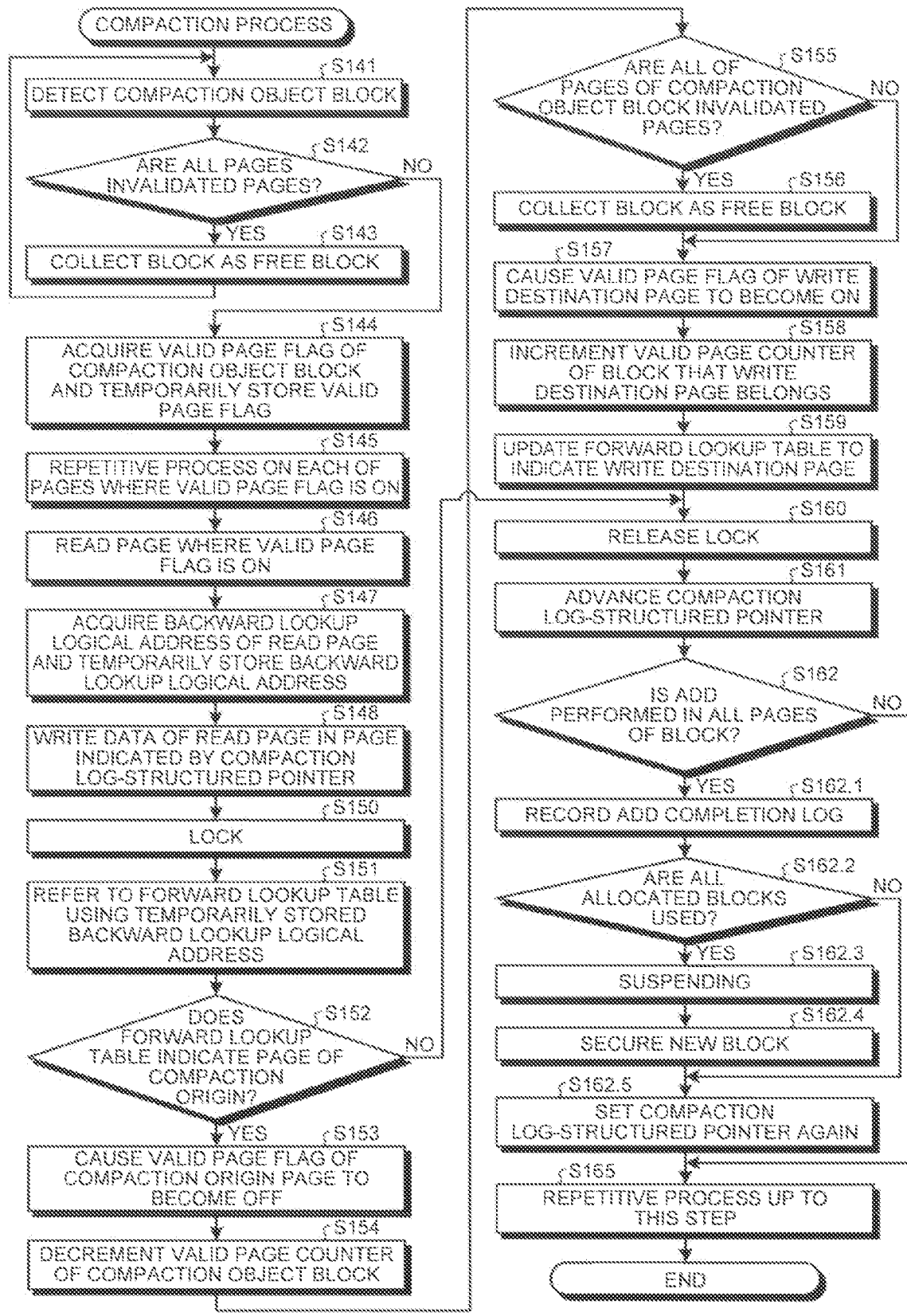
FIG. 29 is a flowchart showing an example of a compaction process of the data storage device according to the third embodiment.

Next, a sequence of a compaction process that is executed by the data storage device 300 will be described with reference to FIG. 29. FIG. 29 is a flowchart showing an example of a flow of a sequence of the compaction process executed by the data storage device 300. The data storage device 300 executes the compaction process at timing when the compaction process is needed or arbitrary timing. The timing at which the compaction process is needed can be determined by determining whether the number of non-used blocks recorded in the block use information is less than the predetermined threshold value.

First, since processes of steps S141 and S142 are the same as those of steps S41 and S42 of FIG. 15, the description will not be repeated.

Since a process of step S143 is almost the same as that of step S43 of FIG. 15, the description will not be repeated. However, the following process is executed. The compaction unit 370 requests the log storage unit 284 to commit the updated block use information. The log storage unit 284 receives the commitment notification from the compaction unit 370 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

Since processes of steps S144 to S46 are the same as those of steps S44 to S46 of FIG. 15, the description will not be repeated. With respect to the data read in step S146, as shown in FIG. 27, the user data is recorded in the area to record the user data and the backward lookup logical address of the corresponding page and the data of the error correcting code are recorded in the redundant area.

In step S147, the compaction unit 370 extracts the backward lookup logical address that is recorded in the redundant area of the read data and temporarily stores the backward lookup logical address.

Since a process of step S148 is almost the same as that of step S48 of FIG. 15, the description will not be repeated. However, as shown in FIG. 27, in the page, the user data is recorded in the area to record the user data and the backward lookup logical address of the corresponding page and the data of the error correcting code are recorded in the redundant area. For this reason, in the third embodiment, as shown in step S49 of FIG. 15, the backward lookup logical address of the written page does not need to be separately registered, and the backward lookup logical address does not need to be recorded in the log. As described above, the backward lookup table is newly written only when the data is written in the page, is not updated hereinafter, and is referred to only at the time of the compaction. Therefore, the backward lookup table can be simultaneously written when the data is written in the page according to the write request from the host device, and the backward lookup table can be simultaneously read when the data to be compacted is read. As a result, a penalty is not additionally caused.

Since processes of steps S150 to S158 are almost the same as those of steps S50 to S58 of FIG. 15, the description will not be repeated. The "corresponding backward lookup logical address of the physical address area that the acquired compaction object block number and valid page flag information correspond (copy origin page)" in steps S50 to S58 of FIG. 15 corresponds to the extracted backward lookup logical address in steps S150 to S158 of FIG. 29.

Since a process of step S159 is almost the same as that of step S59 of FIG. 15, the description will not be repeated. In step S159 of FIG. 29, the update information of the conversion table is not notified to the log storage unit 284, in contrast to step S59 of FIG. 15. This is because the update information of the conversion table can be restored on the basis of the backward lookup logical address recorded in the page, at the time of restoring management information to be described below. Thereby, in steps S53 to S59 of FIG. 15, the log of the update information of the conversion table is recorded whenever the user data of one page is written. However, in steps S153 to S159 of FIG. 29, the log of the update information does not need to be recorded whenever the user data of one page is written, and the log record count can be greatly decreased. When the value of the valid page counter of the compaction object block becomes 0 and the corresponding block is collected as the non-used block, the compaction unit 370 notifies the log storage unit 284 of the update information of the updated block use information and requests the log storage unit 284 to commit the information notified to the log storage unit 284. The log storage unit 284 receives the commitment notification from the compaction unit 370 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

Since a process of step S160 is the same as that of step S60 of FIG. 15, the description will not be repeated.

Since a process of step S161 is almost the same as that of step S61 of FIG. 15, the description will not be repeated. In step S161 of FIG. 29, the update information of the updated compaction log-structured pointer is not notified to the log storage unit 284, in contrast to step S61 of FIG. 15. This is because the update information of the compaction log-structured pointer can be restored, at the time of restoring management information to be described below. Thereby, in step S61 of FIG. 15, the log of the update information of the compaction log-structured pointer is recorded whenever the compaction of one page is performed. However, in step S161 of FIG. 29, the log of the update information does not need to be recorded whenever the compaction of one page is performed, and the log record count can be greatly decreased.

Since a process of step S162 is the same as that of step S62 of FIG. 15, the description will not be repeated.

In step S162.1, the compaction unit 370 notifies the log storage unit 284 of add completion information of the corresponding block and requests the log storage unit 284 to commit the notified information. In order to decrease a restoration processing time to be described below, backward lookup logical addresses of all pages that are added in a block until add is completed after the block is allocated may be stored, and the backward lookup logical addresses of the pages that are added in the corresponding block may be included in the add end log of the corresponding block. The log storage unit 284 receives the commitment notification from the compaction unit 370 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

In step S162.2, the compaction unit 370 investigates whether all of the blocks allocated from the block use information control unit 326 are used. When all of the blocks are used, the process proceeds to step S162.3. Meanwhile, when all of the blocks are not used, the process proceeds to step S162.5.

In step S162.3, the compaction unit 370 requests the block use information control unit 326 to execute an allocating process of a non-used block. If the block use information control unit 326 receives an allocation request of a non-used block from the compaction unit 370, the block use information control unit 326 suspends a process of the compaction unit 370, until the allocation request of the non-used block is fully received from the write instructing unit 350.

In step S162.4, if the block use information control unit 326 fully receives an allocation request of a non-used block from both the write instructing unit 350 and the compaction unit 370, and the write amount from the host device at a corresponding point of time is 1 and the write amount of the compaction to be processed in the data storage device 300 is N (N is an integer equal to or more than 0), the block use information control unit 326 allocates one non-used block to the write instructing unit 350 and allocates N non-used blocks to the compaction unit 370. The block use information control unit 326 can determine a value of N from information of the number of used blocks included in block use information stored by the block use information storage unit 228 or information of the number of non-used blocks. If the value of N is set to be more than the write amount of the compaction to be processed in the data storage device 300 and the write amount from the host device at a corresponding point of time is 1, when a load of the write request from the host device is not large, the block use information control unit 326 first executes the compaction process and decreases the amount of a compaction process to be executed in the future, thereby improving responsiveness at the time when the load of the write request from the host device increases in the future. The block use information control unit 326 updates the block user information that is stored by the block use information storage unit 228, according to the updated contents. The block use information control unit 326 restarts the suspended process of the compaction unit 370. The block use information control unit 326 notifies the log storage unit 284 of block allocation information with respect to the allocated (N+1) blocks. In the order of the allocation information, a block that is allocated to the compaction unit 370 is temporally prior to a block that is allocated to the write instructing unit 350. When plural blocks are allocated to the compaction unit 370, the order of the allocation information becomes order of the blocks that are used by the compaction unit 370. For example, the order of the allocation information in the case where the blocks are allocated as shown in FIGS. 21 to 25 becomes order of the block A, the block B, the block C, and the block D. The order of the allocation information in the case where the blocks are allocated as shown in FIG. 26 becomes order of the block A in the term 1, the block B and the block C in the term 2, the block D in the term 3, the block E in the term 4, the block F in the term 5, and the block G and the block H in the term 6. The block use information control unit 326 requests the log storage unit 284 to commit the information notified to the log storage unit 284. The log storage unit 284 receives the commitment notification from the block use information control unit 326 and requests the semiconductor storage medium control unit 203 to store the temporarily stored update information. The semiconductor storage medium control unit 203 records the temporarily stored update information as a log. If the physical address of the semiconductor storage medium 205 where the log is recorded cannot be previously recognized, the management information cannot be restored when power is supplied to the data storage device 300. For this reason, the physical address of the semiconductor storage medium 205 where the log is recorded is made to indicate a predetermined area of the semiconductor storage medium 205 or an area that can be traced from information recorded in the predetermined area of the semiconductor storage medium 205.

As described above, in FIG. 29, the log is recorded by the block allocation event. However, since the block allocation event is at the same time as the block allocation process in the write process, as shown in step S64 of FIG. 15, the log commitment process cannot be executed at the end, so the log needs to be committed on demand.

In step S162.5, the compaction unit 370 requests the compaction log-structured pointer control unit 242 to update the compaction log-structured pointer to indicate a page of a head of a next block allocated from the block use information control unit 326 or a page of a head of a first block of newly allocated blocks. The compaction log-structured pointer control unit 242 updates the compaction log-structured pointer stored by the compaction log-structured pointer storage unit to indicate a designated page of a designated block.

Since a process of step S165 is the same as that of step S65 of FIG. 15, the description will not be repeated.

Figure 30:
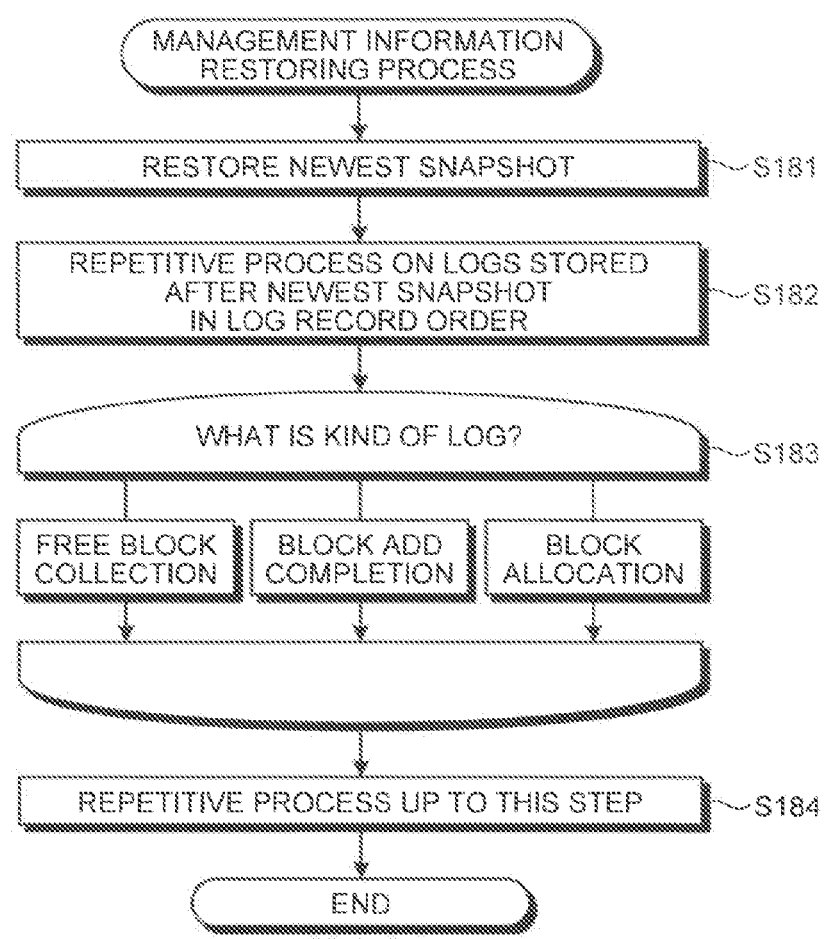
FIG. 30 is a flowchart showing an example of a management information restoring process of the data storage device according to the third embodiment.

Next, a sequence of a management information restoring process that is executed by the data storage device 300 will be descried with reference to FIG. 30. FIG. 30 is a flowchart showing an example of a flow of the sequence of the management information restoring process executed by the data storage device 300. The data storage device 300 restores the management information when power is supplied to the data storage device 300. The data storage device 300 may restore the management information at timing when the management information needs to be restored, even in the cases other than when the power is supplied to the data storage device 300. For example, when it is detected that data of the management information stored in the DRAM 54 corrupts, the data storage device 300 may execute the management information restoring process.

First, since processes of steps S181 to S184 are almost the same as those of steps S81 to S84 of FIG. 17, the description will not be repeated. However, kinds of a log of step S183 include free block collection information indicating that the block is collected as the non-used block, block add completion information indicating that add of the block is completed, and block allocation information indicating allocation of the block. A process of step S183 corresponds to the process of step S83 of FIG. 17 that updates the management information restored according to the log information and shows a process according to the kind of each log. In this case, in the information of the newly allocated block, information of one or more blocks for the compaction add is arranged in order of the blocks used by the compaction unit 370, and the information of the blocks for the host add used by the write instructing unit 350 is arranged. Therefore, the restoring process on the allocation log of the block is repetitively executed with respect to each allocated block number.

Hereinafter, the process according to the kind of each log will be described.

Figure 31:
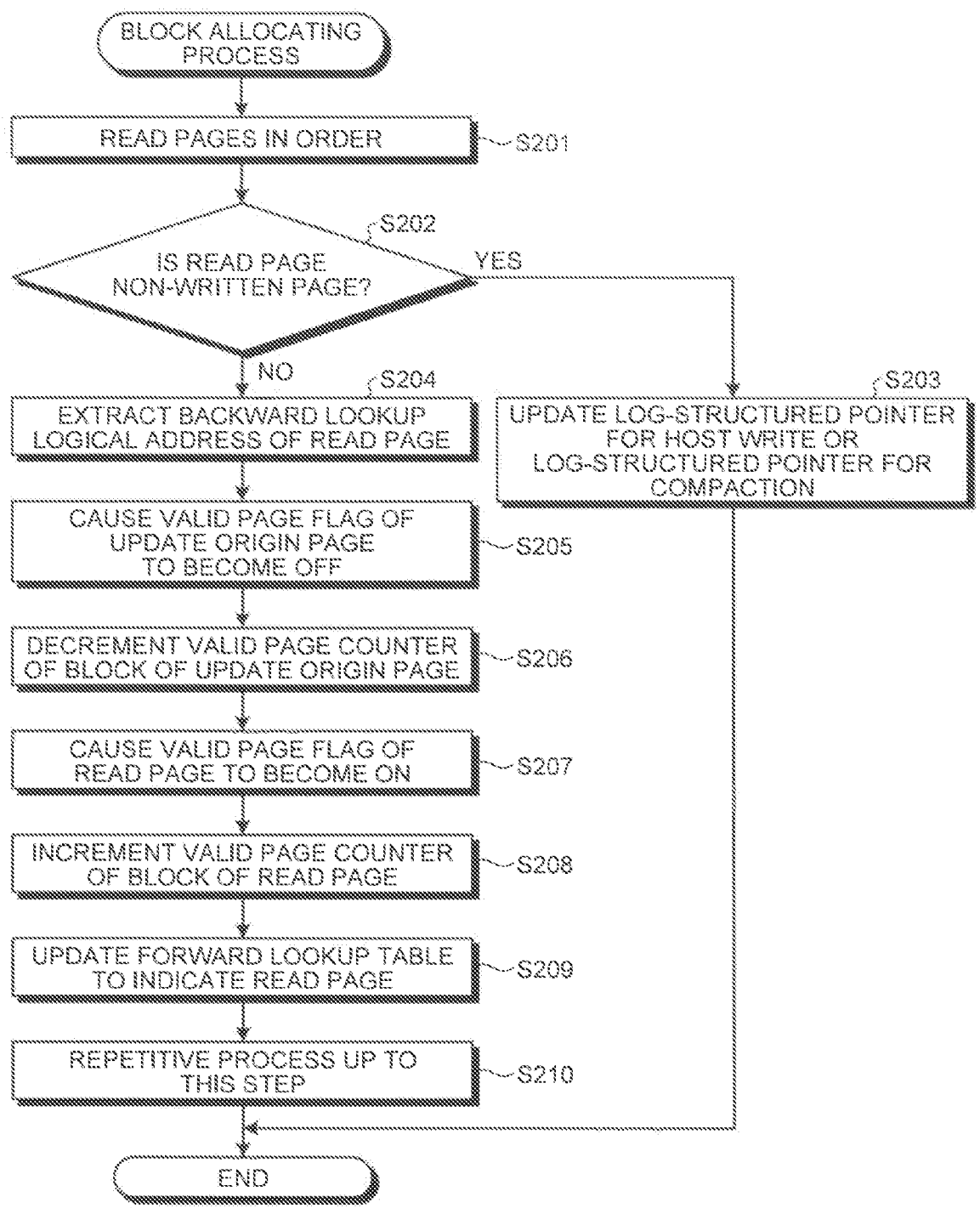
FIG. 31 is a flowchart showing an example of a block allocating process of the data storage device according to the third embodiment.

First, a sequence of a flow of the restoring process when the kind of each log is the block allocation information will be described with reference to FIG. 31. FIG. 31 is a flowchart showing an example of a flow of a sequence of the restoring process when the kind of each log is the block allocation information.

In step S201, the log restoring unit 394 issues a read request of a page to the semiconductor storage medium control unit 203, sequentially from a page of a head, with respect to the blocks of the block numbers recorded in the log. That is, the following processes are repetitively executed. The semiconductor storage medium control unit 203 reads the data of the designated physical address of the semiconductor storage medium 205 and provides the data. The log restoring unit 394 receives the data of the read page from the semiconductor storage medium control unit 203.

In step S202, the log restoring unit 394 determines whether the read page is the non-recorded page. Specifically, since all bits of the data of the erased page including the data of the redundant area shown in FIG. 27 have a value of 1, if it is determined whether the values of all of the bits become 1, it can be recognized that the read page is a non-recorded page. When the read page is the non-recorded page, the process proceeds to step S203. Meanwhile, when the read page is not the non-recorded page, that is, the recorded page, the process proceeds to step S204.

In step S203, the log restoring unit 394 requests the host write log-structured pointer control unit 232 to update the host write log-structured pointer to indicate the non-recorded page, when the corresponding block is the log-structured block for the host write. Likewise, the log restoring unit 394 requests the compaction log-structured pointer control unit 242 to update the compaction log-structured pointer, when the corresponding block is the block allocated for the compaction add. The host write log-structured pointer control unit 232 receivers the host write log-structured pointer update request from the log restoring unit 394 and updates the host write log-structured pointer that is stored by the host write log-structured pointer storage unit 230. The compaction log-structured pointer control unit 242 receives the compaction log-structured pointer update request from the log restoring unit 394 and updates the compaction log-structured pointer that is stored by the compaction log-structured pointer storage unit 240.

In step S204, the log restoring unit 394 extracts the backward lookup logical address information from the read data.

In steps S205 to S209, the log restoring unit 394 causes the entry of the extracted backward lookup logical address information of the conversion table to indicate the read page, on the basis of the extracted backward lookup logical address information. Specifically, the log restoring unit 394 inquires the conversion table control unit 221 of a physical address (pre-update physical address) that corresponds to the extracted backward lookup logical address, before reading the page. The conversion table control unit 221 refers to the conversion table that is stored by the conversion table storage unit 223 and provides the physical address (pre-update physical address) that corresponds to the extracted backward lookup logical address, before reading the page. The log restoring unit 394 acquires the physical address (pre-update physical address) that corresponds to the extracted backward lookup logical address, before reading the page. The log restoring unit 394 requests the conversion table control unit 221 to cause a valid page flag that the acquired pre-update physical address corresponds to become OFF. The log restoring unit 394 requests the conversion table control unit 221 to decrement a valid page counter of a block that the acquired pre-update physical address corresponds. The log restoring unit 394 requests the conversion table control unit 221 to cause a valid page flag that the read page corresponds to become ON. The log restoring unit 394 requests the conversion table control unit 221 to increment a valid page counter of a block that the read page corresponds. The log restoring unit 394 requests the conversion table control unit 221 to update the extracted backward lookup logical address of the forward lookup table to indicate the physical address area information that the read page corresponds. The conversion table control unit 221 updates the conversion table that is stored by the conversion table storage unit 323, according to the instruction.

As described above, the same process as the update process of the conversion table at the time of the page write is executed. That is, in the third embodiment, the update information of the management information is not recorded in the log in detail and not restored, and the factor by which the management information is updated is recorded, an aspect of the management information being updated from the factor is reproduced, and the management information is restored.

In step S210, the process is repeated from step S201, as needed.

In this case, in the same term, even when the host write process and the compaction process are generated in the same logical address, the change according to the compaction write is first reflected on the management information and the change according to the host write is reflected. Finally, a series of management information shows the page subjected to the host write. Thereby, consistency of the management information is secured.

Figure 32:
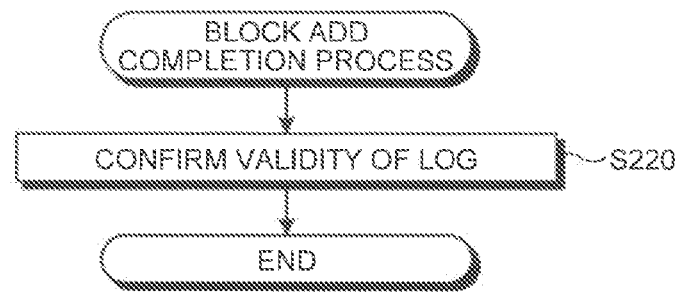
FIG. 32 is a flowchart showing an example of a block add completion process of the data storage device according to the third embodiment.

Next, a sequence of a flow of the restoring process when the kind of each log is the add completion information of the block will be described with reference to FIG. 32. FIG. 32 is a flowchart showing an example of a flow of a sequence of the restoring process when the kind of each log is the add completion information of the block.

In the log, the information of the newly allocated block, the add completion information of the block, and the information indicating that the block is collected as the non-used block are recorded. The term does not proceed to a next term as long as the add of all of the blocks allocated in the certain term is not completed. In step S220, when the log is traced in record order, the log restoring unit 394 confirms that a log of block allocation of a next term is recorded in a state where add completion information of all of the blocks allocated in the certain term is recorded, and validity of the log can be investigated. When the backward lookup logical addresses of all of the pages added in the block until the add is completed after the block is allocated are stored and the backward lookup logical addresses of the pages added in the corresponding block are included in the add completion log of the corresponding block, the backward lookup logical addresses of all of the pages added in the block can be recognized by only viewing the add completion log. Thereby, the process of step S201 of FIG. 31, that is, the read process from the semiconductor storage medium 205 can be greatly decreased. For this reason, the pages may be read sequentially from the head, with respect to only the block where the final add is performed. As a result, the process time of the management information restoring process can be decreased.

Figure 33:
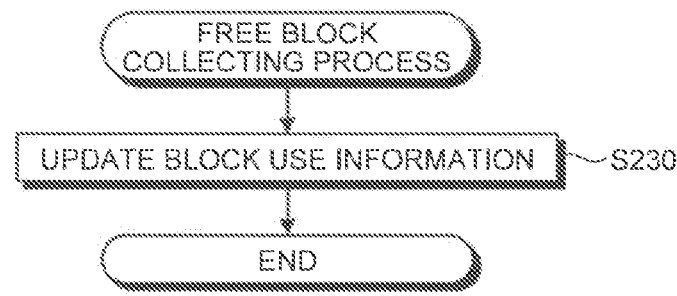
FIG. 33 is a flowchart showing an example of a free block collecting process of the data storage device according to the third embodiment.

Next, a sequence of a flow of the restoring process when the kind of each log is the free block collection information will be described with reference to FIG. 33. FIG. 33 is a flowchart showing an example of a flow of a sequence of the restoring process when the kind of each log is the free block collection information. In step S230, the log restoring unit 394 requests the block use information control unit 326 to change the use state of the corresponding block to the non-used state. The block use information control unit 326 updates the block use information that is stored by the block use information storage unit 228, according to the request from the log restoring unit 394.

By the above process, the management information can be correctly restored while the log record count can be greatly decreased. As a result, as compared with the write performance of the data with respect to the storage medium, the write performance with respect to the write request from the host device can be further improved. Further, the design lifespan of the data storage device can be increased.

In the third embodiment, the following two constraints exist in the block allocation rule.

The first constraint is that the new block allocation of the log-structured block for the compaction add and the log-structured block for the host write is synchronously performed when the host write log-structured pointer and the compaction log-structured pointer use all of the blocks allocated in the corresponding term.

The second constraint relates to the number of allocated blocks, i.e., one non-used block is allocated to the block for the host add and N non-used blocks are allocated to the block for the compaction add, when the write amount from the host device at a corresponding point of time is 1 and the write amount of the compaction to be processed in the data storage device is N (N is an integer equal to or more than 0).

Next, an example in which the management information cannot be correctly restored because of violating the above constraints will be described with reference to FIGS. 34 to 38, while considering the restoration of the forward lookup table. Since a situation mentioned below is applicable to the restoration of the valid page flag or the valid page counter, the description will not be repeated herein.

Figure 34:
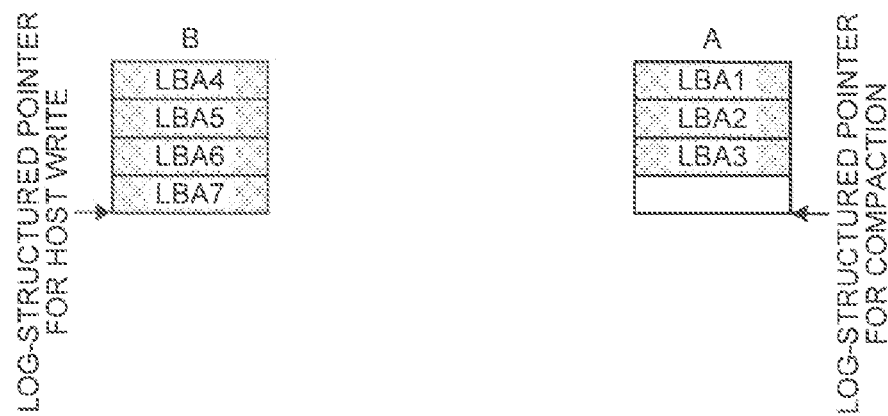
FIG. 34 is a diagram showing an example of a restoring process that is not in accordance with constraints.
Figure 35:
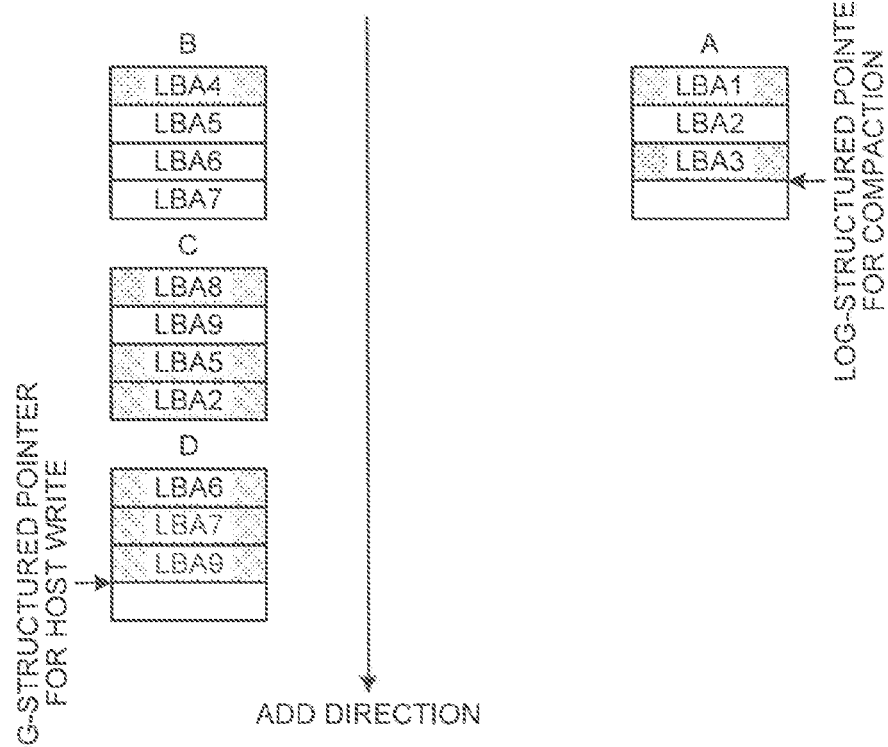
FIG. 35 is a diagram showing an example of a restoring process that is not in accordance with constraints.
Figure 36:
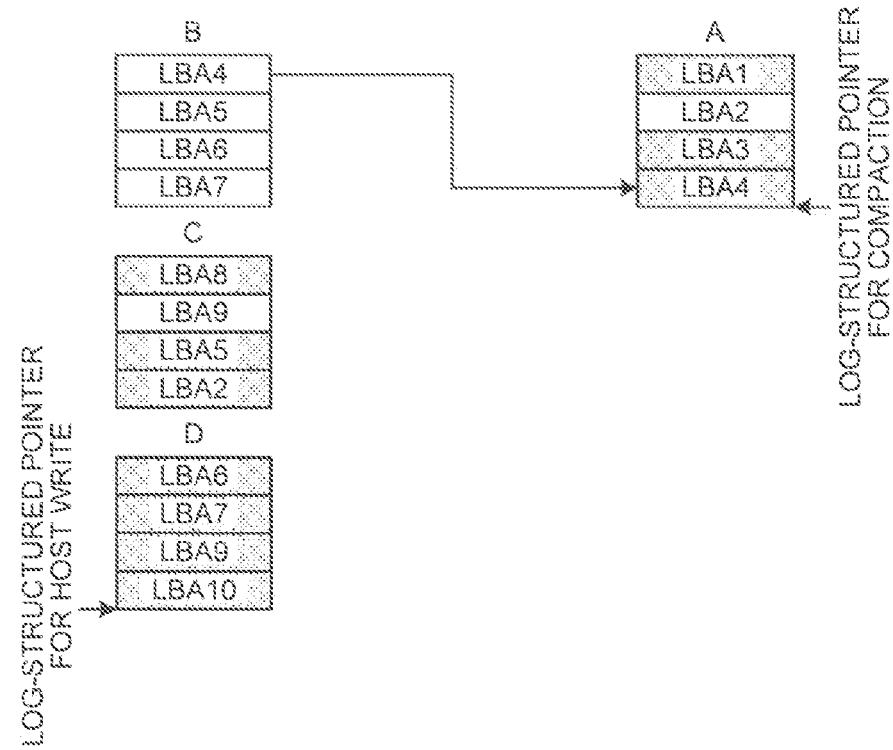
FIG. 36 is a diagram showing an example of a restoring process that is not in accordance with constraints.

In a situation where the blocks are used for the host write and the compaction, as shown in FIG. 34, the log-structured pointer for the host write arrives at the end of the block. In this case, the new block is acquired violating the first constraint, and the write access from the host device is continuously processed as shown in FIG. 35. In this case, since the address deviation is generated in the write access from the host device, as shown in FIGS. 35 and 36, data of a LBA 2 that is recorded in the block A for the compaction is invalidated, the block B becomes the compaction object, and data of a LBA 4 is copied into the block A for the compaction. The log at this point of time is shown in FIG. 37.

In the situation shown in FIG. 36, the contents of the forward lookup table are restored because the supply of power to the data storage device 300 is interrupted and the power is supplied again to the data storage device 300. In this case, as shown in FIG. 37, since temporal order of a log indicating that "the blocks are prepared" is order of the block A, the block B, the block C, and the block D, a page of each block is read in this order and a forward lookup table shown in FIG. 38 is restored. In the forward lookup table shown in FIG. 38, the information of the forward lookup table with respect to the LBA 4 may indicate a page 0 of the block B that is not newest.

Next, an example in which the management information can be correctly restored because of keeping the above constraints will be described with reference to FIGS. 39 to 44, while considering the restoration of the forward lookup table.

Figure 39:
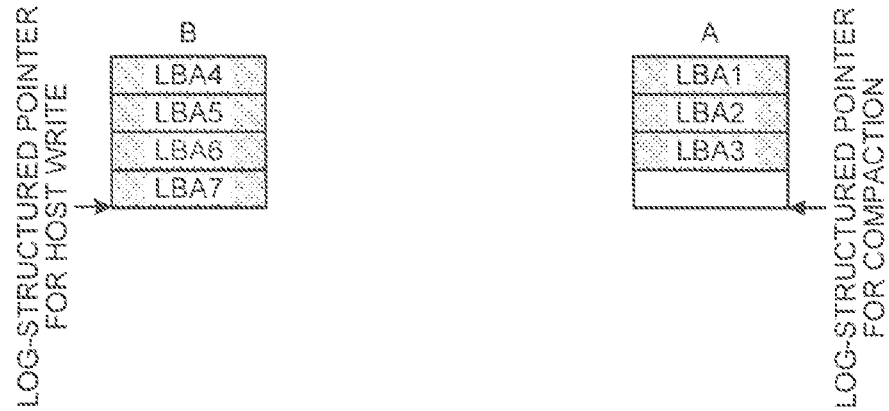
FIG. 39 is a diagram showing an example of a restoring process that is in accordance with constraints.
Figure 40:
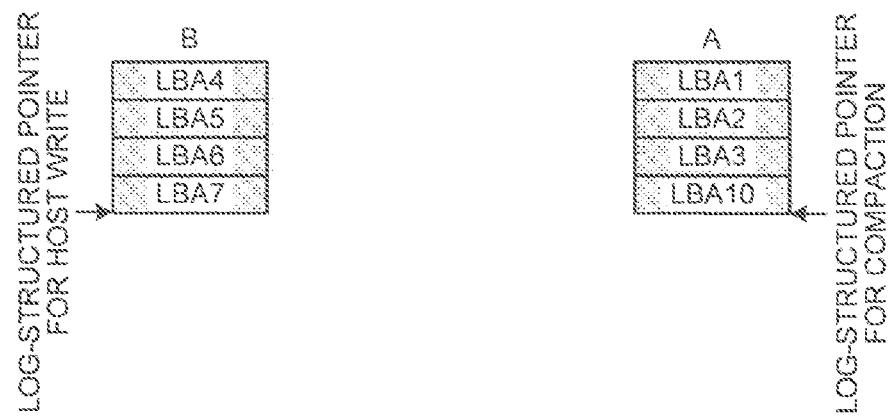
FIG. 40 is a diagram showing an example of a restoring process that is in accordance with constraints.
Figure 41:
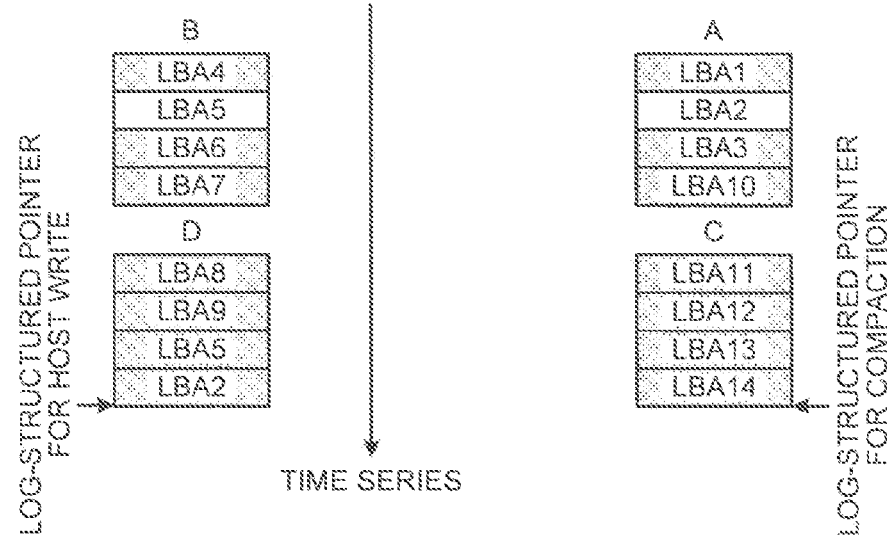
FIG. 41 is a diagram showing an example of a restoring process that is in accordance with constraints.
Figure 42:
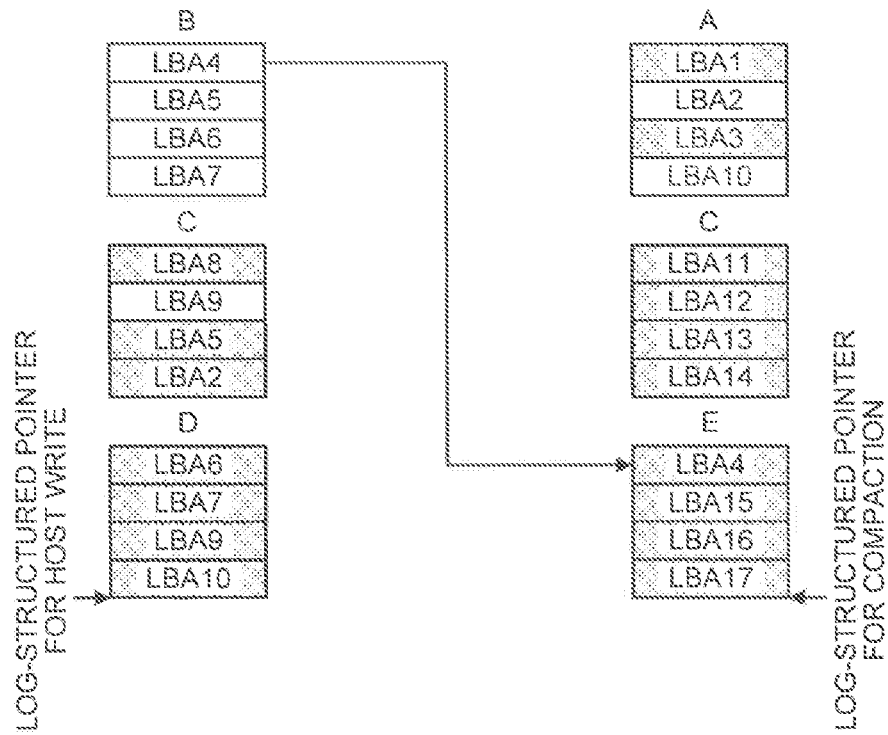
FIG. 42 is a diagram showing an example of a restoring process that is in accordance with constraints.
Figure 43:
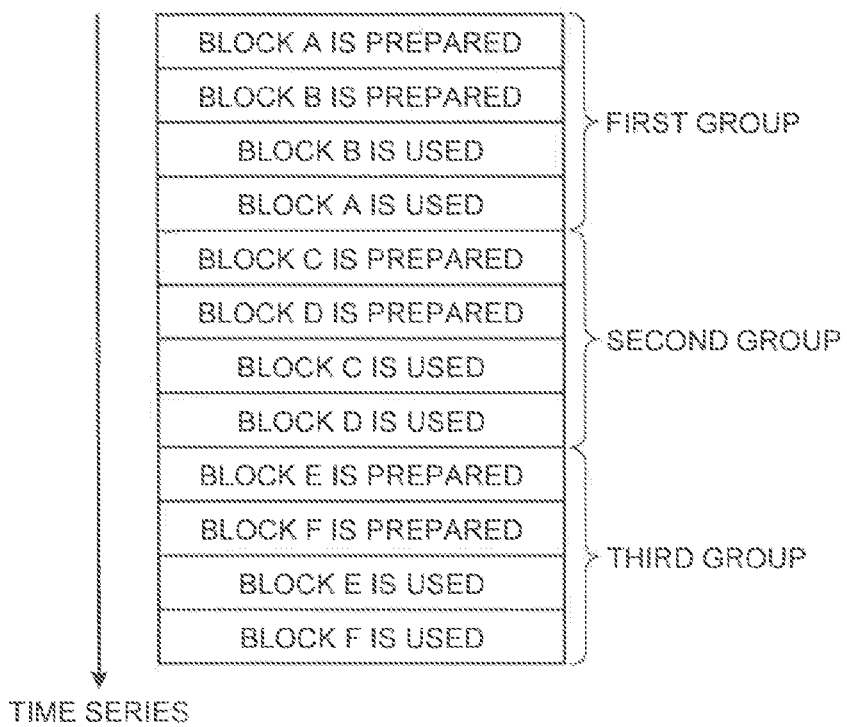
FIG. 43 is a diagram showing an example of a restoring process that is in accordance with constraints.

In a situation where the blocks are used for the host write and the compaction, as shown in FIG. 39, the log-structured pointer for the host write arrives at the end of the block. In this case, the first constraint is kept, the acquisition of the new block is delayed until the log-structured pointer for the compaction arrives at the end of the block as shown in FIG. 40, and new blocks are acquired when the log-structured pointers arrive at the end of the block used for the write. Then, the write according to the write request from the host device and the compaction write are continuously processed, and the acquisition of the block is synchronously performed as shown in FIG. 41. As shown in FIG. 42, the block B for the host write is set as the compaction object and the compaction is performed, and the valid page that exists in the block B is copied into the block E. The log at this point of time is shown in FIG. 43.

In the situation shown in FIG. 42, the contents of the forward lookup table are restored because the supply of power to the data storage device 300 is interrupted and the power is supplied again to the data storage device 300. FIG. 44 shows the restored forward lookup table. Since a focused LBA (logical address) is a forth LBA, eleventh to seventeenth LBAs are not shown in FIG. 42. If the constraints are kept, since the block for the host write and the block for the compaction are necessarily acquired in a form of a group when the log-structured pointers acquire new blocks, a restoring process is executed in a group unit, even in the case where the forward lookup table is reconstructed. In the case of a state of FIG. 44, three groups that include a group of blocks A and B, a group of blocks C and D, and a group of blocks E and F are obtained. Restoration order of the three groups is order in which the blocks are used in a write process. First, pages of the group of the blocks A and B, the pages of the group of the blocks C and D, and the pages of the group of the blocks E and F are sequentially read and the forward lookup tables are restored. In each group, after the pages of the block for the compaction are read and the forward lookup table is restored, the pages of the block for the host write are read and the forward lookup table is restored. For example, with respect to the group of the blocks A and B, after the pages of the block A are processed, the pages of the block B are processed.

As shown in the forward lookup table restoration result of FIG. 44, it can be recognized that the restoration result of the forward lookup table secures consistency, in spite that data written from the host device is immediately compacted, because the address deviation is generated as in the access pattern shown in FIG. 36.

The first constraint is a constraint that causes the acquisition of the blocks to write two kinds of data having different characteristics to be performed when the two write pointers use all of the acquired blocks, and causes the write history with respect to each block to be stored and specified in correct order. From this configuration, it can be recognized that forward lookup table restoration from the log cannot be correctly performed, if the first constraint is not kept.

The second constraint is a constraint that causes the change in the write request frequency from the host device or the change in the number of non-used blocks to be dynamically reflected, while keeping the first constraint. In the situation where the compaction does not need to be performed, for example, immediately after the use of the system starts, the blocks may not be acquired by the log-structured pointer for the compaction. Meanwhile, in a situation where the compaction needs to be performed due to a decrease in the number of non-used blocks of the system, a lot of blocks are made to be acquired by the log-structured pointer for the compaction, and a situation where the compaction is performed many times with respect to the host write is generated.

In this way, the write amount of the compaction that is needed at a corresponding point of time can be secured, and the process can be avoided, as much as possible, from being suspended until the other log-structured pointer arrives at the end of the allocated block, even when one log-structured pointer arrives at the end of the allocated block.

Fourth Embodiment

In the fourth embodiment, an example in which a valid page flag is not included in a conversion table will be described.

If the following first and second relationships are realized between the backward lookup logical address written in the page and the forward lookup table, the configuration in which the valid page flag is not included in the conversion table can be employed.

The first relation is that, "when the forward lookup table is referred by the backward lookup logical address written in the page and the physical address recorded in the forward lookup table indicates the corresponding page, this means that write with respect to the corresponding logical address is not performed after write of the corresponding page, and the corresponding page is valid".

The second relation is that, "when the forward lookup table is referred by the backward lookup logical address written in the page and the physical address recorded in the forward lookup table does not indicate the corresponding page, this means that write with respect to the corresponding logical address is performed after write of the corresponding page, and the corresponding page is invalid".

When the conversion table is constructed not to include the valid page flag, using the above relationships, the processes of referring to ON and OFF of the valid page flag described above are replaced by the following processes.

(1) process of reading data of pages.
(2) process of referring to the forward lookup table by the backward lookup logical address and determining whether the physical address recorded in the forward lookup table indicates the page read by (1).
(3) process of determining that the valid page flag is ON when (2) becomes true and determining that the valid page flag is OFF when (2) becomes false.

As described above, in the fourth embodiment, the memory use amount of the management information can be decreased by using the configuration where the valid page flag is not included in the conversion table. When the memory use amount of the management information can be decreased, this means that the capacity to be stored as the snapshot can be decreased. As a result, the process time that is needed to store the snapshot can be decreased, the write amount with respect to the semiconductor storage medium can be reduced, and the design lifespan of the data storage device can be increased. The "backward lookup logical address written in the page" may be read as the "backward lookup logical address corresponding to the corresponding page in the conversion table".

Fifth Embodiment

In the fifth embodiment, an example in which various process are not executed in a block unit but are executed in a unit called a logical block where plural blocks are combined will be described. Hereinafter, the block is called a physical block to distinguish the block and the logical block from each other.

When the processes are executed in the logical block unit, the forward lookup table has an LBA table of a first stage shown in FIG. 45 and a logical/physical conversion table of a second stage shown in FIG. 46. The LBA table uses the logical address as an index and includes the logical address, a logical block number assigned to the logical block, a channel number, and a page number assigned to the page. The logical block numbers are assigned in block generation order. The channel numbers become CH0 to CH5 in the case of the configuration shown in FIG. 1 and show the channels where write object data is written. The logical/physical conversion table is information that indicates each physical block of each channel belonging to the logical block. The logical/physical conversion table uses the logical block number as an index and includes a logical block number and each physical block number for each channel included in the logical block.

The backward lookup table, the valid page flag, and the valid page counter are shown in FIG. 47. As shown in FIG. 47, the backward lookup table, the valid page flag, and the valid page counter use the logical block number as an index, and include the logical block number, the valid page counter, the logical address of each physical block of each channel, and the valid page flag set as an entry. The logical address of each physical block of each channel and the valid page flag set use the channel number as an index, and the channel number, the logical address, and the valid page flag are arranged in order of pages disposed in the corresponding physical block and the page that the logical address information or the valid page flag information correspond can be specified. A value of the valid page counter of the same logical block and the total number of true values of the valid page flags are matched with each other. The logical block number that becomes the index and the logical block number that becomes the entry of the forward lookup table are assigned with the same number in the same block.

Similar to the backward lookup table shown in FIG. 9, the backward lookup table is a table that indicates a correspondence relationship of a logical address of data stored by the data storage device and a physical address indicating a physical storage position where data is actually stored in the semiconductor storage medium, and is used when the address is converted from the physical address to the logical address, in contrast to the forward lookup table. The valid page flag shows a valid page where valid data is written among the pages included in the physical block, using a true/false value. The valid page counter shows the number of valid pages among the pages included in the logical block.

In this case, if write order of the pages of the physical block constituting the logical block, that is, an advancing method of the log-structured pointer is determined as shown in FIG. 48, the various processes in the (physical) block unit described above can be replaced by the processes in the logical block unit. Thereby, the plural semiconductor storage media are collectively accessed and the access speed can be increased. By combining the third embodiment or the fourth embodiment, the configuration where the backward lookup table or the valid page flag is not included may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile semiconductor memory including a plurality of blocks, the blocks including one or more first blocks, a plurality of second blocks that differ from the first blocks, and a third block, each of the blocks being a unit of an erase operation of the nonvolatile semiconductor memory; and
a controller being configured to:
receive a write request from a host device, the write request designating a size of first data;
perform a first operation of writing the first data to the first blocks in response to the write request; and
perform a second operation of copying second data stored in the second blocks to the third block that stores no valid data and treating the second blocks as free blocks, wherein
the second data has been written in the second blocks before receiving the write request, and
the controller is configured to perform at least a part of the second operation during a period of time starting from the receiving of the write request and ending at a completion of the first operation of writing the first data.

2. The memory system of claim 1, wherein the completion of the first operation of writing the first data is delayed due to the al least part of the second operation.

3. The memory system of claim 1, wherein the controller is configured to start the second operation before the receiving the write request.

4. The memory system of claim 1, wherein the controller is configured to use first information indicative of a position of writing the first data in the first blocks and second information indicative of a position of writing the second data in the third block.

5. The memory system of claim 1, wherein, in response to the write request from the host device, the controller is configured to perform the first operation of writing the first data to the first blocks and the second operation to the second blocks for a future write request in parallel.

6. The memory system of claim 1, wherein, in response to another write request including another data from the host device, the controller is configured to perform the first operation of writing the another data to the second blocks.

7. The memory system of claim 1, wherein the controller is configured to manage address conversion information and receive a write request from a host device,
the address conversion information includes a physical address of the nonvolatile semiconductor memory and a logical address in association with each other, and
the write request designates a first logical address of the first data.

8. The memory system of claim 7, wherein
the first operation of writing the first data to the first blocks includes writing the first data to a first physical address in the first blocks, and
in the second operation, the controller is configured to change the physical address corresponding to a second logical address in the address conversion information from a second physical address to a third physical address, the second logical address being a logical address of a part of the second data, the second physical address being a physical address of the part of the second data in the second blocks, the third physical address being a physical address of the part of the second data in the third block.

* * * * *